US011926726B2

(12) United States Patent
Tan et al.

(10) Patent No.: US 11,926,726 B2
(45) Date of Patent: Mar. 12, 2024

(54) POLYIMIDE-GOLD-NANOROD J-AGGREGATES WITH BROADENED SURFACE PLASMONIC RESONANCE BAND AND METHOD OF MANUFACTURE

(71) Applicant: Government of the United States, as represented by the Secretary of the Air Force, Wright-Patterson AFB, OH (US)

(72) Inventors: Loon-Seng Tan, Centerville, OH (US); Zhenning Yu, Beavercreek, OH (US); Kyoungweon Park, Beavercreek, OH (US); Richard A. Vaia, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 728 days.

(21) Appl. No.: 16/951,666

(22) Filed: Nov. 18, 2020

(65) Prior Publication Data

US 2022/0153956 A1     May 19, 2022

(51) Int. Cl.
     *C08K 3/08*          (2006.01)
     *C08J 3/20*          (2006.01)
     *C08L 79/08*        (2006.01)

(52) U.S. Cl.
     CPC ................ *C08K 3/08* (2013.01); *C08J 3/203* (2013.01); *C08L 79/08* (2013.01); *C08J 2379/08* (2013.01); *C08K 2003/0831* (2013.01)

(58) Field of Classification Search
None
See application file for complete search history.

(56) References Cited

U.S. PATENT DOCUMENTS

| | | | |
|---|---|---|---|
| 4,595,548 A | 6/1986 | St. Clair et al. | |
| 5,260,411 A * | 11/1993 | Tesoro ................ | C08G 73/12 528/172 |
| 10,758,983 B1 | 9/2020 | Vaia et al. | |
| 2009/0059367 A1 | 3/2009 | O'Malley | |
| 2010/0046072 A1 | 2/2010 | Matsunami | |
| 2010/0060985 A1 | 3/2010 | Kamada et al. | |
| 2015/0204882 A1 | 7/2015 | Bhowmick et al. | |
| 2015/0335741 A1 | 11/2015 | Smeltzer et al. | |
| 2015/0369801 A1 | 12/2015 | Sonnichsen et al. | |
| 2017/0265788 A1 | 9/2017 | Quan et al. | |
| 2018/0172678 A1 | 6/2018 | Tan et al. | |
| 2018/0264144 A1 | 9/2018 | De La Zerda et al. | |
| 2018/0284331 A1 | 10/2018 | Rantala | |
| 2019/0008964 A1 | 1/2019 | El-Sayed et al. | |
| 2019/0056545 A1 | 2/2019 | Yoon et al. | |
| 2020/0249160 A1 | 8/2020 | Duan et al. | |

FOREIGN PATENT DOCUMENTS

| | | | |
|---|---|---|---|
| EP | 0361413 A1 | * | 4/1990 |
| EP | 2199127 A2 | * | 6/2010 |
| JP | 2008102245 A | * | 5/2008 |
| JP | 2020201833 A | * | 9/2010 |
| KR | 20190118558 A | * | 10/2019 |

OTHER PUBLICATIONS

Jain, P. K.; Eustis, S.; El-Sayed, M. A.: Plasmon Coupling in Nanorod Assemblies: Optical Absorption, Discrete Dipole Approximation Simulation, and Exciton-Coupling Model. The Journal of Physical Chemistry B 2006, 110, 18243-18253.
Gordel, M.; Piela, K.; Kolkowski, R.; Kozlecki, T.; Buckle, M.; Samoc, M.: End-to-end self-assembly of gold nanorods in isopropanol solution: experimental and theoretical studies. Journal of Nanoparticle Research 2015, 17:477, 1-12.
Chen, H.; Shao, L.; Li, Q.; Wang, J.: Gold nanorods and their plasmonic properties. Chemical Society Reviews 2013, 42, 2679-2724.
Park, K.; Hsiao, M.; Yi Y.; Izor, S.; Koerner, K.; Jawaid, A.; Vaia R.A.: Highly Concentrated Seed-Mediated Synthesis of Monodispersed Gold Nanorods, ACS Applied Materials & Interfaces, 2017, 9, 26363-26371.
Chen, H.; Kou, X.; Yang, Z.; Ni, W.; Wang, J.: Shape- and Size-Dependent Refractive Index Sensitivity of Gold Nanoparticles. Langmuir 2008, 24, 5233-5237.
Kauranen, M.; Zayat A.V.: Nonlinear plasmonics, Nature photonics, 2012, 6, 737-748.
Nie, Z.; Fava, D.; Rubinstein. M.; Kumacheva E.: "Supramolecular" Assembly of Gold Nanorods End-Terminated with Polymer "Pom-Poms": Effect of Pom-Pom Structure on the Association Modes, Journal of the American Chemical Society, 2008, 130, 3683-3689.
Liu, K; Nie, Z.; Zhao, N.; Li, W.; Rubinstein, M.; Kumacheva E.: Step-Growth Polymerization of Inorganic Nanoparticles, Science, 2012, 329, 197-200.
Lee, C.; Seo, J.; Shul, Y.; Han, H.: Optical Properties of Polyimide Thin Films. Effect of Chemical Structure and Morphology, Polymer Journal, 2003, 35, 7, 578-585.
Mock, J.J.; Smith, D.R.; Schultz, S.: Local Refractive Index Dependence of Plasmon Resonance Spectra from Individual Nanoparticles, Nano Letters, 2003, 3, 4, 485-491.
Liu, J.; Ueda, M.; "High refractive index polymer: fundamental and practical applications". J. Mater. Chem. 2009, 19 8907-8919.
Lee, C.; Kwon, J.; Park, S.; Sundar, S.; Min, B.; Han, H.: Nanoindentation studies of polyimide thin films with various internal linkages in the diamine component. Journal of Polymer Science, Part B: Polymer Physics 2004, 42, 861-870.
Jain, P. K.; Eustis, S.; El-Sayed, M. A.; Plasmon Coupling in Nanorod Assemblies: Optical Absorption, Discrete Dipole Approximation Simulation, and Exciton-Coupling Model, J. Phys. Chem. B 2006, 110, 18243-18253.

(Continued)

*Primary Examiner* — Tae H Yoon
(74) *Attorney, Agent, or Firm* — AFMCLO/JAZ; James F. McBride

(57) ABSTRACT

The invention relates to nanohybrids that are gold nanorod J-aggregates having a broadened surface plasmonic resonance band, processes of making such gold nanorod J-aggregates and products comprising such gold nanorod J-aggregates. Such gold nanorod J-aggregates exhibit broad localized surface plasmonic reasonable range from 800 nm to 2000 nm.

12 Claims, 10 Drawing Sheets

(56) References Cited

OTHER PUBLICATIONS

Tempelman, K.; Wood, J. A.; Kremer, F.; Benes, N. E.; Relaxation Dynamics of Thin Matrimid 5218 Films in Organic Solvents, J. Phys. Chem. B 2019, 123, 4017-4024.

Jana, N. R.; Gearheart, L.; Murphy, C. J.; Wet Chemical Synthesis of High Aspect Ratio Cylindrical Gold Nanorods, J. Phys. Chem. B 2001, 105, 4065-4067.

\* cited by examiner

POLYIMIDE-GOLD-NANOROD J-AGGREGATES WITH BROADENED SURFACE PLASMONIC RESONANCE BAND AND METHOD OF MANUFACTURE

RIGHTS OF THE GOVERNMENT

The invention described herein may be manufactured and used by or for the Government of the United States for all governmental purposes without the payment of any royalty.

FIELD OF THE INVENTION

The invention relates to nanohybrids that are gold nanorod J-aggregates, comprising gold nanorod and a polyimide, and having a broadened surface plasmonic resonance band, processes of making such gold nanorod J-aggregates and products comprising such gold nanorod J-aggregates.

BACKGROUND OF THE INVENTION

The extremely large optical extinction coefficient of gold nanorods (AuNRs) enable a wide variety of technologies, ranging from plasmon-enhanced imaging, cancer and antimicrobial therapeutics, and sensors, to large-area optical coatings, filters, and polarizers. However, AuNRs with high aspect ratios, which correlates to the requisite property of localized surface plasmonic resonance (LSPR) absorption in the near to mid infrared (NIR-MIR) region, are commonly synthesized by the rather slow process of growing the AuNRs from isotropic gold nanoparticles (so-called "Au seeds") and a feedstock of tetrachloroaurate ($AuCl_4^-$) anions (a gold-atom source) in a reducing solution environment and through carefully controlled seed-mediated growth conditions. Currently, this method of synthesis and its modified versions are not cost-effective and/or amenable to industrial scale production. Accordingly, there is a need for new and or improved NIR-absorbing materials and associated methods of synthesis for the aforementioned applications.

Applicants recognized that the source of the aforementioned problems stemmed from the critical thermodynamics that restrict the growth mechanism of gold nanorods. In particular, Applicants recognized that the unfavorable thermodynamics of the growth process arose from the need to drive the system during the growth process to a more disordered state, thus limiting the size and shape selectivity and in particular, the aspect ratio of the AuNRs. As a result of such recognition, Applicants disclose a new and simple method to enable the resulting nanohybrid products with broadened and red-shifted LSPR absorption in the MIR-NIR region. The underlying mechanism of this method is driven by the polyimide-assisted assembling process of starting AuNRs into the "end-to-end" staggered ensembles with extended LSPR wavelengths in appropriate solvents. While not being bound by theory, Applicants believe that the aforementioned improvements arise from interaction of polyimide with multiple AuNR to form J-type aggregates. As a result, each AuNR need not be lengthened in order to broaden its LSPR into NIR region of longer wavelengths.

SUMMARY OF THE INVENTION

The invention relates to nanohybrids that are gold nanorod J-aggregates having a broadened surface plasmonic resonance band, processes of making such gold nanorod J-aggregates and products comprising such gold nanorod J-aggregates. Such gold nanorod J-aggregates comprise gold nanorods and polyimide.

BRIEF DESCRIPTION OF THE DRAWINGS

The accompanying drawings, which are incorporated in and constitute a part of this specification, illustrate embodiments of the invention and, together with the summary given above, and the detailed description given below, serve to explain the invention.

Figure 1:
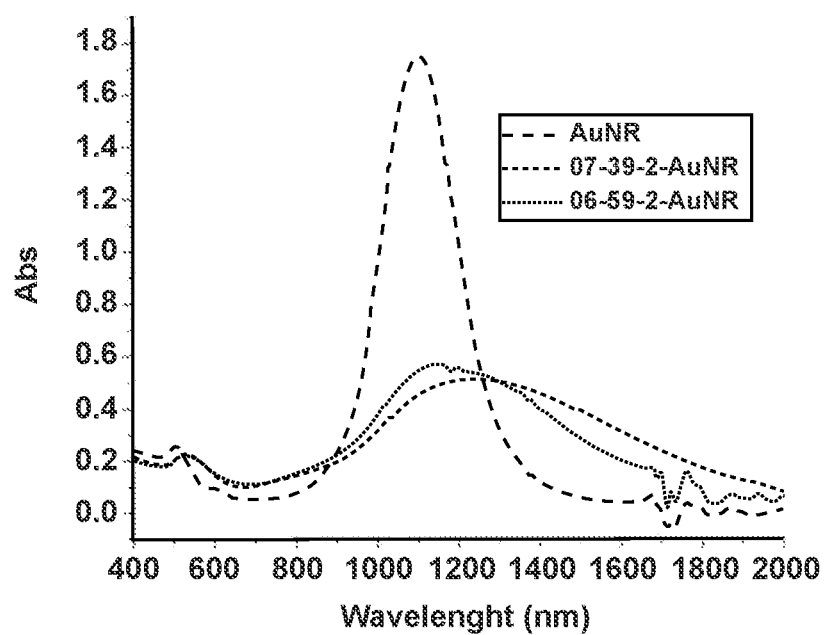
FIG. 1 depicts the assembling kinetics of AuNRs/polyimide (07-39-2) nanocomposite in NMP/THF as monitored by the spectral changes with time in the UV-Vis-NIR (400-2000 nm) region of the nanocomposite solution; inset (a) is the plot of absorbance at 1078 nm vs. time; and inset (b) is the plot of absorbance at 1500 nm vs. time

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Gold Nanorod J-Aggregates and Processes of Making and Using Same

One-dimensional (1D) and two-dimensional (2D) nanomaterials have generated extensive research and development efforts in the past few decades due to their fascinating optical and electronic properties. However, the device-level applications of these materials are very challenging because, among other things, simultaneously tuning the shape and size to enhance their optical and electronic properties at the specific and narrow wavelength ranges, broadband sensitivity, and high signal-to noise ratio, especially in NIR-MIR regions (1-10 µm) is nontrivial. Among 1D nanomaterials, controlling the size and shape (aspect ratio being the useful parameter) of gold nanoparticles (AuNPs) has been investigated extensively, and applications of AuNPs in visible to near-infrared (600-900 nm) range such as biosensors, nanoelectronics, photothermal cancer therapies, etc. have been widely studied. The development of these applications relies on the phenomenon of localized surface plasmonic resonance (LSPR), which is characteristic of anisotropic metal nanoparticles, particularly AuNPs with high aspect ratios. While LSPR phenomenon has effect in the realms of both light absorption and light scattering, LSPR absorption is arguably a more important photophysical property due to the following reasons: plasmonic excitation (i) boosts nonlinear optical effect, (ii) can be extremely sensitive to metal and surrounding media, and (iii) can result in responses on the time scale of a few femtoseconds (fs). However, the development of the plasmonics-enabled and -enhanced technologies has been slow because of scalability challenges related to the synthesis of AuNP until recently. In their work reported in ACS Appl. Mater. Interface (2017), vol. 9, pg 2636-26371, Park et al. described the reduction to practice that gold nanorods (AuNRs) with visible to near infrared LSPR band could be synthesized in large quantity, high quality (narrow particle size distribution) and good yield.

Unlike spherical (isotropic) gold nanoparticles (AuNS), gold nanorods (AuNRs) exhibit two unique LSPR bands because of their structural and optical anisotropies. One of them (t-SPR) is related to the transverse direction of AuNRs, and the other one (l-SPR) is related to the longitudinal direction of AuNRs. The l-SPR band is usually much stronger, and its excitation is more tunable by synthetically varying the aspect ratio [length (L)/diameter (D)] of AuNRs. The excitation of l-SPR band is usually found in the spectral range from visible (Vis) to near infrared (NIR). However, many optoelectronic applications require the longitudinal LSPR band in near to mid-infrared (700-3,000 nm) range. To reach this range, there are two common approaches: (A) bottom-up synthesis and fabrication of extremely high aspect ratio AuNRs [the much longer version of AuNR are called "gold nanowire or Au—NS", (see Jana, N. R.; Gearheart, L.; Murphy, C. J.: (Highest AR=18) Wet Chemical Synthesis of High Aspect Ratio Cylindrical Gold Nanorods. The Journal of Physical Chemistry B 2001, 105, 4065-4067.) (B) coupling LSPR by bringing gold nanoparticles into close enough for orbital interactions through assembling, for example, assembling AuNRs in a "end to end" fashion, i.e. forming "J-Aggregates", would result in the excitation band of such ensembles extending from visible region and deeper into NIR region, analogous to spectral red-shifting by increasing conjugation length of organic dyes and conjugated polymers. On the other hand, assembling AuNRs in a parallel or side-by-side fashion to form the so-called "H-aggregates", the absorption band of the resulting H-aggregates would be blue-shifted, i.e. towards shorter wavelengths in the visible region, relative to the absorption bands of the individual AuNRs. (See Jain, P. K.; Eustis, S.; El-Sayed, M. A., Plasmon Coupling in Nanorod Assemblies: Optical Absorption, Discrete Dipole Approximation Simulation, and Exciton-Coupling Model. *The Journal of Physical Chemistry B* 2006, 110, 18243-18253.)

For purposes of this specification, headings are not considered paragraphs and thus this paragraph is Paragraph 0025 of the present specification. The individual number of each paragraph above and below this paragraph can be determined by reference to this paragraph's number. In this paragraph 0025, Applicants disclose a gold nanorod J-aggregate having a localized surface plasmonic resonance band covering the range from 800 nm to 2,000 nm, said gold nanorod J-aggregate comprising:
  a) gold nanorods; and
  b) one or more polyimides, said one or more polyimides having a solubility of at least 5 g/L at 25° C. at 1 atmosphere of pressure in at least one solvent selected from the group consisting of N-methyl-pyrrolidinone, N,N-dimethylacetate, N,N-dimethylformamide, tetrahydrofuran, dichloromethane, chloroform, 1,4-dioxine, propylene carbonate, cyclopentanone and/or said one or more polyimides having a solubility of at least 5 g/L at 25° C. at 1 atmosphere of pressure in a mixture of two or more of said solvents. For purposes of this specification said gold nanorod J-aggregate is an aggregate and polyimides having structures of the polyimides in this section of the specification title "Gold Nanorod J-Aggregates and Processes of Making and Using Same" will, in general, meet the solubility requirement of this Paragraph 0025.

Applicants disclose the gold nanorod J-aggregate of Paragraph 0025 wherein said gold nanorods have an average aspect ratio of from about 2 to about 7, preferably said gold nanorods have an average aspect ratio of from about 5 to about 6. Said gold nanorod J-aggregate has the advantageous property of allowing gold nanorods having an average aspect ratio of from about 2 to about 7, or even an average aspect ratio of from about 5 to about 6 to exhibit the same spectra as gold nanorods having an aspect ratio of 20 to 30.

Applicants disclose the gold nanorod J-aggregate of Paragraphs 0025 through 0026 wherein said one or more polyimides is selected from the group consisting of one or more homopolyimides comprising endcaps and a backbone, said endcaps and/or said backbone comprising sulfur; one or more copolyimides comprising endcaps and a backbone, said endcaps and/or said backbone comprising sulfur; one or more homopolyimides; one or more copolyimides and mixtures thereof.

Applicants disclose the gold nanorod J-aggregate of Paragraph 0027 comprising one or more homopolyimides, each of said one or more homopolyimides having Structure I below:

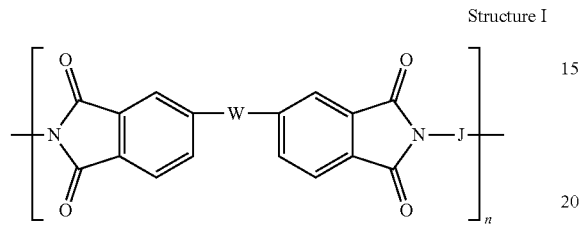

Structure I wherein:
a) for each homopolyimide the index n is independently an integer from 5 to 300, preferably index n is an integer from 10 to 100;
b) for each homopolyimide W is independently a covalent bond, or a linking group having one of the following structures:

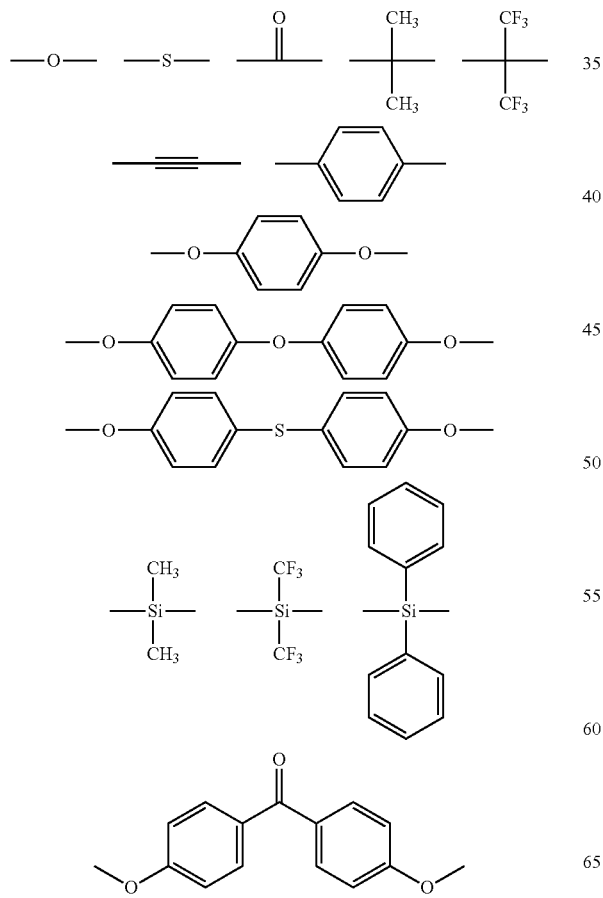

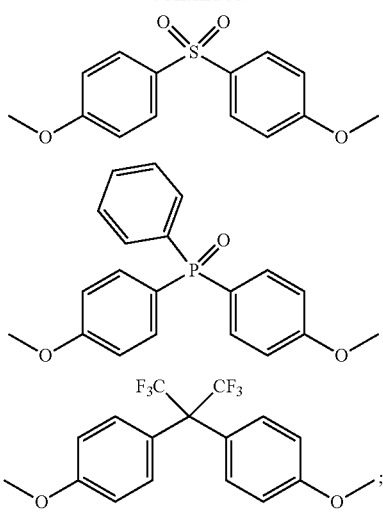

c) for each homopolyimide, J is independently:

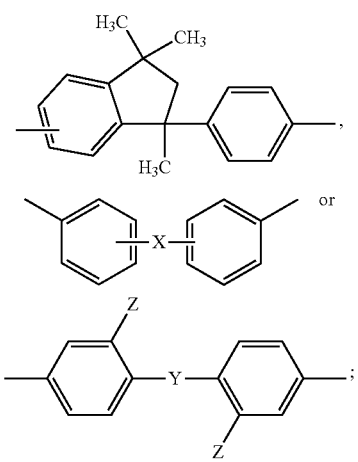

wherein:
i) for each homopolyimide X is independently a linking group having one of the following structures:

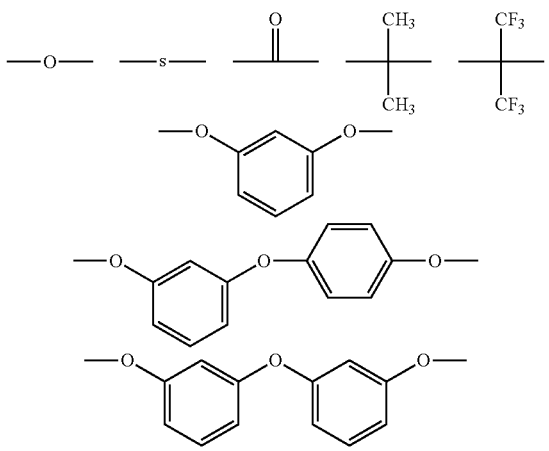

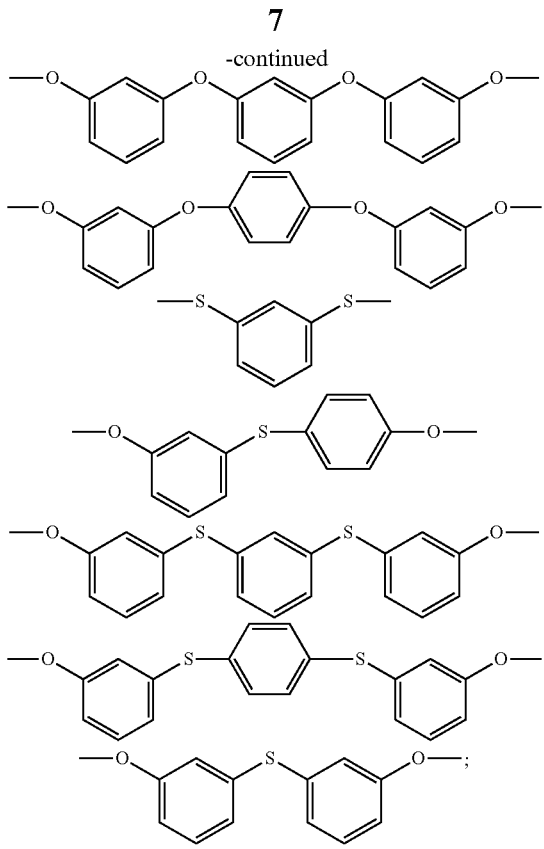

ii) for each homopolyimide, Y is independently a covalent bond, or a linking group having one of the following structures:

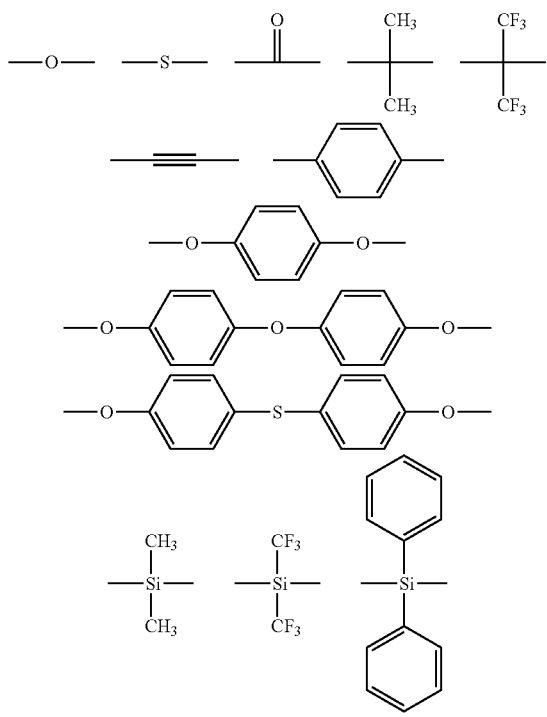

iii) for each homopolyimide, Z is independently one of the following structures:

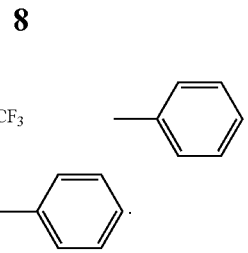

Applicants disclose the gold nanorod J-aggregate of Paragraph 0027 comprising one or more copolyimides having Structure II below and wherein for each copolyimide the indices and variables provided in Structures II and III are independently selected:

$$-\!\!\left[Q_a - T_b\right]_m\!\!-\qquad\text{Structure II}$$

the subscripts a and b are indices for the molar fractions of Q and T, each with the range of 0.05 to 0.95, respectively, and the sum of a and b is unity; and m is an integer from 5 to 300;

wherein Q and T are homopolyimides having Structure III below:

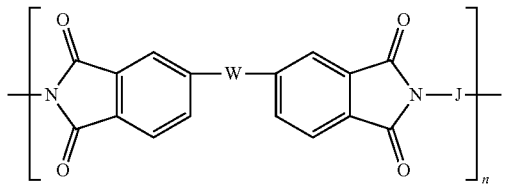

Structure III wherein a) for each homopolyimide Q and T, the index n is an integer from 5 to 300, preferably index n is an integer from 10 to 100;

b) for each homopolyimide Q and T, W is independently a covalent bond, or a linking group having one of the following structures:

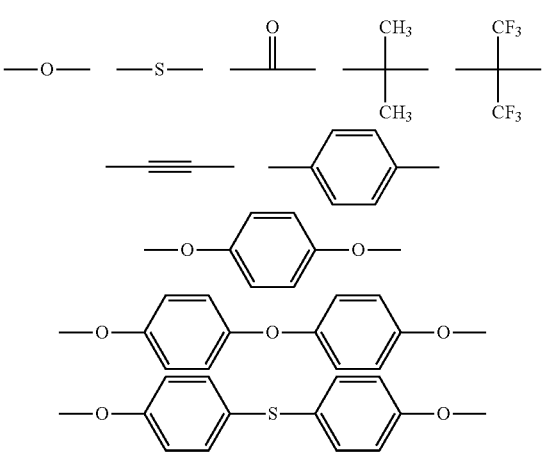

-continued
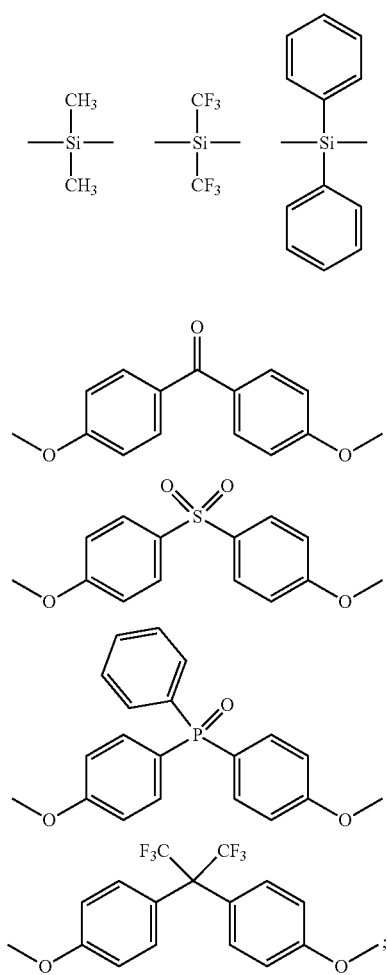
c) for each homopolyimide Q and T, J has one of the following structures with the proviso that J for Q and T is different:
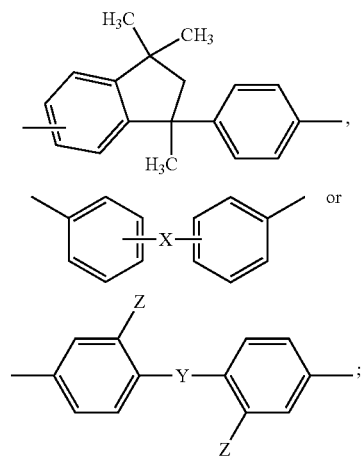
wherein:
i) X is a linking group having one of the following structures:
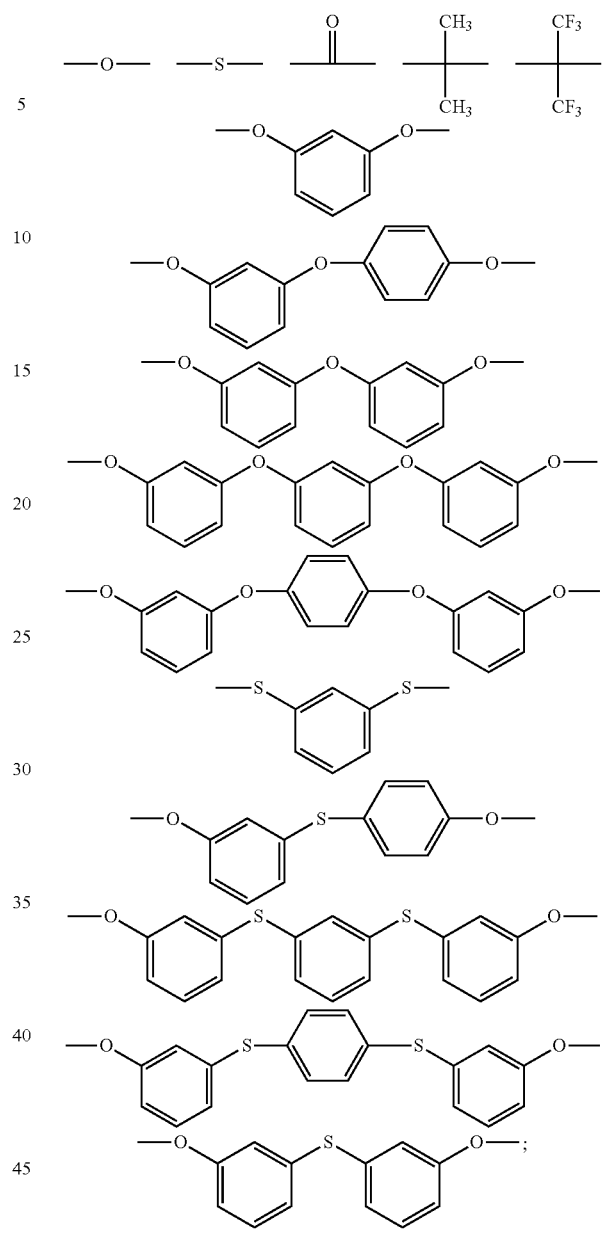
ii) Y is a covalent bond, or a linking group having one of the following structures:
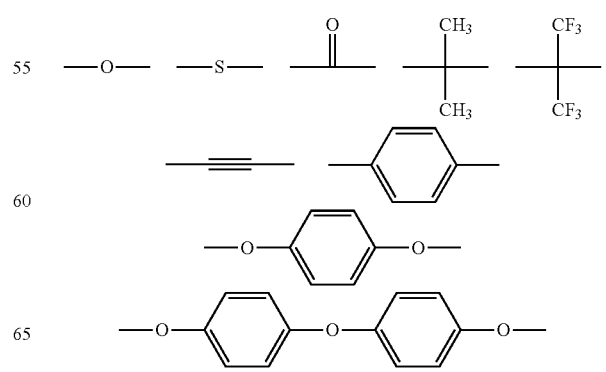

-continued

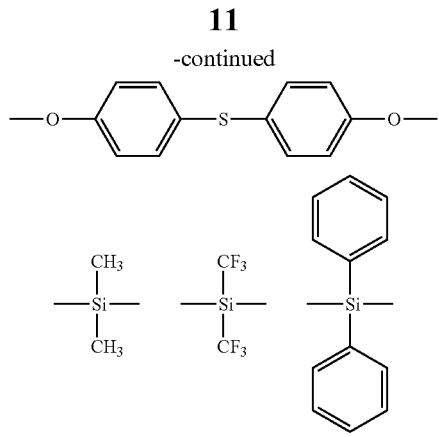

and iii) Z is one of the following structures:

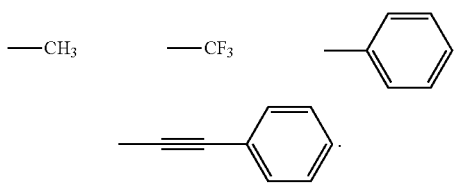

Applicants disclose the gold nanorod J-aggregate of Paragraph 0027, comprising one or more homopolyimides comprising endcaps and a backbone, said backbone comprising sulfur, said one or more homopolyimides having Structure IV below and wherein for each said homopolyimide the indices and variables provided in Structures IV are independently selected:

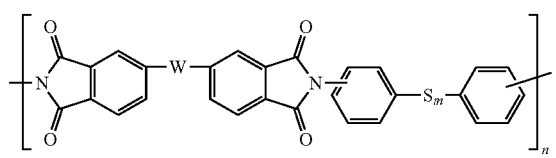

Structure IV a) the index n is an integer from 5 to 300, preferably each index n is an integer from 10 to 100;
b) W is a covalent bond, or a linking group having one of the following structures:

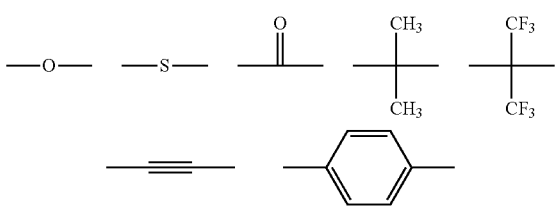

-continued

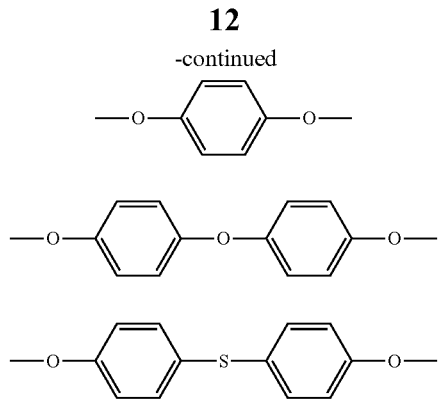

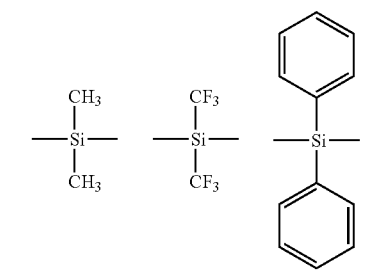

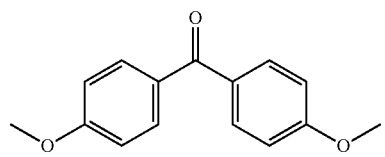

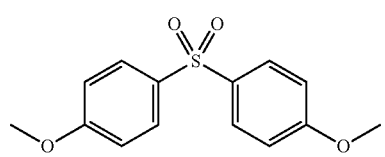

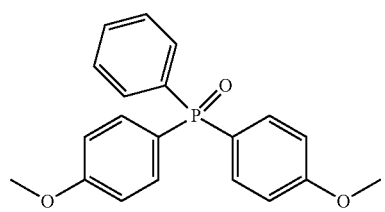

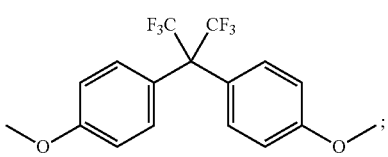

and c) m is 1 or 2 (m=1=sulfide and m=2=disulfide).

Applicants disclose the gold nanorod J-aggregate of Paragraph 0027 comprising one or more copolyimides comprising end caps and a backbone, said endcaps and/or said backbone comprising sulfur, said one or more copolyimides having Structure V below and wherein for each copolyimide the indices and variables provided in Structures V are independently selected:

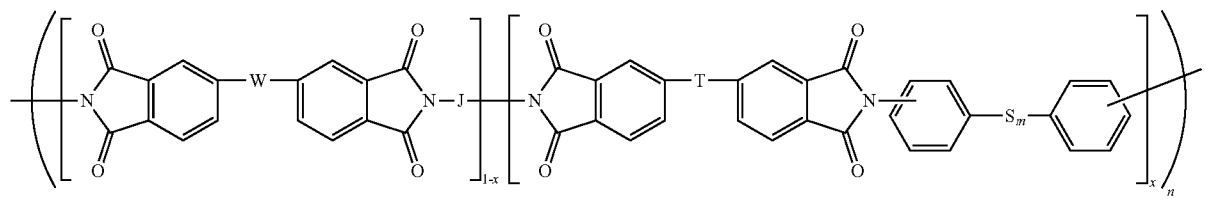

Structure V wherein for each copolyimide
- a) the index n is independently an integer from 5 to 300, preferably index n is an integer from 10 to 100;
- b) x is a non-zero number less than 1, and the ratio for x:(1-x) is 0.01:0.99 to 0.20:0.80, preferably the ratio for x:(1-x) is 0.01:0.99 to 0.10:0.90;
- c) m is 1 or 2 (m=1=sulfide and m=2=disulfide);
- d) T is a covalent bond, or a linking group having one of the following structures:

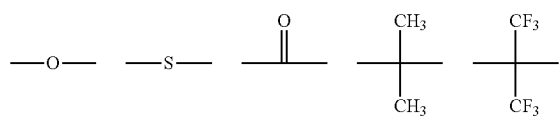

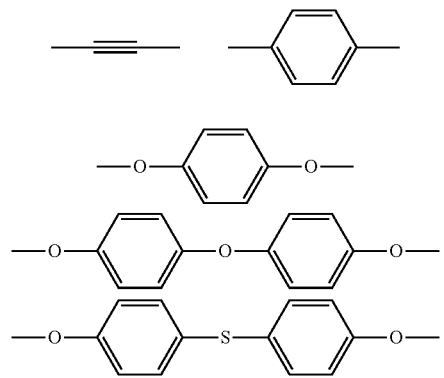

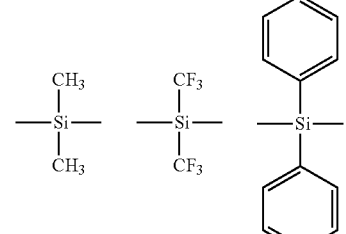

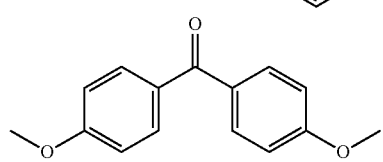

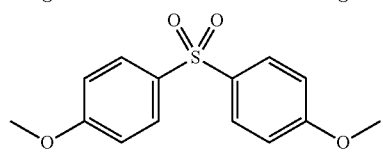

-continued

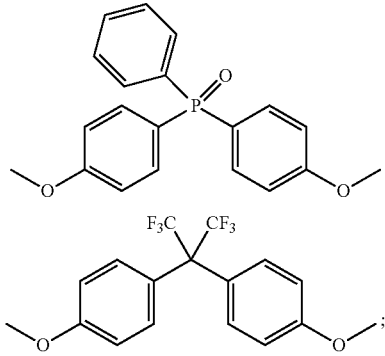

e) W is a covalent bond, or a linking group having one of the following structures:

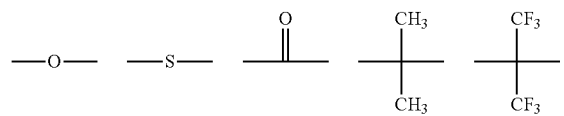

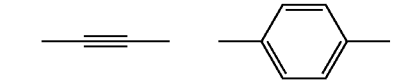

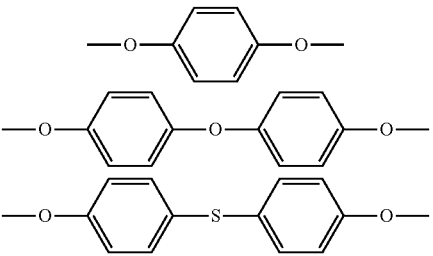

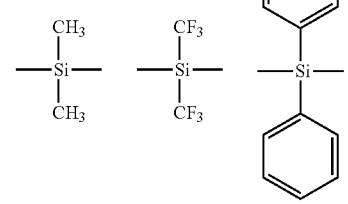

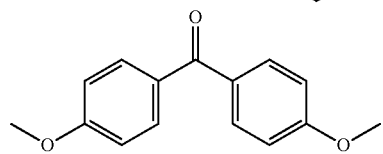

-continued
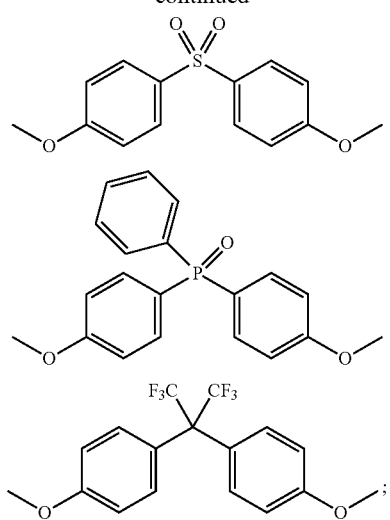
f) J is one of the following moieties:
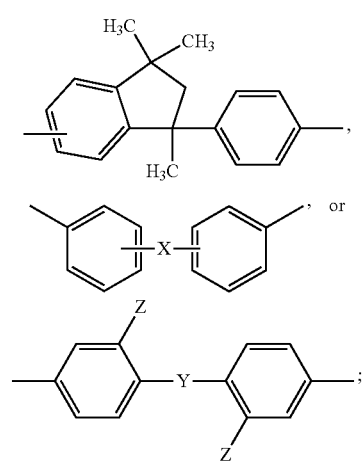
wherein:
i) X is a linking group having one of the following structures:
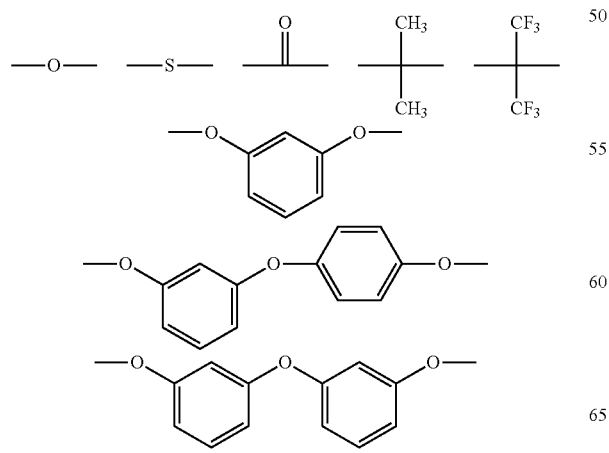
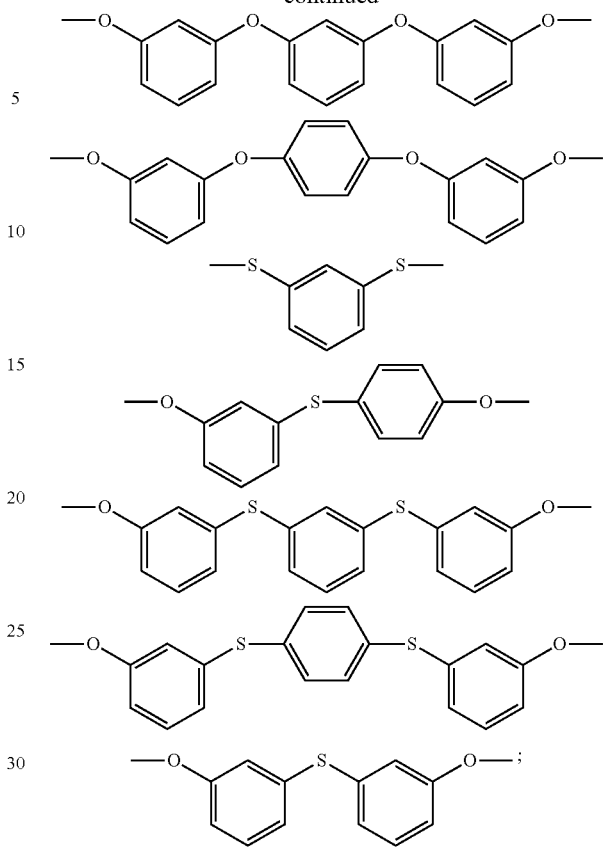
ii) Y is a covalent bond, or a linking group having one of the following structures:
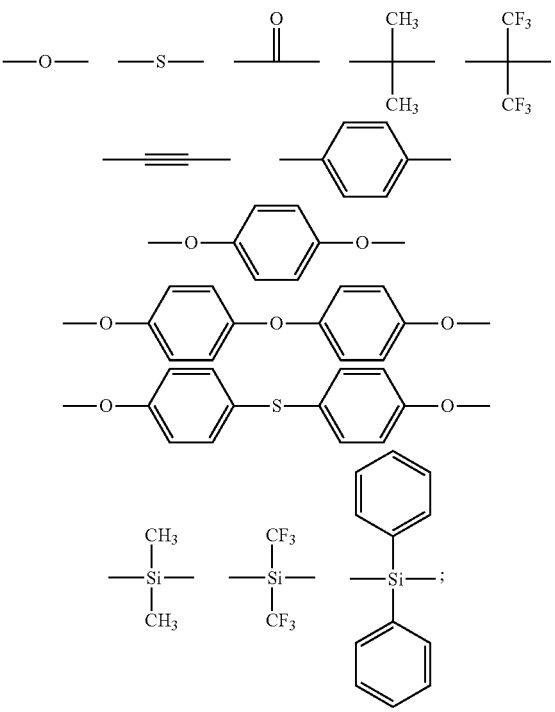

and iii) Z is one of the following structures:

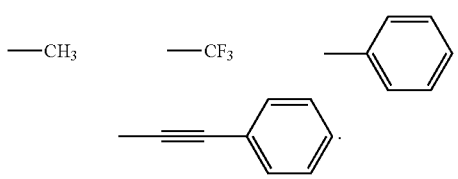

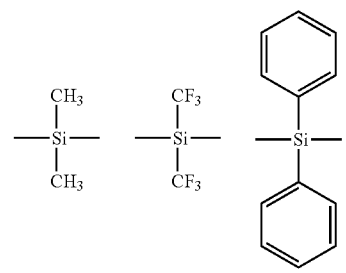

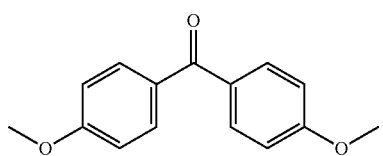

Applicants disclose the gold nanorod J-aggregate of Paragraph 0027 comprising one or more copolyimides comprising endcaps and a backbone, said endcaps and/or said backbone comprising sulfur, said copolyimides having Structure VI below and wherein for each copolyimide the indices and variables provided in Structures VI are independently selected:

Structure VI

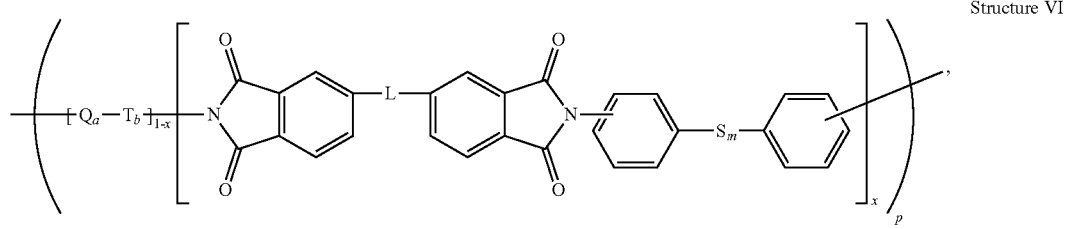

a) the index p is independently an integer from 5 to 300, preferably index p is an integer from 10 to 100;

b) x is a non-zero number less than 1, and the ratio for x:(1−x) is 0.01:0.99 to 0.20:0.80, preferably the ratio for x:(1−x) is 0.01:0.99 to 0.10:0.90;

c) the subscripts a and b are indices for the molar fractions of Q and T, each with the range of 0.05 to 0.95, respectively, and the sum of a and b is unity;

d) the index m is 1 or 2 (m=1=sulfide and m=2=disulfide);

e) L is a covalent bond, or a linking group having one of the following structures:

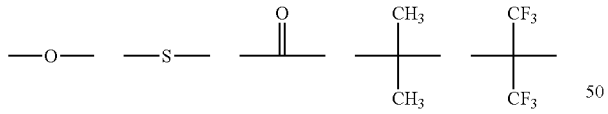

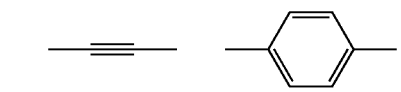

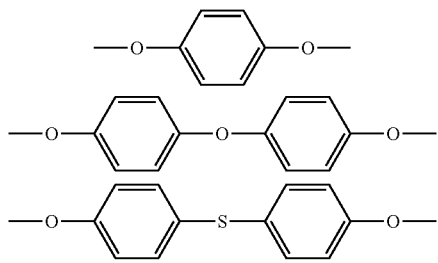

-continued

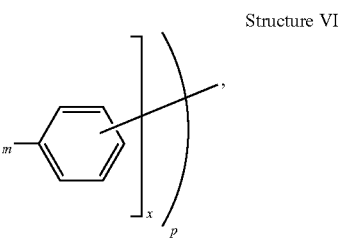

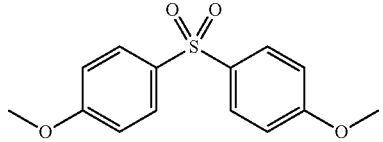

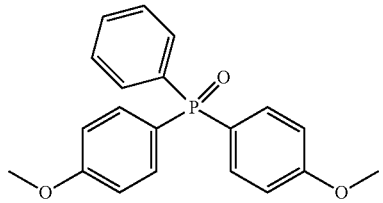

f) Q and T are homopolyimides having Structure VII below:

Structure VII

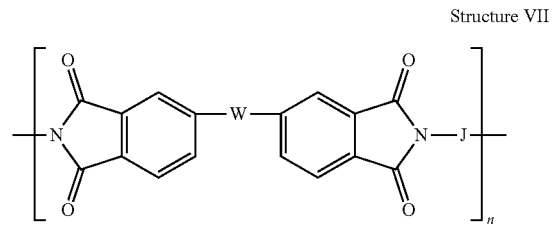

wherein i) for each homopolyimide Q and T, the index n is an integer from 5 to 300, preferably index n is an integer from 10 to 100;

ii) for each homopolyimide Q and T, W is independently a covalent bond, or a linking group having one of the following structures:

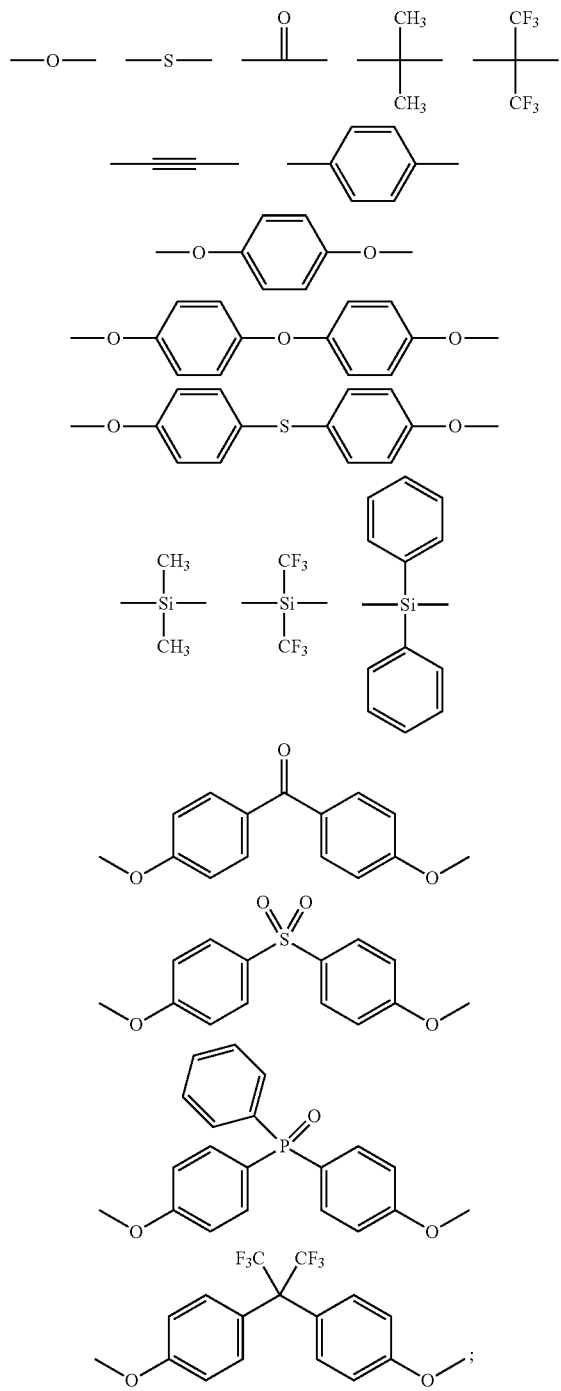

iii) for each homopolyimide Q and T, J has one of the following structures with the proviso that J for Q and T is different:

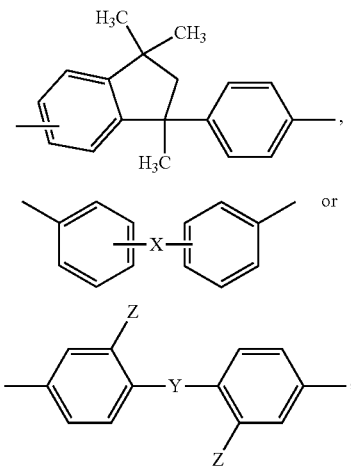

wherein:

X is a linking group having one of the following structures:

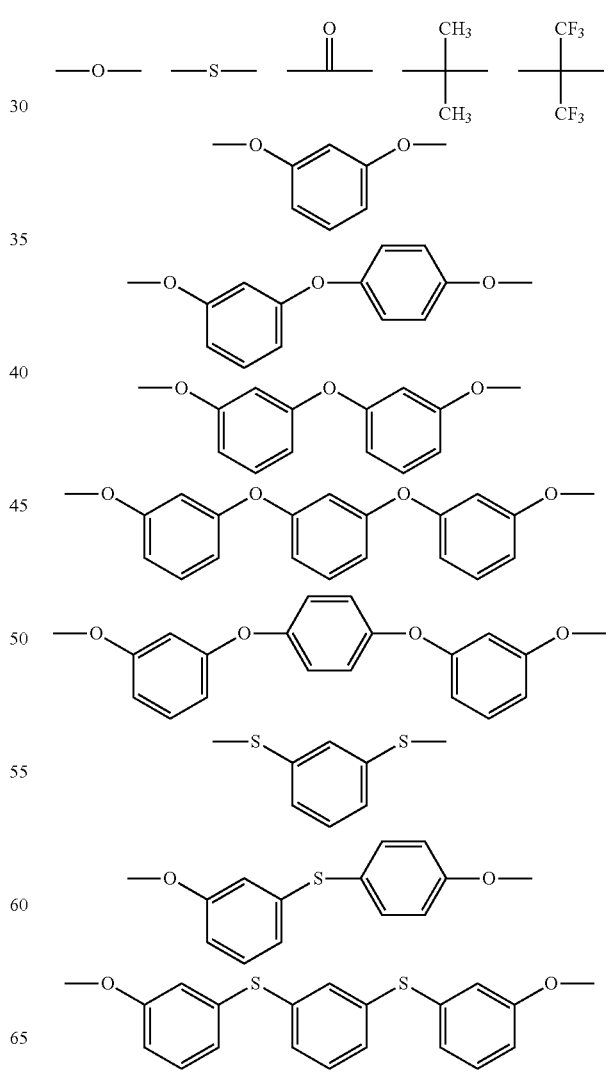

-continued

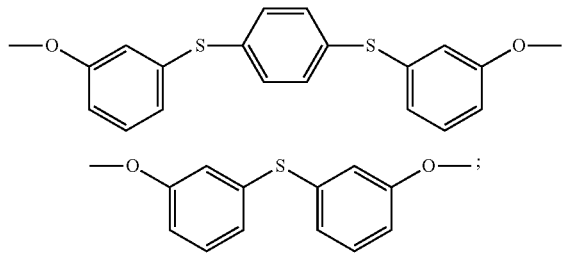

Y is a covalent bond, or a linking group having one of the following structures:

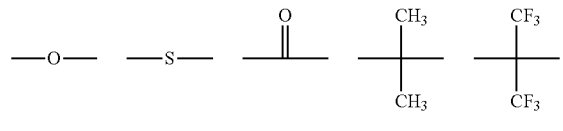

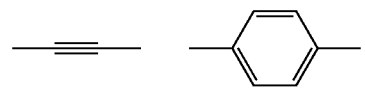

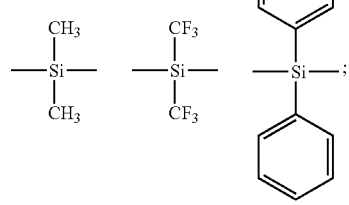

and
Z is one of the following structures:

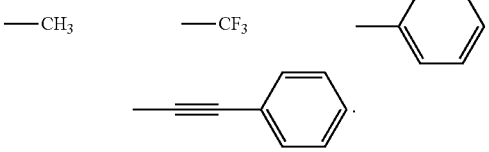

Applicants disclose the gold nanorod J-aggregate of Paragraph 0028 wherein said one or more homopolyimides comprise sulfide-containing endcaps, each of said one or more homopolyimides having Structure VIII or IX below:

Structure VIII

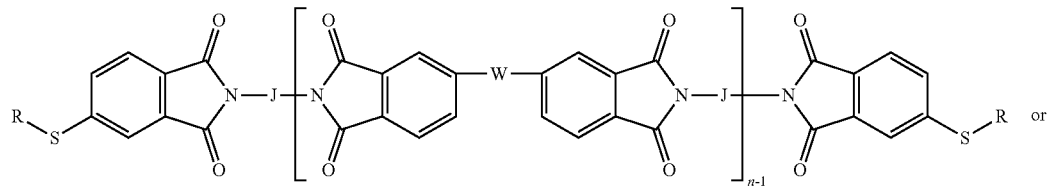

Structure IX

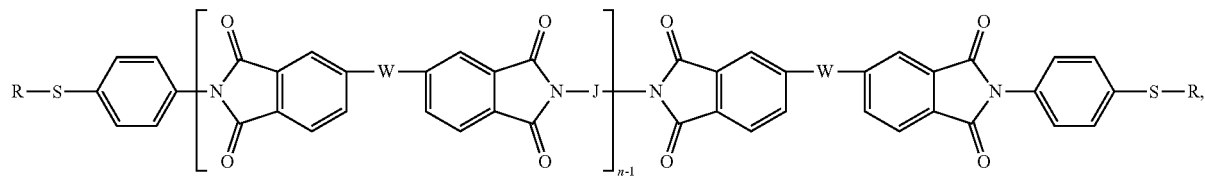

wherein:
a) for each homopolyimide the index n is independently an integer from 5 to 300, preferably index n is an integer from 10 to 100;
b) for each homopolyimide each W is independently a covalent bond, or a linking group having one of the following structures:

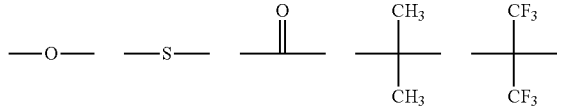

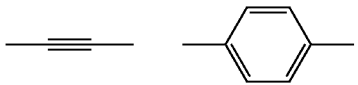

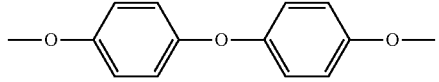

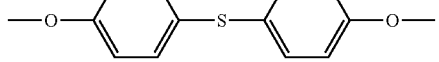

-continued
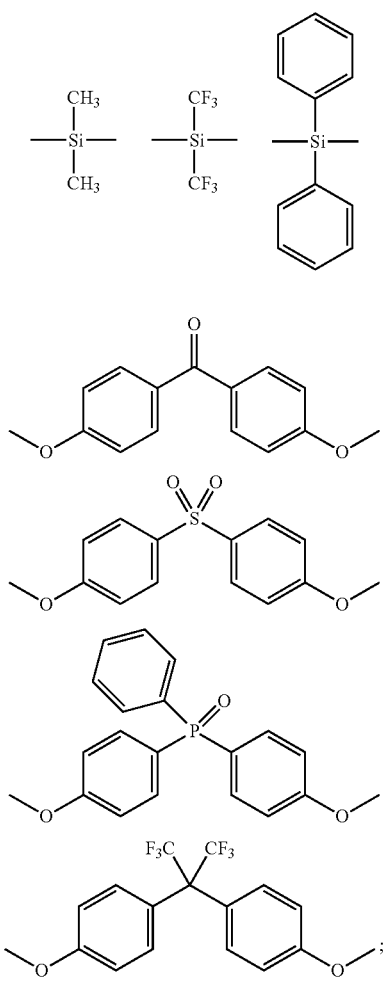
c) for each homopolyimide each R is independently Me, Et or Ph
d) for each homopolyimide, J is independently:
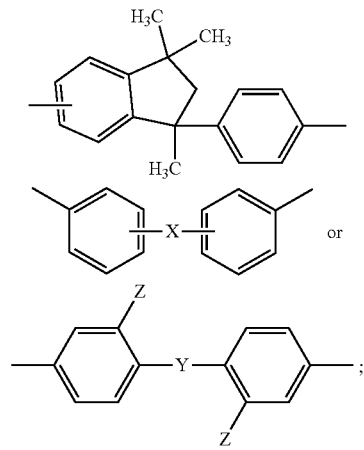
wherein:
i) for each homopolyimide X is independently a linking group having one of the following structures:
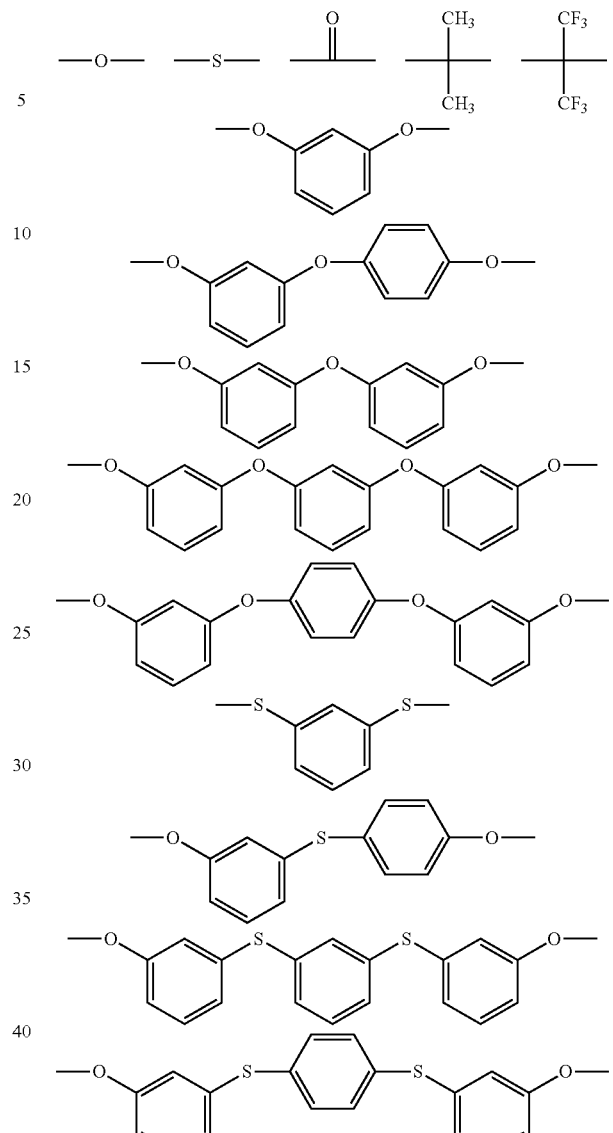
ii) for each homopolyimide, Y is independently a covalent bond, or a linking group having one of the following structures:
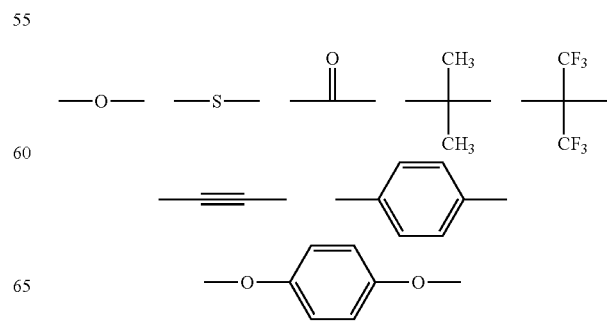

-continued

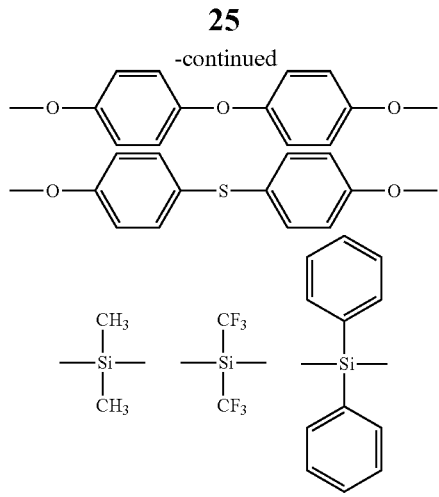

iii) for each homopolyimide, Z is independently one of the following structures:

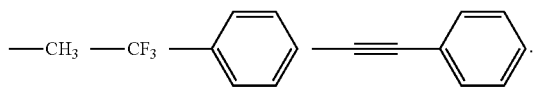

The gold nanorod J-aggregate of Paragraph 0029 comprising one or more copolyimides comprising sulfide-containing endcaps, said one or more copolyimides comprising sulfide-containing endcaps having Structure X or XI below:

Structure X

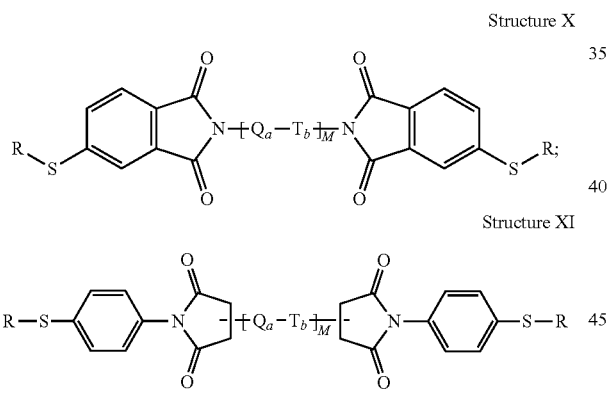

Structure XI wherein
a) the index M is independently an integer from 5 to 300, preferably index M is an integer from 10 to 100;
b) $Q_a$ and $T_b$ are as defined in Paragraph 0029; and
c) each R is independently Me, Et or Ph.

Applicants disclose the gold nanorod J-aggregate of Paragraph 0029 comprising one or more copolyimides comprising sulfide-containing endcaps and sulfides in said one or more copolyimides backbone:

Structure XII

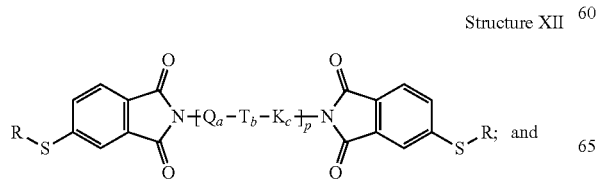

Structure XIII

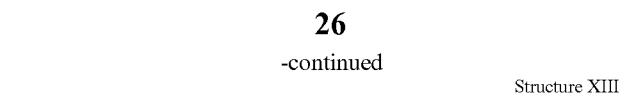

wherein
a) each K has the following structure;

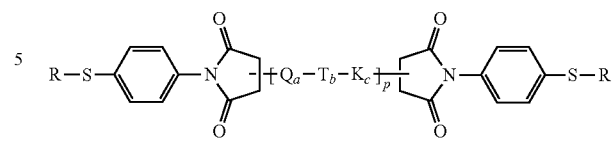

and
for K
(i) the index m is 1 or 2 (m=1=sulfide and m=2=disulfide); and
(ii) L is a covalent bond, or a linking group having one of the following structures:

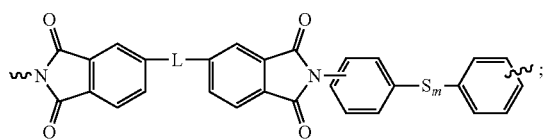

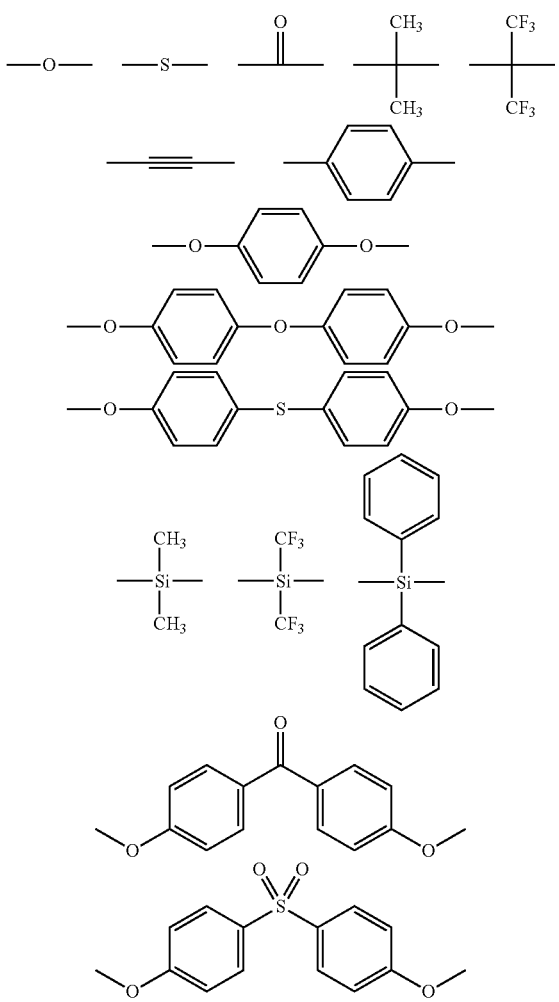

-continued

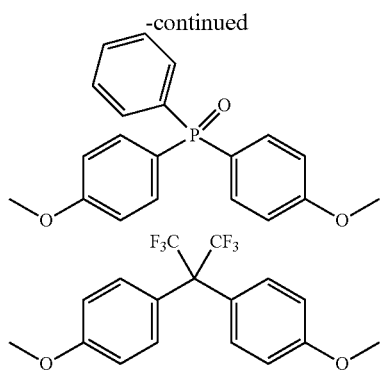

b) Q and T are as defined in Paragraph 0029;
c) the subscripts a, b and c are molar fractions of Q, T and K, with the proviso that a, b and c are positive numbers, each with the range of 0.05 to 0.95 and the sum of which is 1;
d) the index p is independently an integer from 5 to 300, preferably index p is an integer from 10 to 100; and
e) each R is independently Me, Et or Ph.

The gold nanorod J-aggregate of Paragraph 0027 comprising a physical mixture of polyimides selected from the group consisting of:

a) a mixture of homopolyimides, said mixture of homopolyimides comprising homopolyimides selected from homopolyimides having Structure IXa below wherein W and n are as defined in Paragraph 0028; and Structure IXb below wherein W, X and n are as defined in Paragraph 0028:

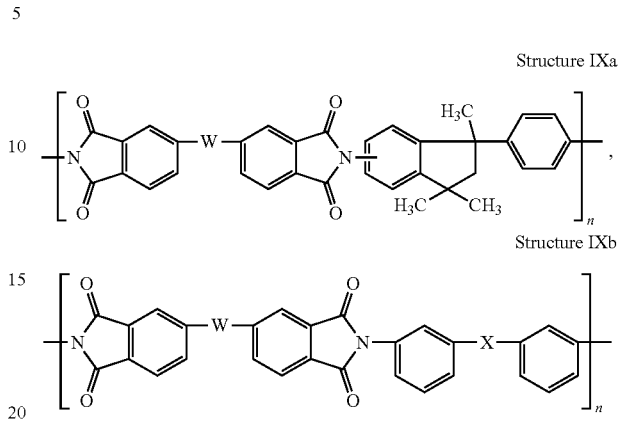

b) a mixture of homopolyimides, said mixture of homopolyimides comprising homopolyimides selected from homopolyimides having Structure IXa above wherein W and n are as defined in Paragraph 0028; and Structure IXc below wherein W, Z, Y, and n are as defined in Paragraph 0028:

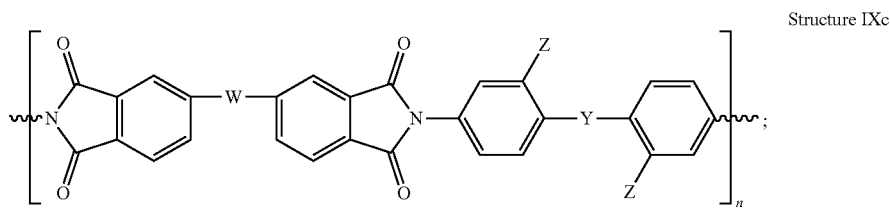

c) a mixture of homopolyimides, said mixture of homopolyimides comprising homopolyimides selected from homopolyimides having Structure IXb above wherein W, X and n are as defined in Paragraph 0028; and Structure IXc above wherein W, Y, Z and n are as defined in Paragraph 0028;
d) a mixture of homopolyimides, said mixture of homopolyimides comprising homopolyimides selected from homopolyimides having Structure IXa above wherein W and n are as defined in Paragraph 0028; Structure IXb above wherein W, X and n are as defined in Paragraph 0028; and Structure IXc above wherein W, Y, Z and n are as defined in Paragraph 0028;
e) a mixture of binary copolyimides, said mixture of binary copolyimides comprising binary copolyimides selected from copolyimides having Structure Xa wherein W, X, x and n are as defined in Paragraph 0029; and Structure Xb below wherein W, Z, Y, x, and n are as defined in Paragraph 0029:

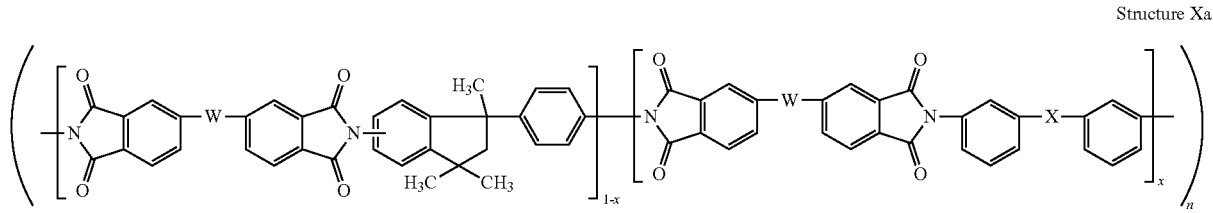

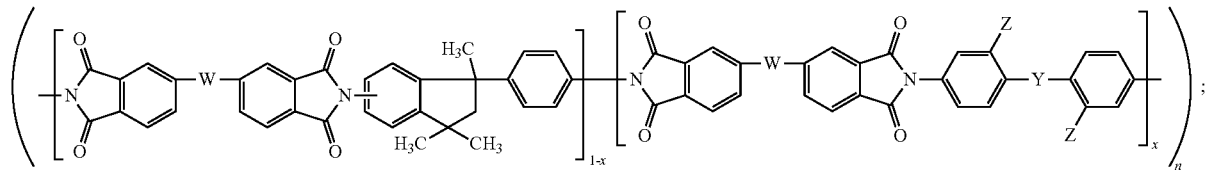

Structure Xb f) a mixture of binary copolyimides, said mixture of binary copolyimides comprising binary copolyimides selected from copolyimides having Structure Xc below wherein W, Z, Y, X, x and n are as defined in Paragraph 0029:

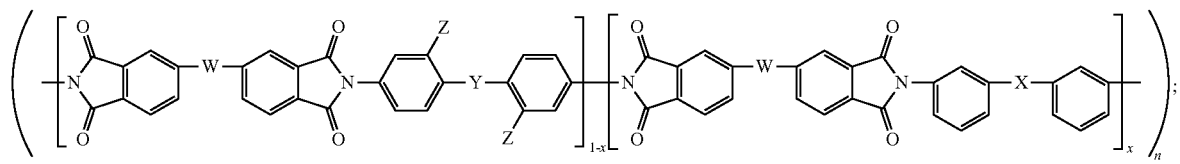

Structure Xc g) a mixture of binary copolyimides, said mixture of binary copolyimides comprising binary copolyimides selected from copolyimides having Structure Xb above wherein W, Z, Y, x, and n are as defined in Claim 5 and Xc above wherein W, Z, Y, X, x and n are as defined in Paragraph 0029 h) a mixture of binary copolyimides, said mixture of binary copolyimides comprising binary copolyimides selected from copolyimides having Structures Xa above wherein W, X, x and n are as defined in Paragraph 0029; Xb above wherein W, Z, Y, x, and n are as defined in Paragraph 0029; and Xc above wherein W, Z, Y, X, x and n are as defined in Paragraph 0029;

i) a mixture of sulfide-containing homopolyimides, said mixture of sulfide-containing homopolyimides comprising sulfide-containing homopolyimides selected from homopolyimides having Structure XI below wherein W, m and n are as defined in Paragraph 0030:

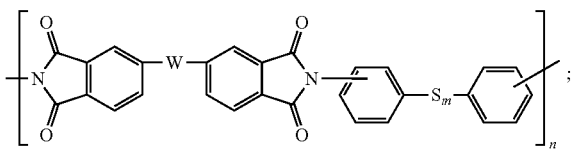

Structure XI j) a mixture of sulfide-containing binary copolyimides, said mixture of sulfide-containing binary copolyimides comprising sulfide-containing binary copolyimides selected from copolyimides having Structure XII below wherein W, J, T, m, x, and n are as defined in Paragraph 0031;

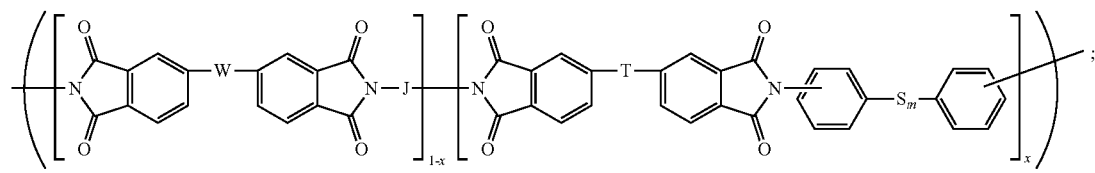

Structure XII k) a mixture of sulfide-containing ternary copolyimides, said mixture of sulfide-containing ternary copolyimides comprising sulfide-containing ternary copolyimides selected from copolyimides having Structure XIIIa below wherein W, X, L, m, x, a, b and p are as defined in Paragraph 0032; Structure XIIIb below wherein W, Z, Y, L, m, x, a, b, and p are as defined in Paragraph 0032; and Structure XIIIc below wherein W, Z, Y, L, m, x, a, b, and p are as defined in Paragraph 0032;

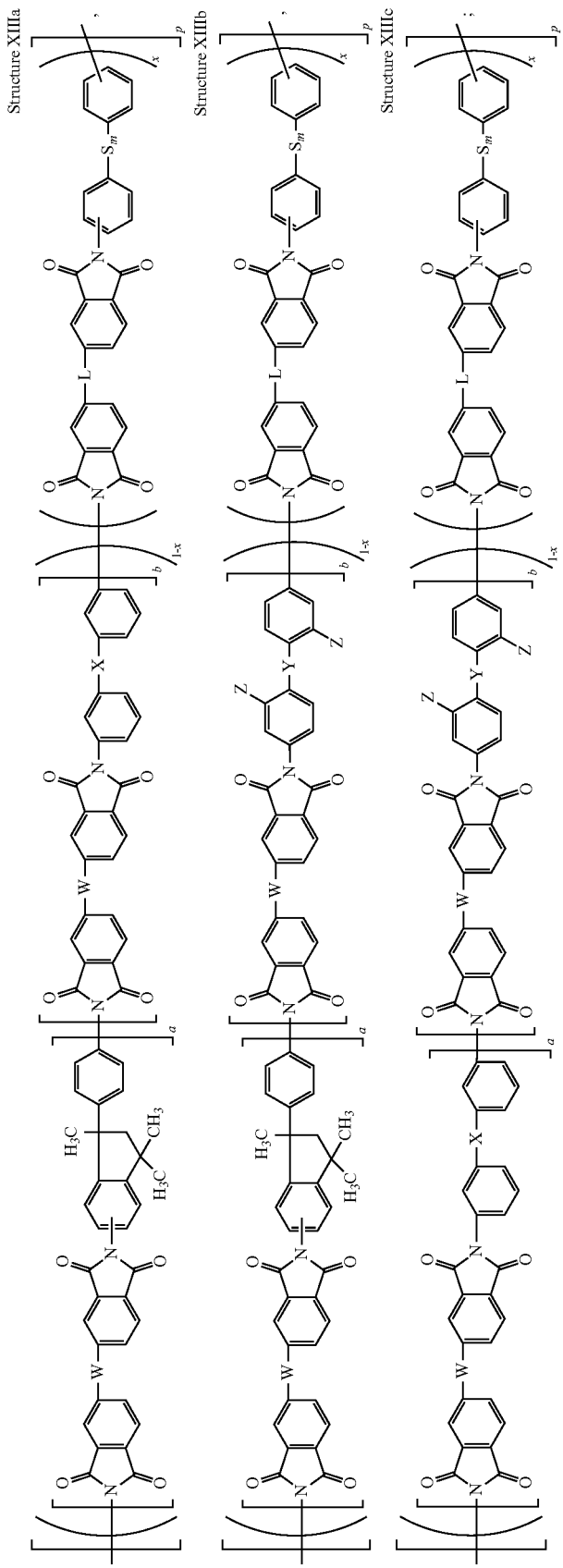

l) a mixture of homopolyimides having sulfide-containing endcaps, said mixture homopolyimides having sulfide-containing endcaps comprising homopolyimides having sulfide-containing endcaps selected from homopolyimides having Structure XIV below wherein R, J, W and n are as defined in Paragraph 0033; and Structure XV below wherein R, W, J, and n are as defined in Paragraph 0033:

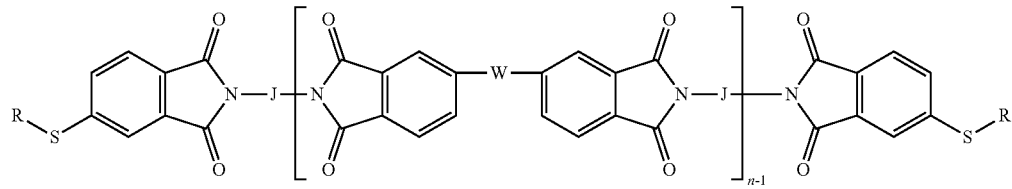

Structure XIV

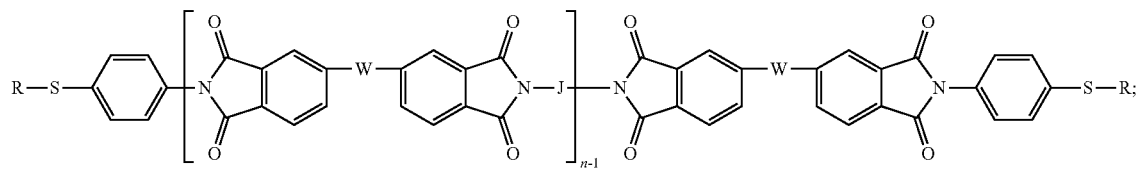

Structure XV m) a mixture of binary copolyimides having sulfide-containing endcaps, said mixture binary copolyimides having sulfide-containing endcaps comprising binary copolyimides having sulfide-containing endcaps selected from copolyimides having Structure XVI below wherein R, Q, T, a, b, and M are as defined in Paragraph 0034; and Structure XVII below wherein R, Q, T, a, b and M are as defined in Paragraph 0034:

Structure XVI

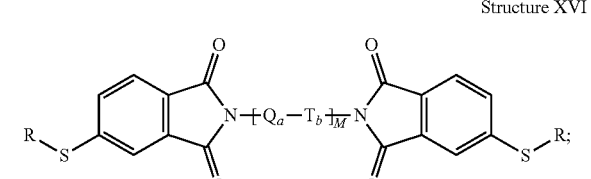

Structure XVII

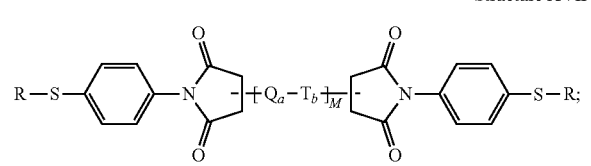

n) a mixture of ternary copolyimides having sulfide-containing endcaps, said mixture ternary copolyimides having sulfide-containing endcaps comprising ternary copolyimides having sulfide-containing endcaps selected from copolyimides having Structure XVIII below wherein R, Q, T, K, a, b, c, and p are as defined in Paragraph 0035; and Structure XIX below wherein R, Q, T, K, a, b, c and p are as defined in Paragraph 0035:

Structure XVIII

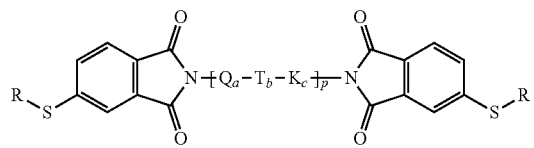

-continued

Structure XIX

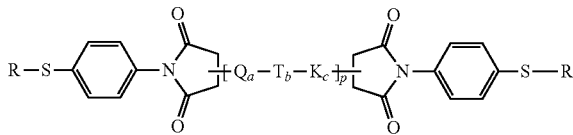

Applicants disclosed the gold nanorod J-aggregate of Paragraphs 0025 through 0036, wherein said polyimide has a number-average molecular weight of from about 1,000 g/mol to about 300,000 g/mol, preferably said polyimide has a number-average molecular weight of from about 2,000 g/mol to about 200,000/mol, more preferably said polyimide has a number-average molecular weight of from about 2,000 g/mol to about 100,000 g/mol.

Applicants disclose the gold nanorod J-aggregate of Paragraphs 0025 through 0037, said gold nanorod J-aggregate having a localized surface plasmonic resonance band covering the range from 1500 nm to 2,000 nm.

Applicants disclose the gold nanorod J-aggregate of Paragraphs 0025 through 0038, said gold nanorod J-aggregate comprising, based on total gold nanorod J-aggregate weight, from about 0.01% to about 10% gold nanorod, preferably said gold nanorod J-aggregate comprises, based on total polyimide/AuNR weight, more preferably said gold nanorod J-aggregate d comprises, based on total gold nanorod J-aggregate weight, from about 0.02% to about 5% gold nanorod, most preferably said gold nanorod J-aggregate comprises, based on total gold nanorod J-aggregate weight, from about 0.05% to about 2% gold nanorod.

Applicants disclose a polymer-matrix composite system comprising a gold nanorod J-aggregate of Paragraphs 0025 through 0039 and a second polymer as matrix component selected from the group consisting of polyimides, polyacrylate, polycarbonate, polyesters, polyethylene, polystyrene, polyamide, polyacrylamide and mixtures thereof, preferably said second polymer selected from the group consisting of polyimides, polycarbonate, polyacrylate and mixtures thereof, more preferably said second polymer selected from the group consisting of polyimide, polyester, polycarbonate, polyacrylate, polycarbonate, polystyrene and mixtures thereof, most preferably said second polymer selected from the group consisting of polyimide, polycarbonate, polyester, and polyacrylate mixtures thereof.

Applicants disclose an article comprising a gold nanorod J-aggregate according to Paragraphs 0025 through 0039 and/or a matrix according to Paragraph 0040.

Applicants disclose an article according to Paragraph 0041, said article is selected from the group consisting of-plasmonic imager, a therapeutic and a sensors, an optical coating, preferably a large-area optical coating, a filter, an attenuator, and polarizers. Such articles can be made by using the teachings of the present specification in combination with the teachings of one or more of the following references that teach how to incorporate materials in general in articles. The gold nanorod J-aggregates of the present invention can be incorporated into material systems and devices useful as plasmon-enhanced imaging systems for diagnostics, a therapeutics, sensors, optical coatings, preferably a large-area optical coatings, filters, attenuators, and polarizers. The following list of US patents and published US applications along with the teachings of this specification teach the use of gold nanorods in the medical diagnostics with "high-resolution optical molecular imaging systems"; bio-sensing with devices designed for high-throughput drug screening and/or disease screening, and monitoring for the progress of aggressive cancerous diseases; therapeutic agents in photothermal therapy to inhibit cancer cell growth and migration; production of polarizing plates, films and coatings for anti-glare windows and windshields: De la Zerda, A.; Liba, O.; Sorelle, E.; Knysh, B.: High-resolution optical molecular imaging systems, compositions, and methods using gold nanoparticles USPA No. 2018/0264144 A1 (The Board of Trustees of the Leland Stanford Junior University, USA); Rantala, J.: Optical films comprising siloxane polymers and noble metal particles and devices having the same, USPA No. 2018/0284331 A1. (Inkron Oy, Finland; Yoon, D. K.; Cha, Y. J.: (3) Method for preparing coating layer having highly aligned nanomaterial in lyotropic liquid crystal matrix, USPA No. 2019/0056545 A1. (Korea Advanced Institute of Science and Technology, S. Korea; Yin, A.; Duan, X.: (9) Nanoscale optical voltage sensors, USPA No. 2020/0249160 A1. (The Regents of the University of California, USA; Quan, Q.; Hong, W.; Loncar, M.: (4) Systems and methods for making and using sensors, probes, and other devices USPA No. 2017/0265788 A1. (President and Fellows of Harvard College, USA; Soennichsen, C.; Lambertz, C.; Ahij ado-Guzman, R.; Prasad, J.: Method for detecting and/or quantifying the binding affinities of a target molecule to a plurality of different binding partners by plasmon resonance of nanoparticles and a position-encoded sensor therefor, USPA No. 2015/0369801 A1. (Germany); Matsunami, Y.: (7) Composite metal nanorod, composite metal nanorod-containing composition, and polarization material, USPA No. 2010/0046072 A1; (Fujifilm Corporation, Japan); Kamada, K.; Matsunami, Y.; Katagiri, K.; Agata, Y.: (8) Method for producing polarizing plate, and automobile's windshield, USPA No. 2010/0060985 A1. (Fujifilm Corporation, Japan); O'Malley, S. M.: (6) Light-polarizing article and process for making same, USPA No. 2009/0059367 A1. (Corning Inc., USA); Tan, Y. N.; Zheng, X.; Ghadessy, F.; Goh, W. L. P.; Lane, D.; Yung, L.-Y. L.: (Bio-sensing) Dynamic light scattering nanoplatform for identifying sequence-specific transcription factor DNA interactions for high-throughput drug screening and/or disease screening, USPA No. 2018/0172678 A1. (National University of Singapore, Singapore; Agency for Science, Technology and Research); El-Sayed, M. A.; Ali, M. R. K.: Methods for inhibiting cancer cell migration with gold nanomaterials and photothermal therapy, USPA No. 2019/0008964 A1; Bhowmick, N. A.; Choudhury, D.: Methionine metabolites predict aggressive cancer progression, USPA No. 2015/0204882 A1. (Cedars-Sinai Medical Center, USA); Smeltzer, M. S.; Zharov, V.; Galanzha, E.; Chen, J.; Meeker, D.; Beenken, K.: (13) In vivo photoacoustic and photothermal nano-theranostics of biofilms, USPA No. 2015/0335741 A1. (University of Arkansas, USA). On the basis that gold nanorods are the critical materials in the device applications that are exemplified by the above-mentioned US patents and published US applications, the gold nanorod J-aggregates of the present invention may be substituted for the gold nanorods of these applications.

Applicants disclose a process of making a gold nanorod J-aggregate, said process comprising:
 a) combining;
  (i) a first solution comprising a solvent selected from the group consisting of 1-methylpyrrolidinone, N,N-dimethylacetamide, N,N-dimethylformamide, tetrahydrofuran, dichloromethane, chloroform, 1,4-dioxine and a mixtures thereof; and gold nanorods; and
  (ii) a second solution comprising a solvent selected from the group consisting of 1-methylpyrrolidinone, N,N-dimethylacetamide, propylene carbonate, tetrahydrofuran, 1,4-dioxine, ethyl acetate, acetone, dichloromethane, chloroform, ethanol, methanol, isopropanol and mixtures thereof and one or more polyimides,
 said one or more polyimides having a solubility of at least 5 g/L at 25° C. at 1 atmosphere of pressure in said first solution's solvent and said second solution's solvent;
 said first solution and said second solution being combined in a ratio of from 0.1:1 to about to about 10:1, preferably said first solution and said second solution are combined in a ratio of from about 0.2:1 to about 5:1, most preferably said first solution and said second solution are combined in a ratio of from about 0.5:1 to about 2:1; preferably the concentration of gold nanorods in said first solution is from about 0.01 nM to about 10 nM and the concentration of polyimide in said second solution is from about 0.1 g/L to about 1000 g/L; more preferably the concentration of gold nanorods in said first solution is from about 0.02 nM to about 5 nM and the concentration of polyimide in said second solution is from about 0.2 g/L to about 100 g/L; most preferably the concentration of gold nanorods in said first solution is from about 0.05 nM to about 2 nM and the concentration of polyimide in said second solution is from about 1 g/L to about 100 g/L;
 b) combining:
  (i) a solution comprising a solvent, said solvent being selected from the group consisting of 1-methylpyrrolidinone, N,N-dimethylacetamide, N,N-dimethylformamide, tetrahydrofuran, dichloromethane, chloroform, 1,4-dioxine and mixtures thereof, gold nanorods and one or more polyimides; and
(ii) a second solvent selected from the group consisting of 1-methylpyrrolidinone, N,N-dimethylacetamide, propylene carbonate, tetrahydrofuran, 1,4-dioxine, ethyl acetate, acetone, dichloromethane, chloroform, ethanol, methanol, isopropanol and mixtures thereof;
said one or more polyimides having a solubility of at least 5 g/L at 25° C. at 1 atmosphere of pressure in said first solution's solvent and said second solvent; said solution and said second solvent being combined in a ratio of from 0.1:1 about to about 10:1, preferably said solution and said second solvent are combined in a ratio of from about 0.2:1 to about 5:1, most preferably said solution and said second solvent are combined in a ratio of from about 0.5:1 to about 2:1; preferably the concentration of gold nanorods in said solution is from about 0.01 nM to about 10 nM and the concentration of polyimide in said solution is from about 0.1 g/L to about 1000 g/L; more preferably the concentration of gold nanorods in said solution is from about 0.02 nM to about 5 nM and the concentration of polyimide in said solution is from about 1 g/L to about 200 g/L; most preferably the concentration of gold nanorods in said solution is from about 0.05 nM to about 2 nM and the concentration of polyimide in said solution is from about 5 g/L to about 100 g/L; or c) combining:
(i) a first solution comprising a solvent and gold nanorods, said solvent being selected from the group consisting of 1-methylpyrrolidinone, N,N-dimethylacetamide, propylene carbonate, tetrahydrofuran, 1,4-dioxine, ethyl acetate, acetone, dichloromethane, chloroform, ethanol, methanol, isopropanol and mixtures thereof, and
(ii) a second solution comprising a solvent selected from the group consisting of 1-methylpyrrolidinone, N,N-dimethylacetamide, tetrahydrofuran, dichloromethane, chloroform, 1,4-dioxine and mixtures thereof and one or more polyimides;
said one or more polyimides having a solubility of at least 5 g/L at 25° C. at 1 atmosphere of pressure in said first solution's solvent and said second solution's solvent; said first solution and said second solution being combined in a ratio of from 0.01:1 about to about 10:1, preferably said first solution and said second solution are combined in a ratio of from about 0.1:1 to about 5:1, most preferably said first solution and said second solution are combined in a ratio of from about 0.2:1 to about 2:1; preferably the concentration of gold nanorods in said first solution is from about 0.01 nM to about 10 nM and the concentration of polyimide in said second solution is from about 0.01 g/L to about 100 0 g/L; more preferably the concentration of gold nanorods in said first solution is from about 0.02 nM to about 5 nM and the concentration of polyimide in said second solution is from about 0.1 g/L to about 100 g/L; most preferably the concentration of gold nanorods in said first solution is from about 0.05 nM to about 2 nM and the concentration of polyimide in said second solution is from about 1 g/L to about 100 g/L.

Applicants disclose the process of Paragraph 0043 wherein said gold nanorods have an average aspect ratio of from about 2 to about 7, preferably said gold nanorods have an average aspect ratio of from about 5 to about 6.

Applicants disclose the process of Paragraphs 0043 through 0044 wherein said one or more polyimides is selected from the group consisting of one or more homopolyimides comprising endcaps and a backbone, said endcaps and/or said backbone comprising sulfur; one or more copolyimides comprising endcaps and a backbone, said endcaps and/or said backbone comprising sulfur; one or more homopolyimides; one or more copolyimides and mixtures thereof.

Applicants disclose the process of Paragraph 0045 wherein said one or more homopolyimides have Structure I below:

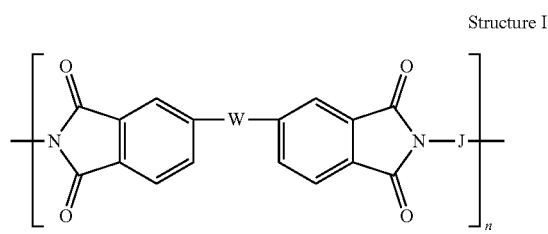

Structure I wherein:
a) for each homopolyimide the index n is independently an integer from 5 to 300, preferably index n is an integer from 10 to 100;
b) for each homopolyimide W is independently a covalent bond, or a linking group having one of the following structures:

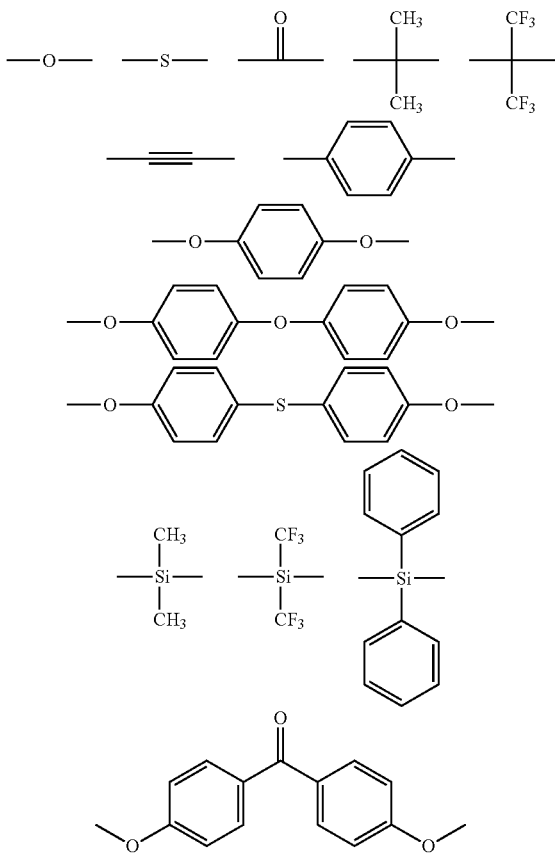

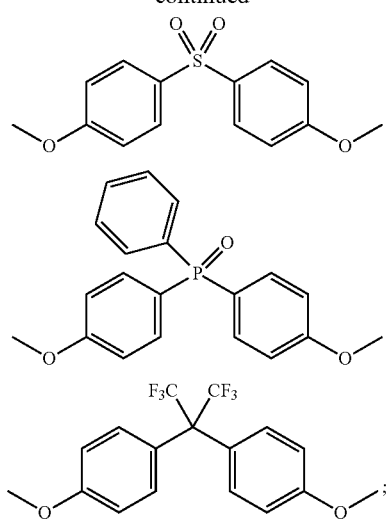
c) for each homopolyimide, J is independently:
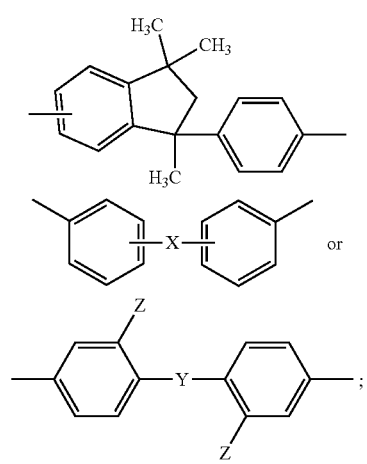
wherein:
i) for each homopolyimide X is independently a linking group having one of the following structures:
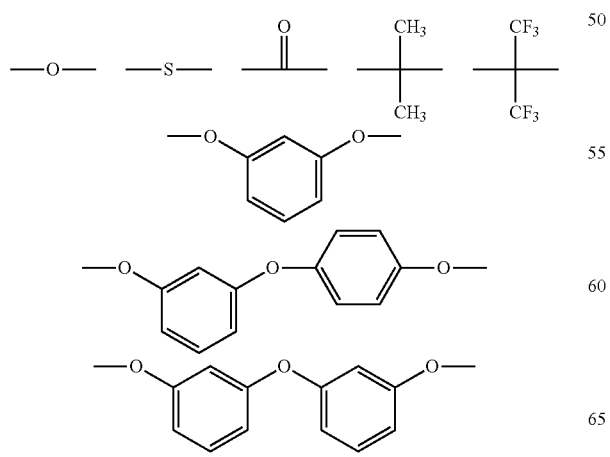
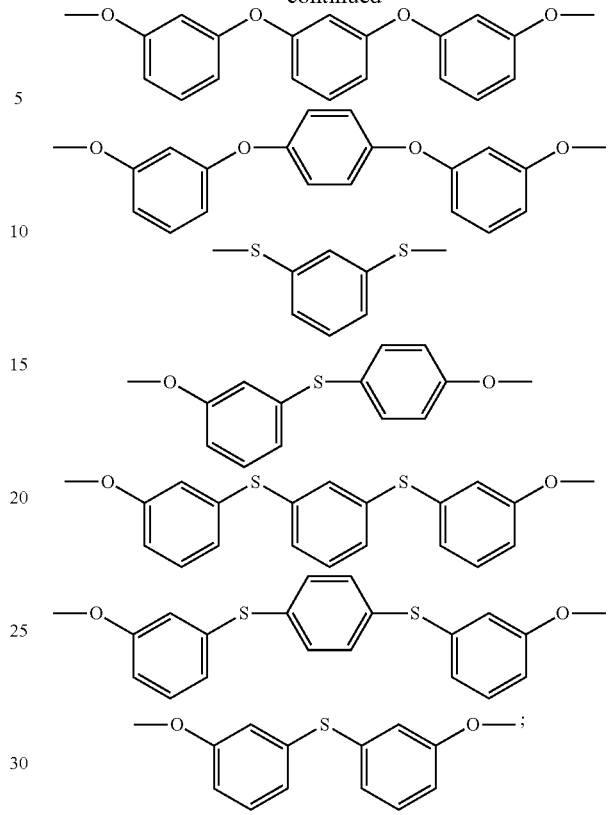
ii) for each homopolyimide, Y is independently a covalent bond, or a linking group having one of the following structures:
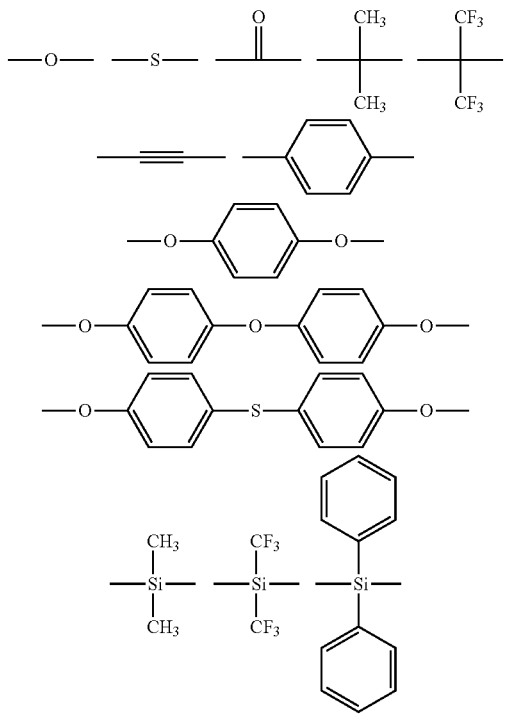

iii) for each homopolyimide, Z is independently one of the following structures:

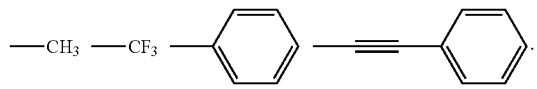

Applicants disclose the process of Paragraph 0045 wherein said copolyimides have Structure II below and wherein for each said of copolyimides the indices and variables provided in Structures II and III are independently selected:

Structure II the subscripts a and b are indices for the molar fractions of Q and T, each with the range of 0.05 to 0.95, respectively, and the sum of a and b is unity; and m is an integer from 5 to 300;

wherein Q and T are homopolyimides having Structure III below:

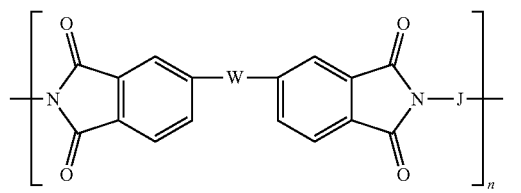

Structure III wherein a) for each homopolyimide Q and T, the index n is an integer from 5 to 300, preferably index n is an integer from 10 to 100;

b) for each homopolyimide Q and T, W is independently a covalent bond, or a linking group having one of the following structures:

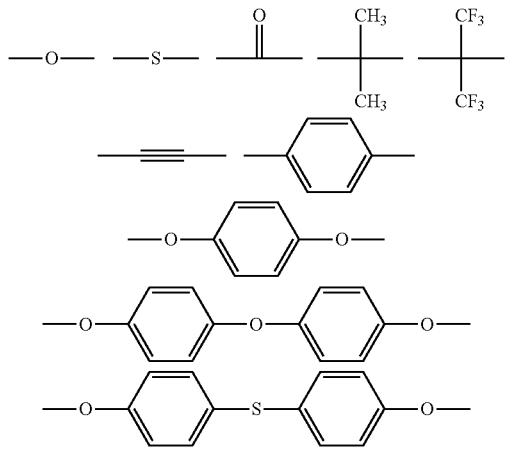

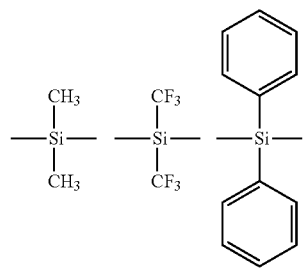

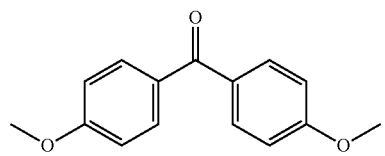

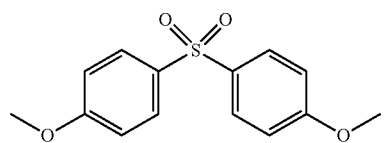

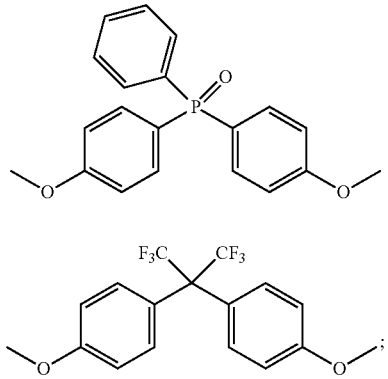

c) for each homopolyimide Q and T, J has one of the following structures with the proviso that J for Q and T is different:

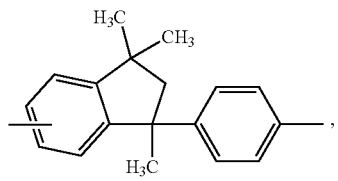

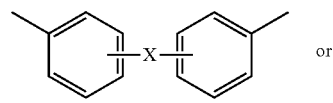

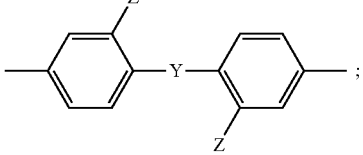

wherein:

i) X is a linking group having one of the following structures:

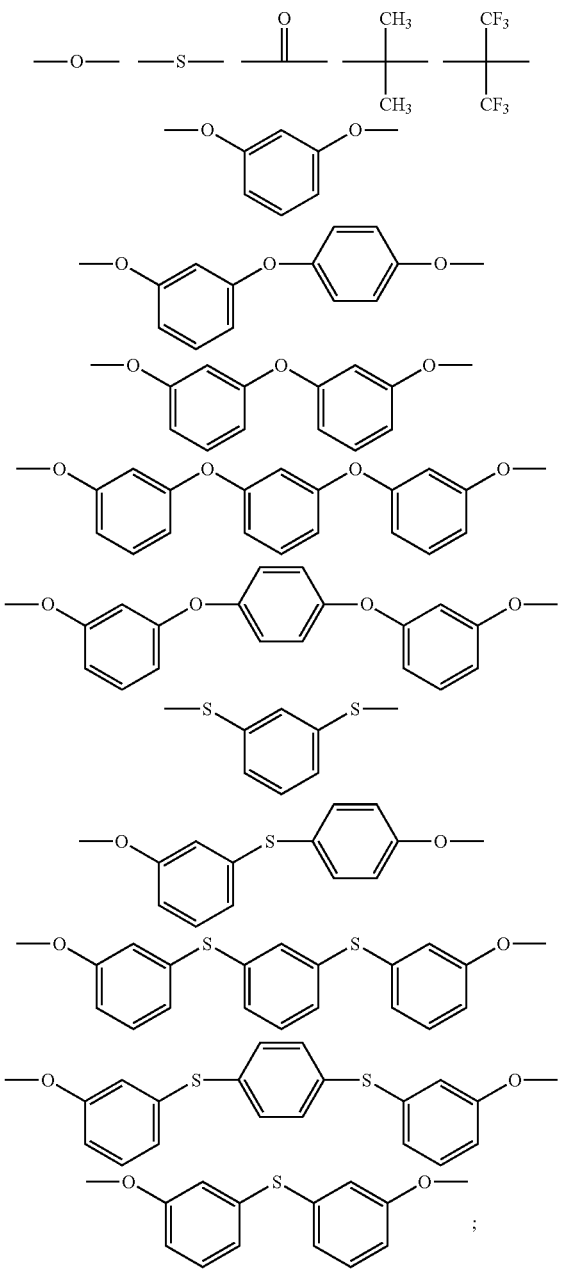

ii) Y is a covalent bond, or a linking group having one of the following structures:

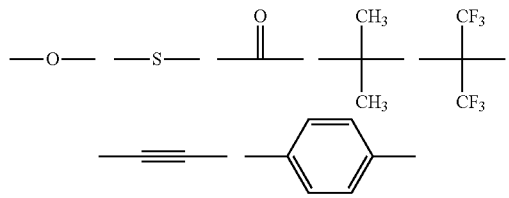

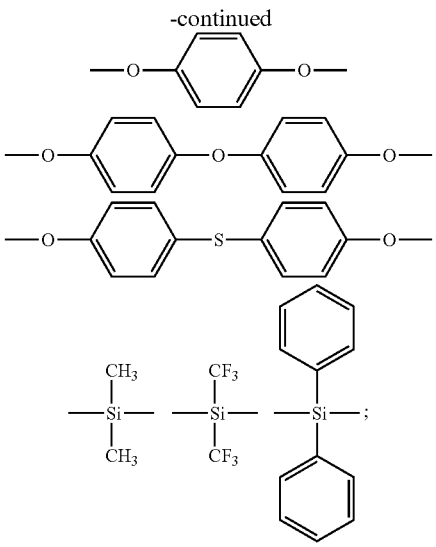

and iii) Z is one of the following structures:

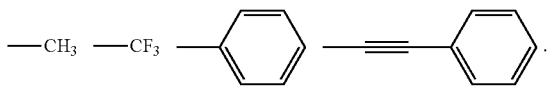

Applicants disclose the process of Paragraph 0045, wherein said one or more homopolyimides comprising endcaps and a backbone have Structure IV below and wherein for each said of homopolyimides the indices and variables provided in Structures IV are independently selected:

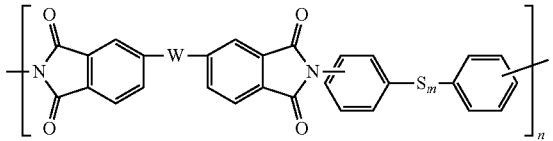

Structure IV a) the index n is an integer from 5 to 300, preferably each index n is an integer from 10 to 100;

b) W is a covalent bond, or a linking group having one of the following structures:

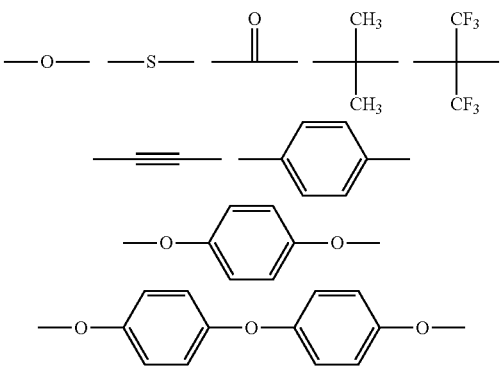

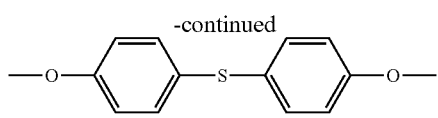

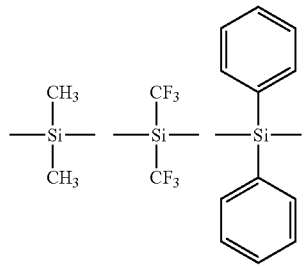

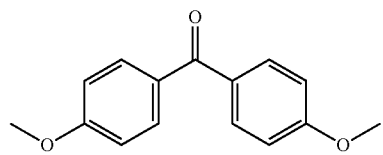

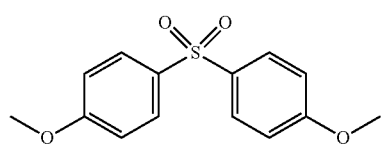

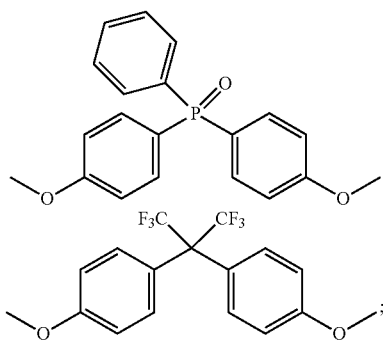

and
c) m is 1 or 2 (m=1=sulfide and m=2=disulfide).

Applicants disclose the process of Paragraph 0045 wherein said one or more copolyimides comprising end caps and a backbone have Structure V below and wherein for each of said copolyimide the indices and variables provided in Structures V are independently selected:

wherein for each copolyimide
a) the index n is independently an integer from 5 to 300, preferably index n is an integer from 10 to 100;
b) x is a non-zero number less than 1, and the ratio for x:(1−x) is 0.01:0.99 to 0.20:0.80, preferably the ratio for x:(1−x) is 0.01:0.99 to 0.10:0.90;
c) m is 1 or 2 (m=1=sulfide and m=2=disulfide);
d) T is a covalent bond, or a linking group having one of the following structures:

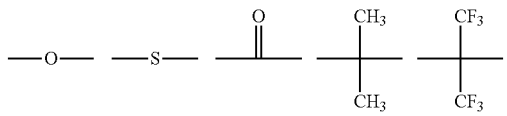

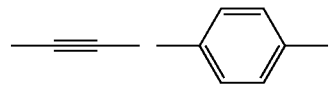

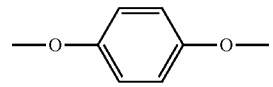

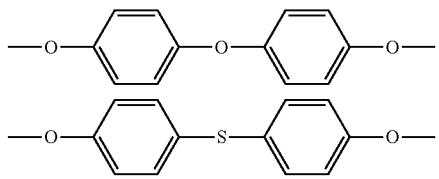

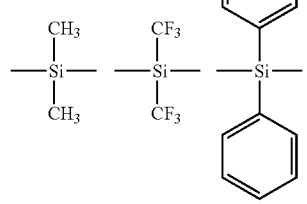

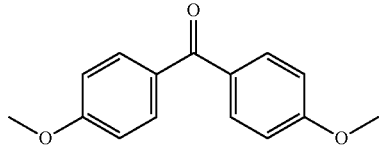

Structure V

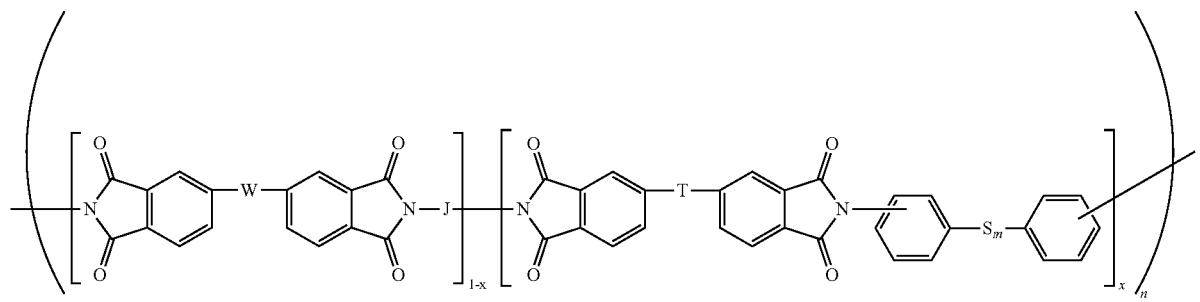

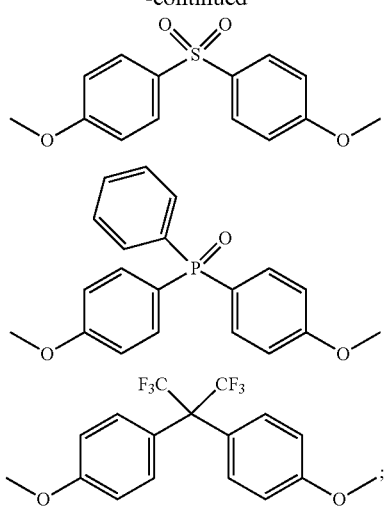
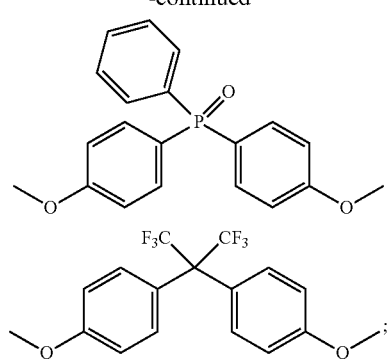
f) J is one of the following moieties:
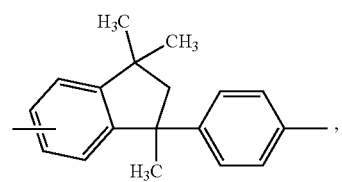
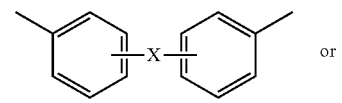
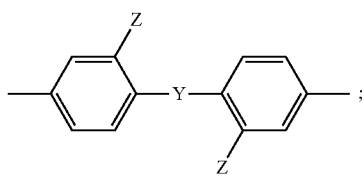
wherein:
i) X is a linking group having one of the following structures:
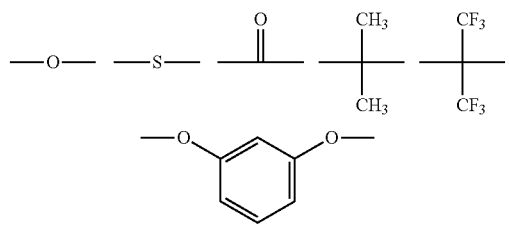
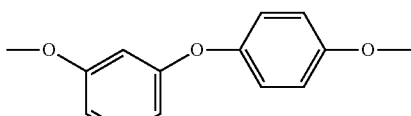
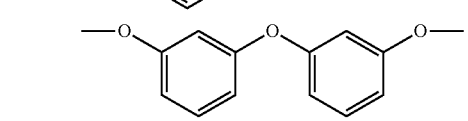
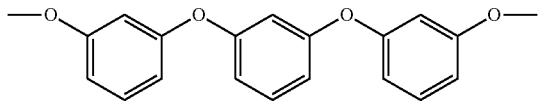
e) W is a covalent bond, or a linking group having one of the following structures:
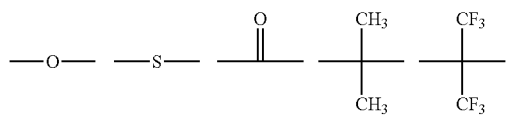
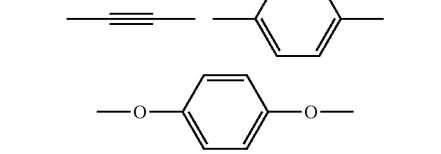
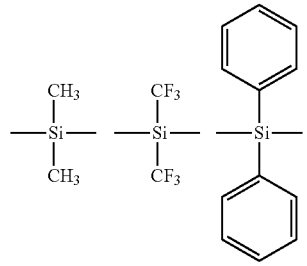
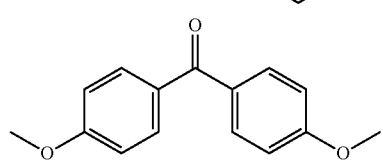
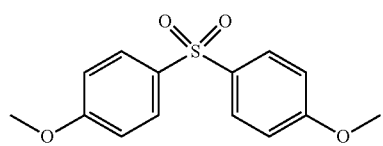

-continued

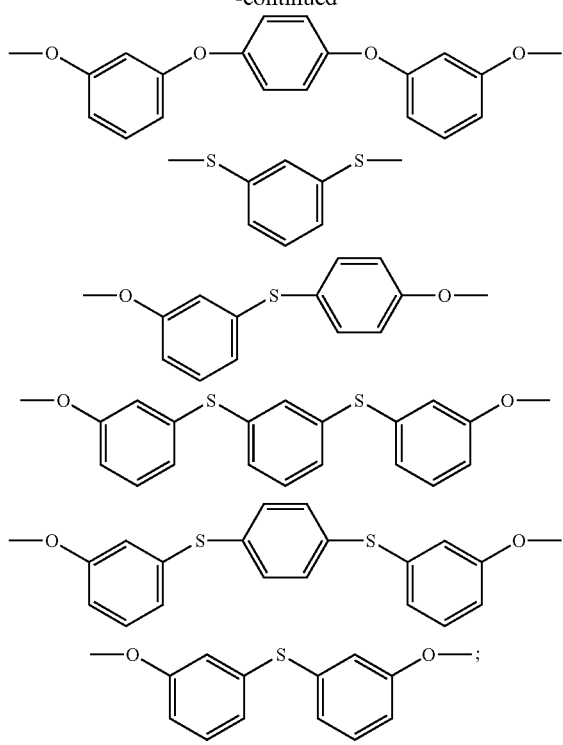

ii) Y is a covalent bond, or a linking group having one of the following structures:

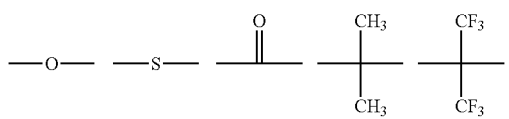

-continued

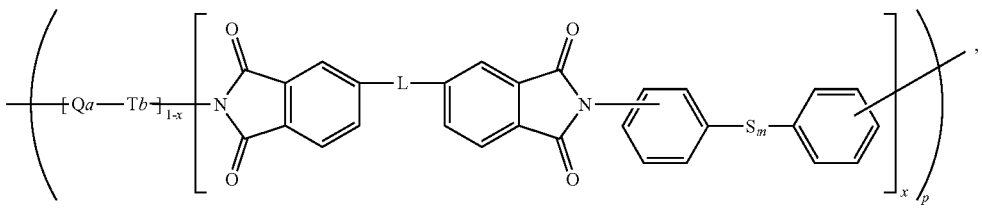

and iii) Z is one of the following structures:

—CH₃  —CF₃  [phenyl]  [phenylacetylene].

Applicants disclose the process of Paragraph 0045 wherein said one or more copolyimides comprising endcaps and a backbone, said endcaps and/or said backbone comprising sulfur, have Structure VI below and wherein for each of said copolyimides the indices and variables provided in Structures VI are independently selected:

Structure VI $$\left( \left[ Q_a - T_b \right]_{1-x} - N \underset{O}{\overset{O}{\bigcirc}} - L - \underset{O}{\overset{O}{\bigcirc}} N - \bigcirc - S_m - \bigcirc \right]_x \right)_p$$

a) the index p is independently an integer from 5 to 300, preferably index p is an integer from 10 to 100;
b) x is a non-zero number less than 1, and the ratio for x:(1−x) is 0.01:0.99 to 0.20:0.80, preferably the ratio for x:(1−x) is 0.01:0.99 to 0.10:0.90;
c) the subscripts a and b are indices for the molar fractions of Q and T, each with the range of 0.05 to 0.95, respectively, and the sum of a and b is unity;
d) the index m is 1 or 2 (m=1=sulfide and m=2=disulfide);
e) L is a covalent bond, or a linking group having one of the following structures:

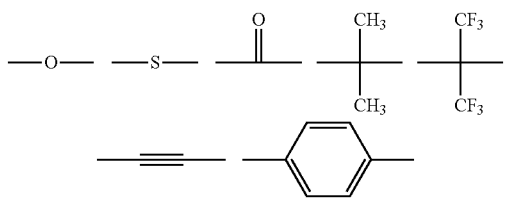

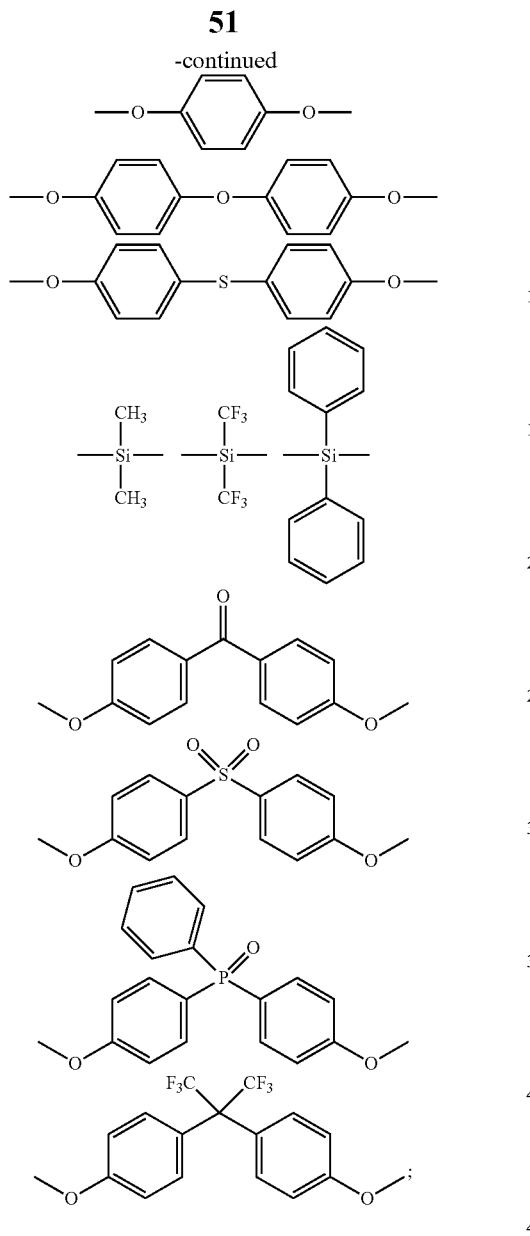

f) Q and T are homopolyimides having Structure VII below:

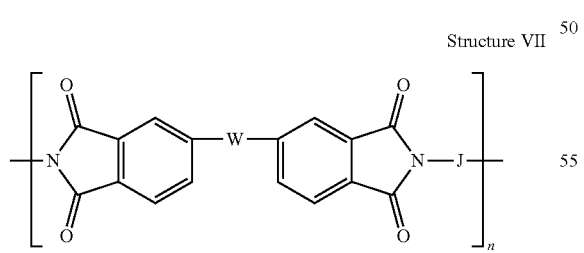

Structure VII wherein
  i) for each homopolyimide Q and T, the index n is an integer from 5 to 300, preferably index n is an integer from 10 to 100;
  ii) for each homopolyimide Q and T, W is independently a covalent bond, or a linking group having one of the following structures:

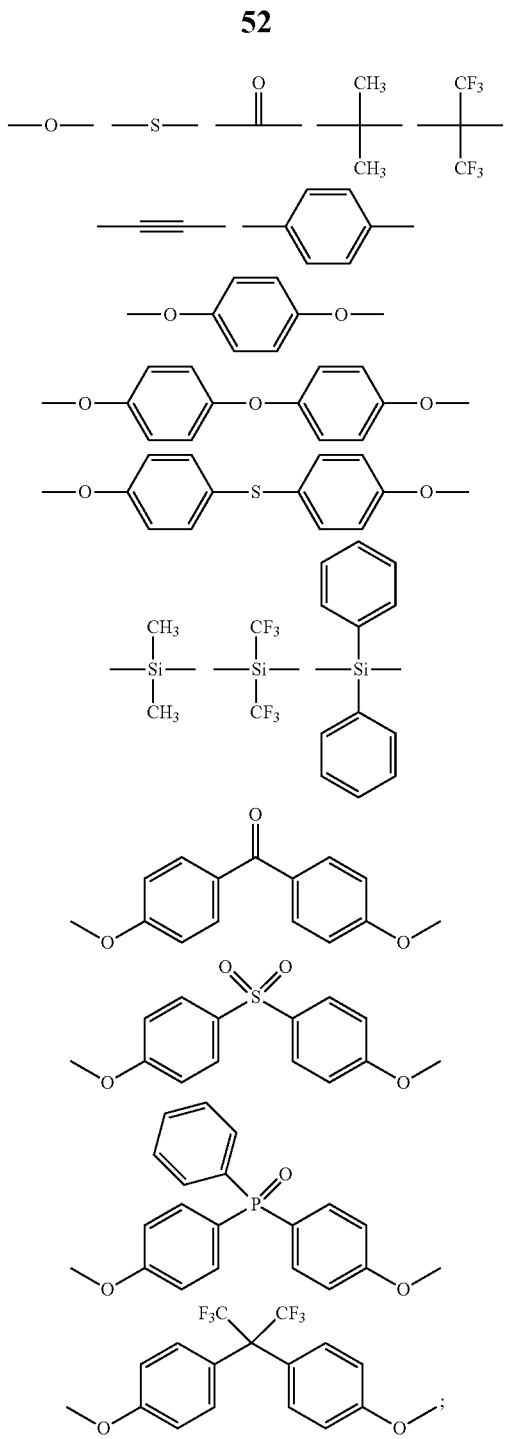

iii) for each homopolyimide Q and T, J has one of the following structures with the proviso that J for Q and T is different:

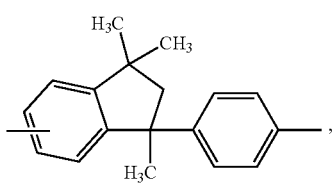

-continued

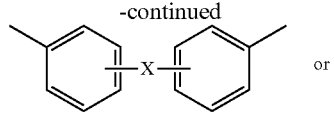  or

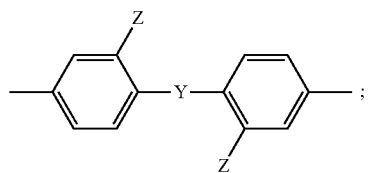  ;

wherein:

X is a linking group having one of the following structures:

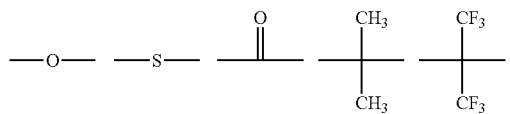

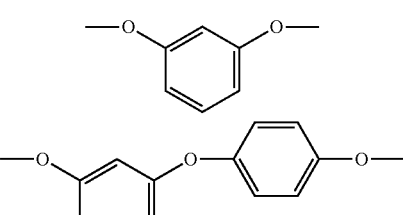

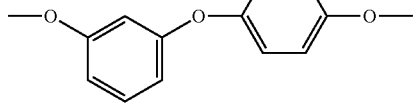

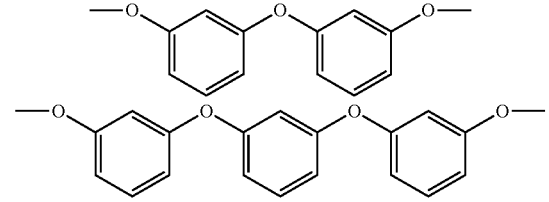

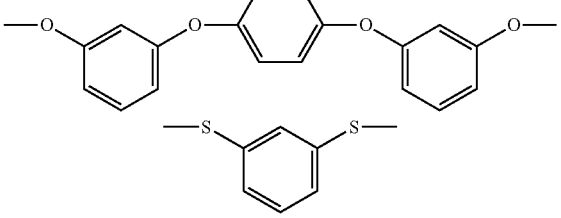

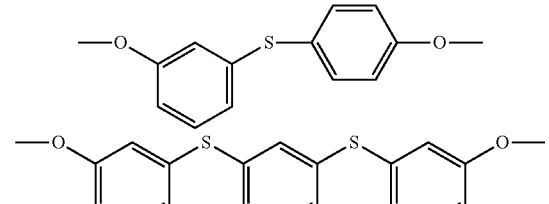

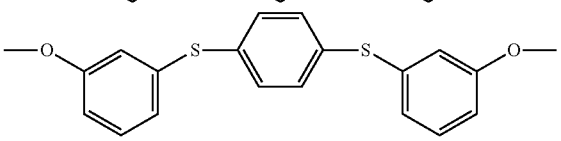

-continued

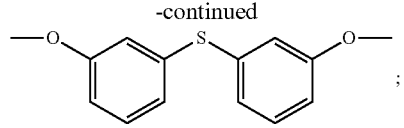  ;

Y is a covalent bond, or a linking group having one of the following structures:

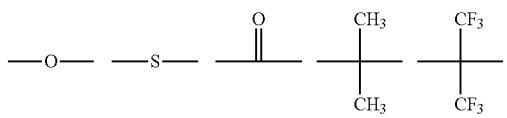

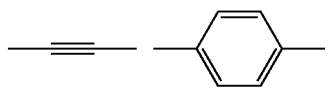

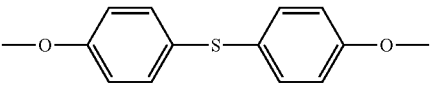

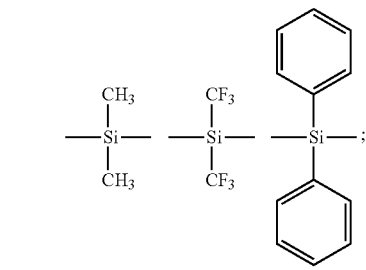

and

Z is one of the following structures:

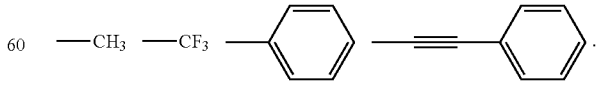  .

Applicants disclose the process of Paragraph 0045 wherein said one or more homopolyimides that comprise endcaps and a backbone, said endcaps and/or said backbone comprising sulfur, have Structure VIII or IX below:

Structure VIII

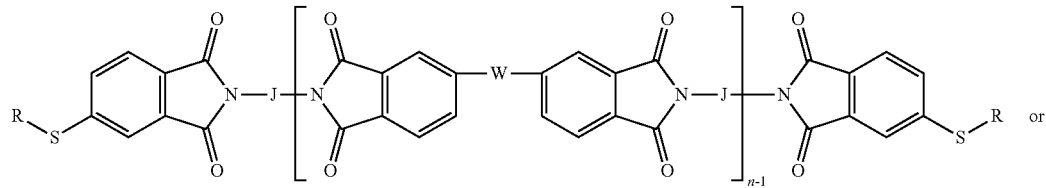

or

Structure IX

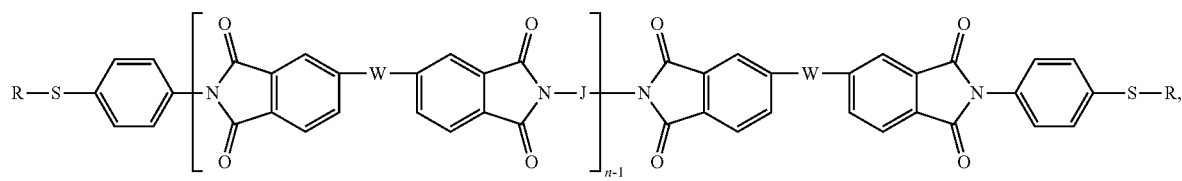

wherein:
a) for each homopolyimide the index n is independently an integer from 5 to 300, preferably index n is an integer from 10 to 100;
b) for each homopolyimide each W is independently a covalent bond, or a linking group having one of the following structures:

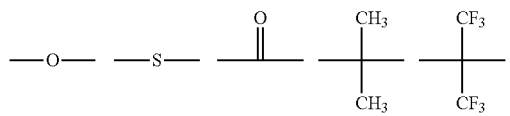
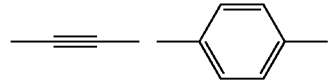
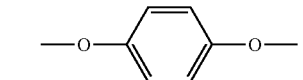
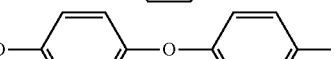
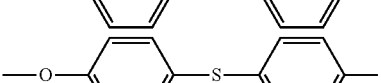
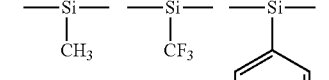
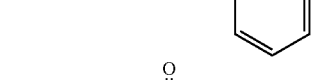
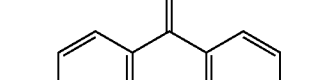
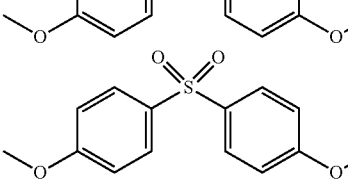

-continued

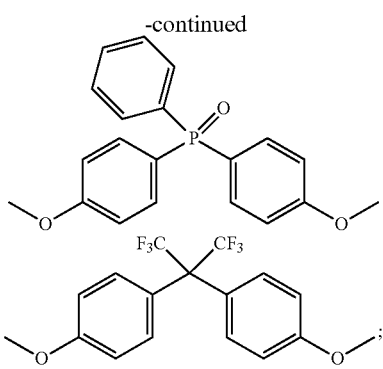

c) for each homopolyimide each R is independently Me, Et or Ph
d) for each homopolyimide, J is independently:

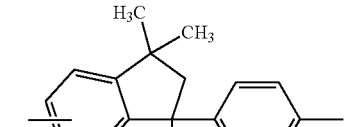

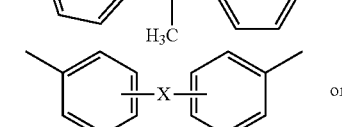 or

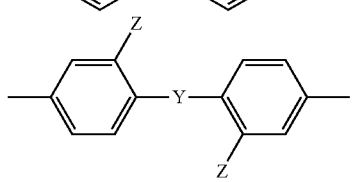

wherein:
i) for each homopolyimide X is independently a linking group having one of the following structures:

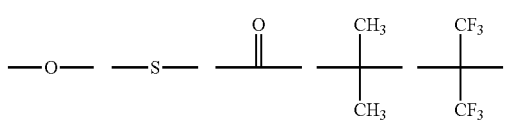

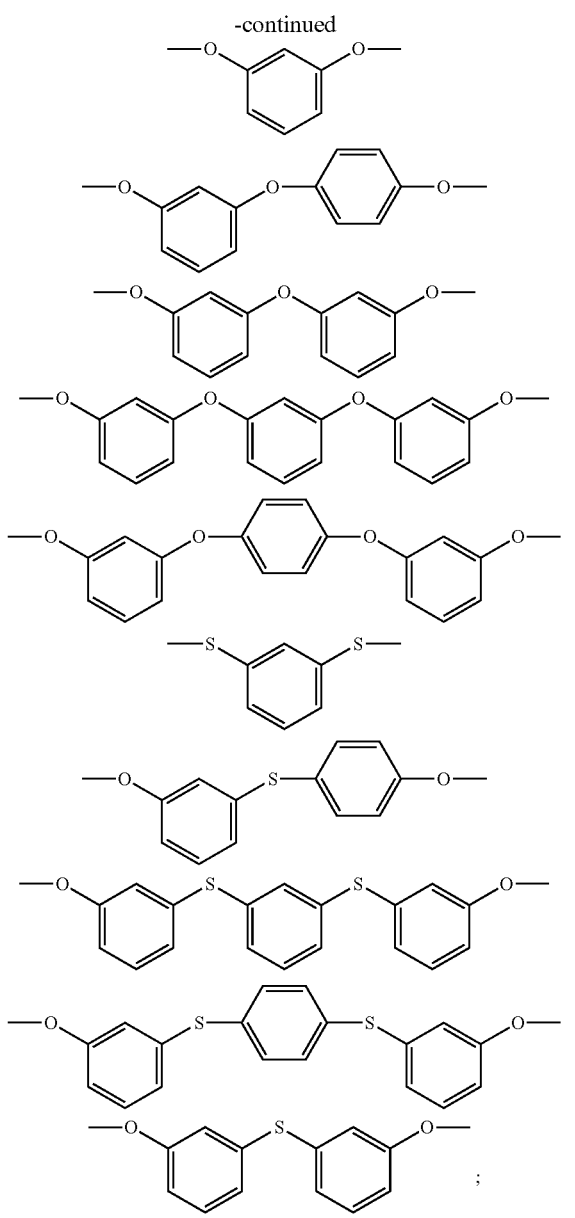

ii) for each homopolyimide, Y is independently a covalent bond, or a linking group having one of the following structures:

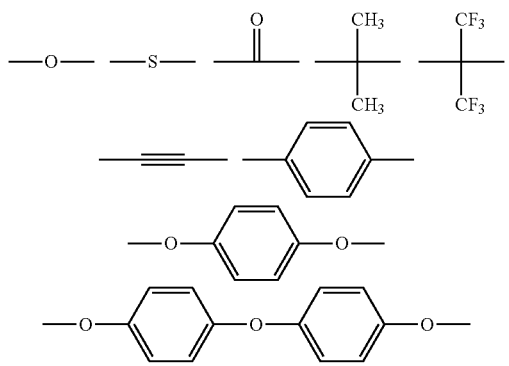

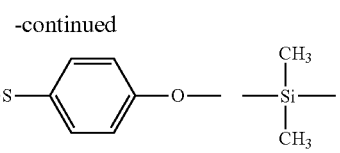

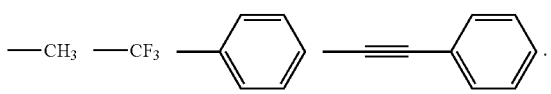

iii) for each homopolyimide, Z is independently one of the following structures:

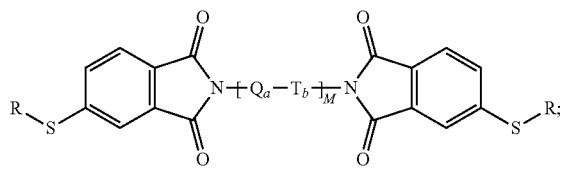

Applicants disclose the process of Paragraph 47 wherein said one or more copolyimides comprising endcaps and a backbone, said endcaps and/or said backbone comprising sulfur, having Structure X or XI below:

Structure X

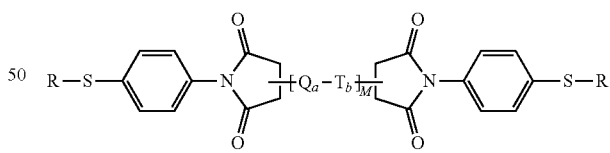

Structure XI

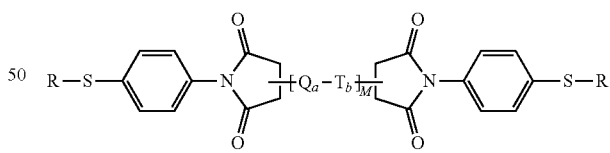

wherein
a) the index M is independently an integer from 5 to 300, preferably index M is an integer from 10 to 100;
b) $Q_a$ and $T_b$ are as defined in Paragraph 0047; and
c) the index M is independently an integer from 5 to 300, preferably index M is an integer from 10 to 100 each R is independently Me, Et or Ph Applicants disclose the process of Paragraph 0047 comprising one or more copolyimides comprising sulfide-containing endcaps and sulfides in said one or more copolyimides backbone:

Structure XII

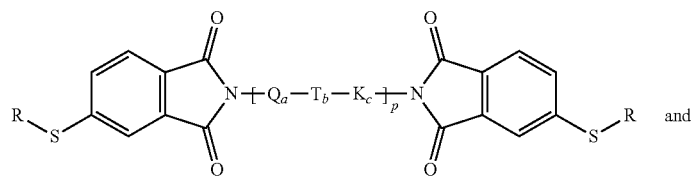

and

Structure XIII

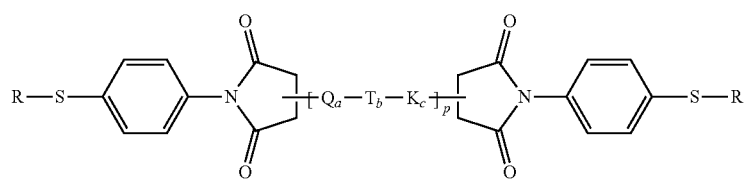

wherein a) each K has the following structure;

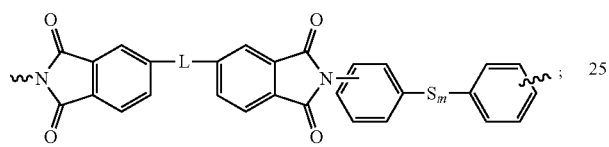

and for K the index m is 1 or 2 (m=1=sulfide and m=2=disulfide); and (ii) L is a covalent bond, or a linking group having one of the following structures:

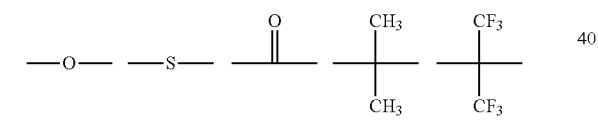
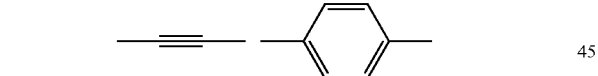
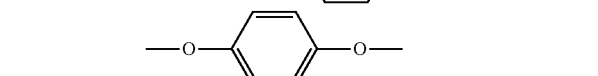
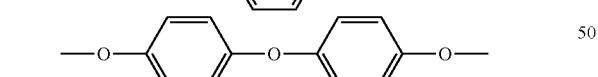
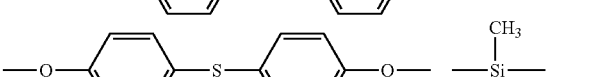
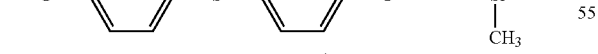
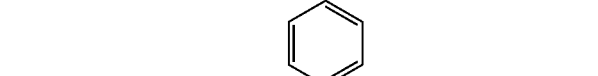
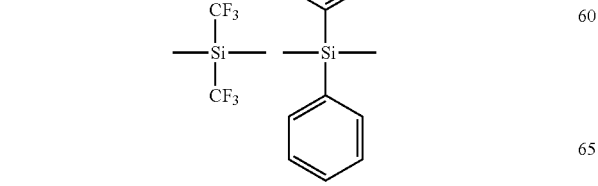

-continued

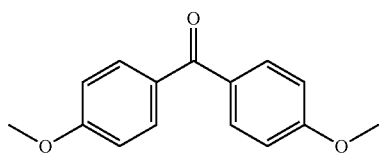
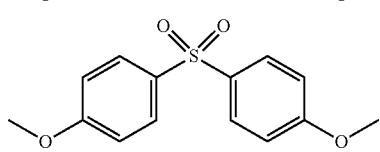
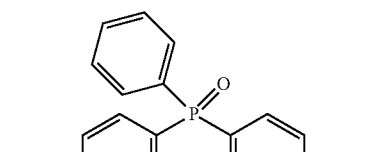
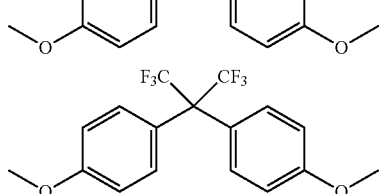

b) Q and T are as defined in Paragraph 0029;

c) the subscripts a, b and c are molar fractions of Q, T and K, with the proviso that a, b and c are positive numbers, each with the range of 0.05 to 0.95 and the sum of which is 1;

d) the index p is independently an integer from 5 to 300, preferably index p is an integer from 10 to 100; and e) each R is independently Me, Et or Ph.

Applicants disclose the process of Paragraph 0045 wherein said one or more polyimides comprises a physical mixture of polyimides selected from the group consisting of:

a) a mixture of homopolyimides, said mixture of homopolyimides comprising homopolyimides selected from homopolyimides having Structure IXa below wherein W and n are as defined in Paragraph 0046; and Structure IXb below wherein W, X and n are as defined in Paragraph 0046:

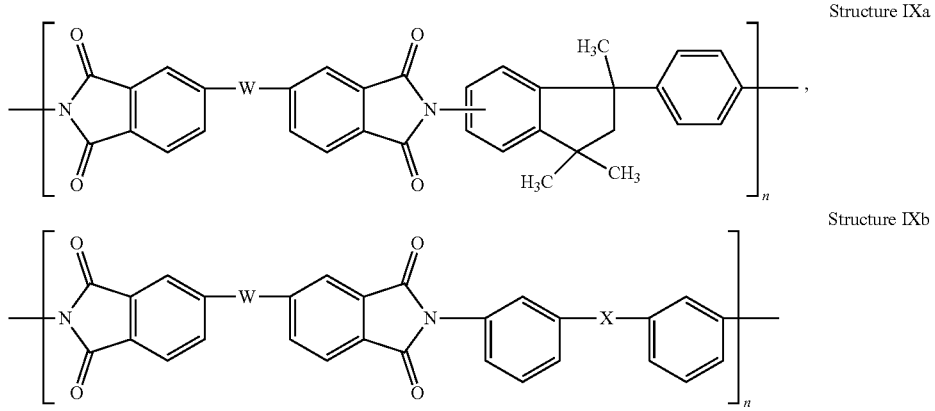

Structure IXa

Structure IXb b) a mixture of homopolyimides, said mixture of homopolyimides comprising homopolyimides selected from homopolyimides having Structure IXa above wherein W and n are as defined in Paragraph 0046; and Structure IXc below wherein W, Z, Y, and n are as defined in Paragraph 0046:

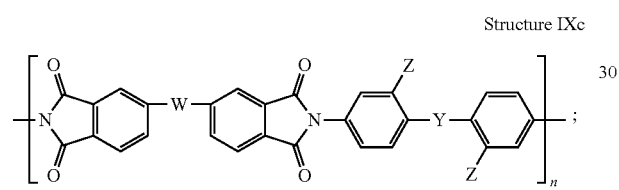

Structure IXc c) a mixture of homopolyimides, said mixture of homopolyimides comprising homopolyimides selected from homopolyimides having Structure IXb above wherein W, X and n are as defined in Paragraph 0046; and Structure IXc above wherein W, Y, Z and n are as defined in Paragraph 0046;

d) a mixture of homopolyimides, said mixture of homopolyimides comprising homopolyimides selected from homopolyimides having Structure IXa above wherein W and n are as defined in Paragraph 0046; Structure IXb above wherein W, X and n are as defined in Paragraph 0046; and Structure IXc above wherein W, Y, Z and n are as defined in Paragraph 0046;

e) a mixture of binary copolyimides, said mixture of binary copolyimides comprising binary copolyimides selected from copolyimides having Structure Xa wherein W, X, x and n are as defined in Paragraph 0047; and Structure Xb below wherein W, Z, Y, x, and n are as defined in Paragraph 0047:

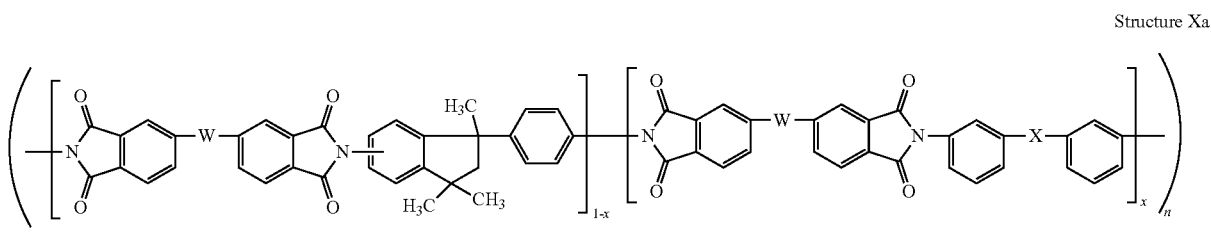

Structure Xa

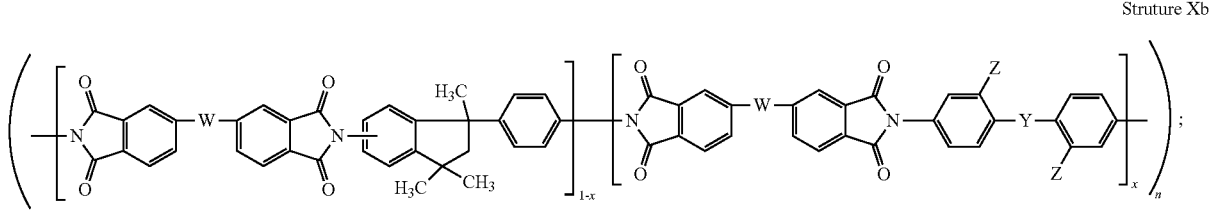

Struture Xb f) a mixture of binary copolyimides, said mixture of binary copolyimides comprising binary copolyimides selected from copolyimides having Structure Xc below wherein W, Z, Y, X, x and n are as defined in Paragraph 0047:

Structure Xc

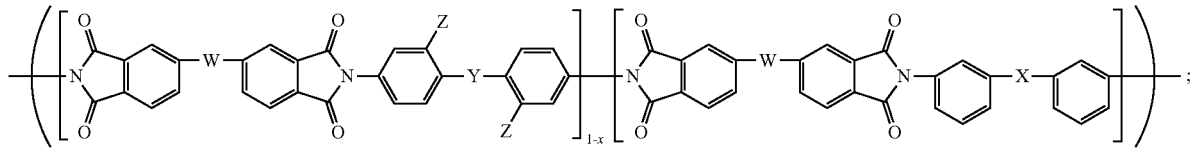

g) a mixture of binary copolyimides, said mixture of binary copolyimides comprising binary copolyimides selected from copolyimides having Structure Xb above wherein W, Z, Y, x, and n are as defined in Paragraph 0047 and Xc above wherein W, Z, Y, X, x and n are as defined in Paragraph 0047;

h) a mixture of binary copolyimides, said mixture of binary copolyimides comprising binary copolyimides selected from copolyimides having Structures Xa above wherein W, X, x and n are as defined in Paragraph 0047; Xb above wherein W, Z, Y, x, and n are as defined in Paragraph 0047; and Xc above wherein W, Z, Y, X, x and n are as defined in Paragraph 0047;

i) a mixture of sulfide-containing homopolyimides, said mixture of sulfide-containing homopolyimides comprising sulfide-containing homopolyimides selected from homopolyimides having Structure XI below wherein W, m and n are as defined in Paragraph 0048:

Structure XI

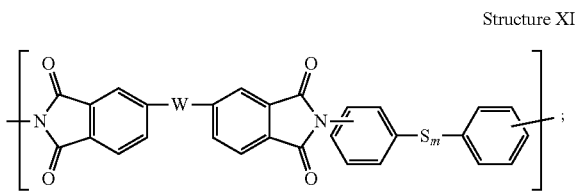

j) a mixture of sulfide-containing binary copolyimides, said mixture of sulfide-containing binary copolyimides comprising sulfide-containing binary copolyimides selected from copolyimides having Structure XII below wherein W, J, T, m, x, and n are as defined in Paragraph 0049;

Structure XII

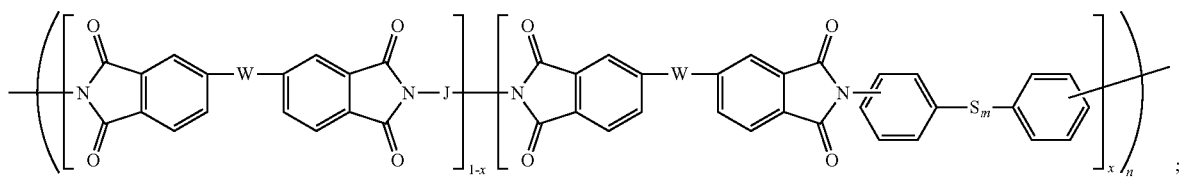

k) a mixture of sulfide-containing ternary copolyimides, said mixture of sulfide-containing ternary copolyimides comprising sulfide-containing ternary copolyimides selected from copolyimides having Structure XIIIa below wherein W, X, L, m, x, a, b and p are as defined in Paragraph 0050; Structure XIIIb below wherein W, Z, Y, L, m, x, a, b, and p are as defined in Paragraph 0050; and Structure XIIIc below wherein W, Z, Y, L, m, x, a, b, and p are as defined in Paragraph 0050;

Structure XIIIa

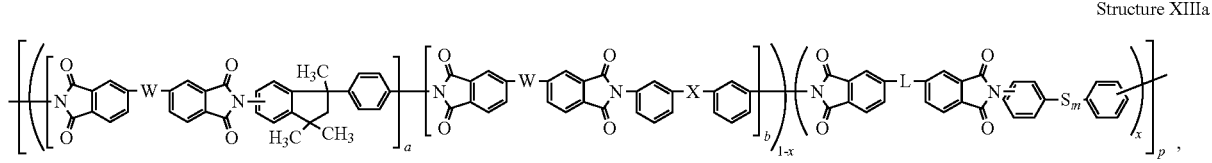

Structure XIIIb

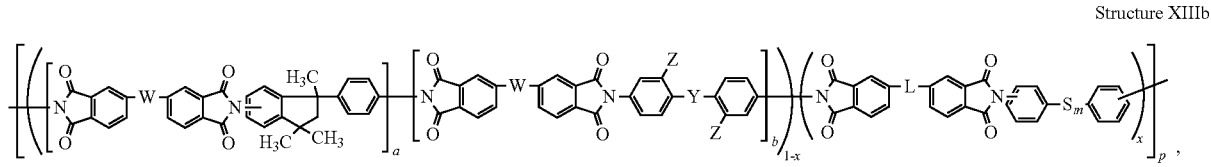

Structure XIIIc

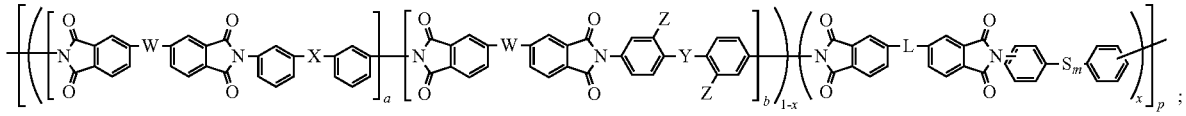

l) a mixture of homopolyimides having sulfide-containing endcaps, said mixture homopolyimides having sulfide-containing endcaps comprising homopolyimides having sulfide-containing endcaps selected from homopolyimides having Structure XIV below wherein R, J, W and n are as defined in Paragraph 0051; and Structure XV below wherein R, W, J, and n are as defined in Paragraph 0051:

having sulfide-containing endcaps comprising ternary copolyimides having sulfide-containing endcaps selected from copolyimides having Structure XVIII below wherein R, Q, T, K, a, b, c, and p are as defined in Paragraph 0053; and Structure XIX below wherein R, Q, T, K, a, b, c and p are as defined in Paragraph 0053:

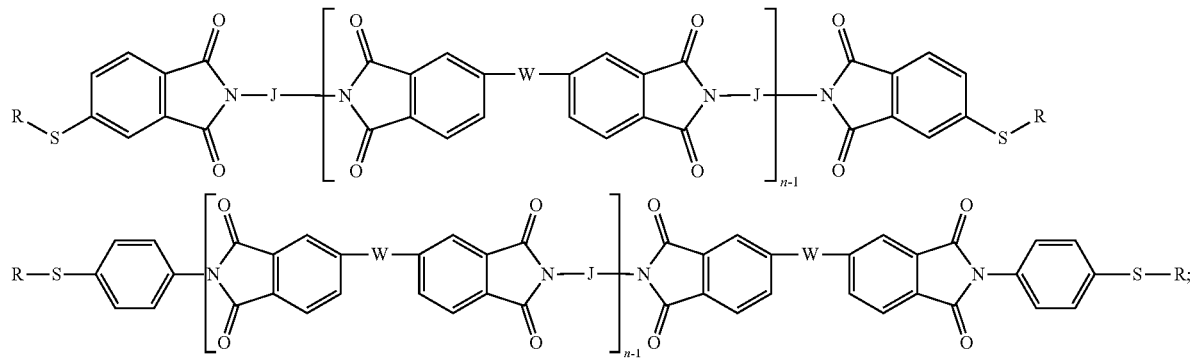

m) a mixture of binary copolyimides having sulfide-containing endcaps, said mixture binary copolyimides having sulfide-containing endcaps comprising binary copolyimides having sulfide-containing endcaps selected from copolyimides having Structure XVI below wherein R, Q, T, a, b, and M are as defined in Paragraph 0052; and Structure XVII below wherein R, Q, T, a, b and M are as defined in Paragraph 0052:

Structure XVI

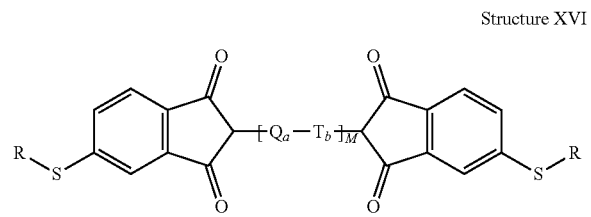

Structure XVII

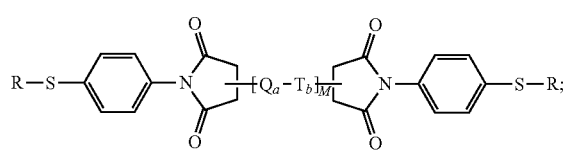

n) a mixture of ternary copolyimides having sulfide-containing endcaps, said mixture ternary copolyimides Structrure XVIII

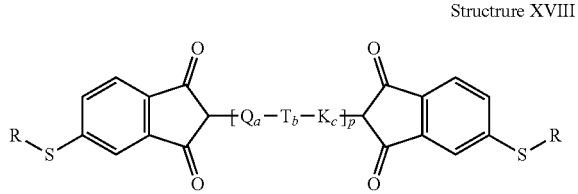

Structure XIX

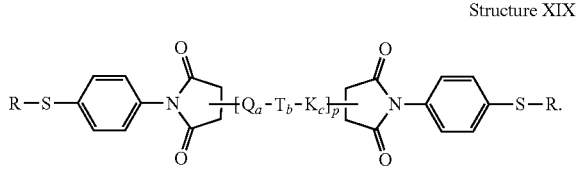

Applicants disclose the process of Paragraphs 0044 through 0054 wherein said polyimide has a number-average molecular weight of from about 1,000/mol to about 300,000 g/mol, preferably said polyimide has a number-average molecular weight of from about 2,000 g/mol to about 200,000 g/mol, more preferably said polyimide has a number-average molecular weight of from about 2,000 g/mol to about 100,000 g/mol.

Bottom-up, seeded growth synthesis of AuNRs, in particular, those with high aspect ratio (AR≥7), is labor-intensive and time consuming, generally results in poor yield, and difficult to achieve narrow AR distribution. Because of these difficulties, the approach B to assembling AuNRs to extend the LSPR band wavelengths ($\lambda_{peak}$ and $\lambda_{cut-of}$) deep into NIR region has become more attractive. The assembling process of AuNRs to form super-structured nanomaterials has been investigated in recent years. A common strategy to achieving the "end to end" AuNR ensembles is to use thiol-terminated polymers to selectively ligate the AuNRs surfaces only at their ends, then forming ensembles of polymer functionalized AuNRs in selective solvents or mixture of solvents. However, this strategy generally has involved some multi-step and often tedious syntheses of the special thiol-terminated polymers.

High performance polymers with high aromatic content such as polyimides have high glass transition temperature, are chemically and thermally more stable than most commodity polymers, and have been extensively used in commercial liquid-crystal (LCD) and light-emitting (LED) display applications. In general, the refractive index of polymers is from about 1.3 to 1.7. The refractive index (RI) of aromatic polyimides is relatively high, ranging from about 1.5 to 1.8. As LSPR of metal nanoparticles is sensitive to local refractive index, and higher local refractive index environment created by high RI polymers could possibly red-shifts LSPR band by screening the surface electronic oscillations and lowering the plasmon-energy barrier. However, Kapton, which is a widely available commercial polyimide, is practically insoluble in common organic solvents, and the insolubility renders the synthesis of polyimide-based nanohybrid from AuNRs and structurally similar polyimides rather impossible. The poor solubility of aromatic polyimide is attributed to the strong inter-chain and intra-chain interactions driven by the charge-transfer processes between the electron-poor segment derived from dianhydride and the electron-rich segment derived from diamine of repeating units as well as the strong π-π stacking between the aromatic moieties in the polymer backbone. Therefore, when synthesized from appropriate combinations of aromatic diamines and dianhydrides that are structurally capable of inhibiting the intrachain and interchain charge-transfer processes to occur in solution or solid state, resulting polyimides are not only nearly colorless but also are soluble in a variety of solvents such as 1-methyl-2-pyrrolidinone (NMP), N,N-dimethylacetamide (DMAc), tetrahydrofuran (THF), dichloromethane (DCM), chloroform. This group of soluble, "colorless" polyimides is exemplified by LaRC-CP2, which is derived from a highly flexible diamine, viz. 1,3-bis(3-aminophenoxy)benzene (APB), and a highly fluorinated monomers such as 4,4'-(hexafluoroisopropylidene)diphthalic anhydride (6FDA). The structure of CP2 is provided as follows:

In this invention, both CP2 and Matrimid® 5218 are provided as representatives for soluble polyimides that can enable the formation of AuNR ensembles with high aspect ratio in certain solvents. Matrimid® 5218 can be purchased from The Huntsman Company of Woodland. Texas, USA, The stability of the gold nanorod J-aggregates can further enhanced by the presence of sulfur in these types of polyimides.

Preparation of AuNRs Stock Solution for Making Assembly

Following the method described in the article by Park, K.; Hsiao, M.; Yi Y.; Izor, S.; Koerner, K.; Jawaid, A.; Vaia R. A.: Highly Concentrated Seed-Mediated Synthesis of Monodispersed Gold Nanorods, ACS Applied Materials & Interfaces, 2017, 26363-26371, and U.S. Pat. No. 10,758, 983 B1, highly concentrated AuNRs were synthesized in aqueous solution and transferred into organic phase by extraction of aqueous solution with propylene carbonate (PC). After extraction, the AuNRs/PC dispersion was further concentrated by bubbling dry nitrogen through the dispersion in a fume hood. The degree of concentrated AuNRs was monitored by UV-visible spectrometer and correlated to the LSPR absorbance. The concentrated AuNRs dispersion in PC was diluted to desired concentration (LSPR absorbance) with certain non-aqueous solvents to form the AuNRs stock solution. Alternatively, suitable concentrated AuNRs in non-aqueous solvents can be purchased from UES Inc, Dayton OH.

Polyimides with Good Solubility in Organic Solvents

In this invention, soluble polyimides can be homopolyimides, or copolyimides; and physical blends of multiple homopolyimides, or of homopolyimides and copolyimides in certain weight proportions. Polyimide solubility is controlled by the structure and morphology of the polymer. For example, U.S. Pat. No. 4,595,548, has taught us by introducing oxyphenylene or thiophenylene separator groups, and isomeric m,m'- or o,p'-oriented aromatic diamines into the polymer molecular structure to separate the chromophoric donor and acceptor centers in order to reduce the formation of inter-chain and intra-chain charge transfer complexes. Reducing inter-chain and intra-chain charge transfer may enhance solubility of polyimides. In order to

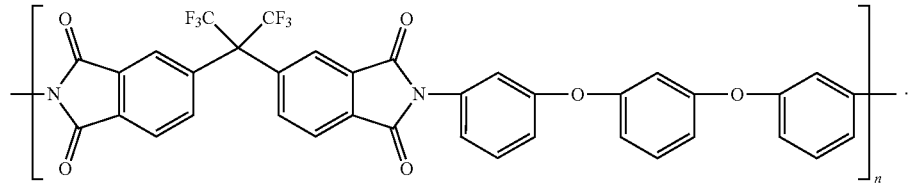

The commercially available Matrimid® 5218 exemplifies another group of soluble polyimides with light yellow color. The structure of Matrimid® 5218 is provided as follows:

retain good solubility in organic solvents, the dianhydrides and diamine used in making polyimides are both having structural units to either disrupt or frustrate the charge

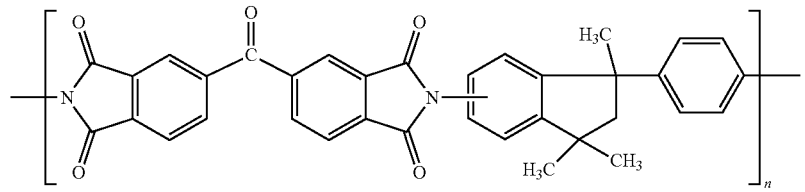

transfer and complexation process. Such structural disruption may be accomplished by having suitable linkers, W, X and Y in the polymer backbone or suitable pendants, Z as polymer side-chains. W, X, Y and Z are defined below. The dianhydrides and diamines as co-monomers for the preparations of soluble polyimides are generally available from fine chemicals vendors such as Aldrich Sigma, TCI etc.

For the dianhydride, the structural disruption in a homopolyimide is having a linker W between two phthalic anhydride units as shown in the following Structures 1-3 below:

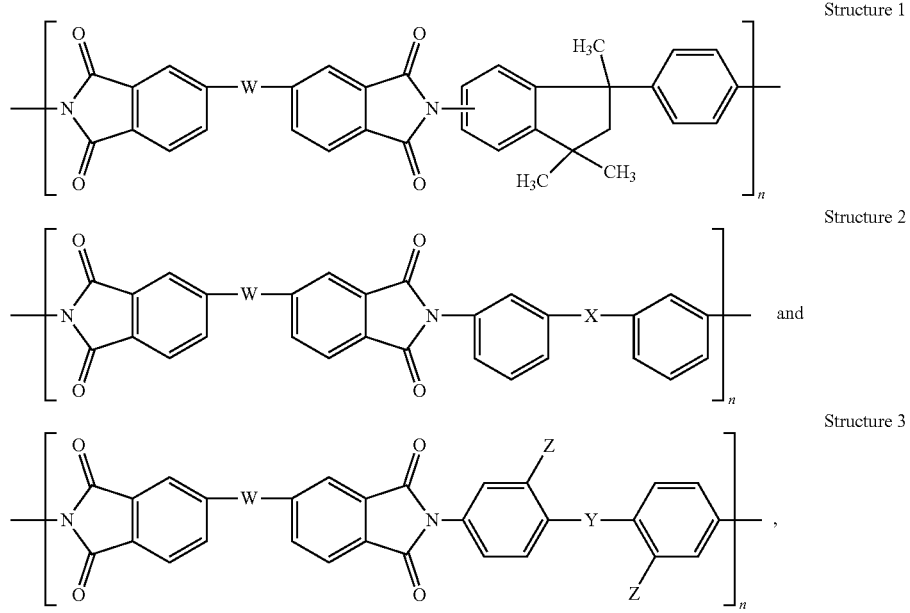

Structure 1

Structure 2 and

Structure 3 where W is independently a linking group being one of the following moieties:

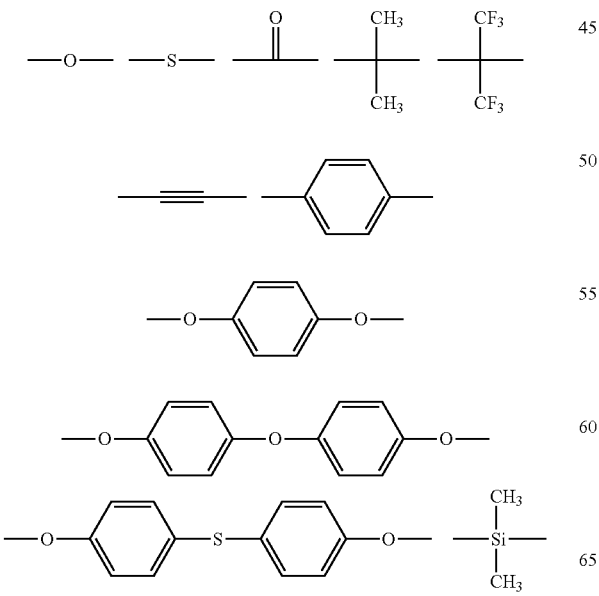

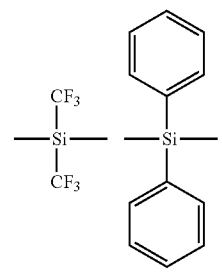

-continued

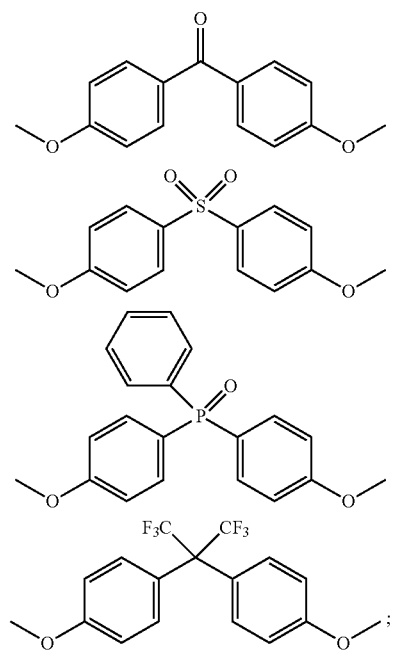

-continued and when W
is >C=O, Structure 1 is Matrimid® 5218;

Where X is independently a linking group having one of the following structures:

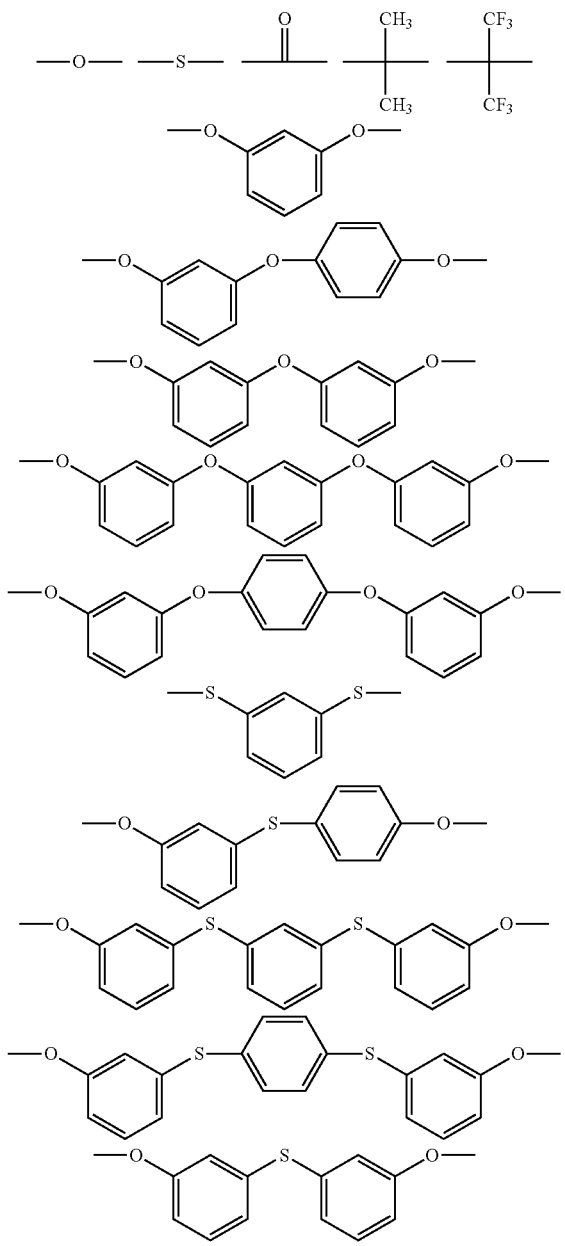

where Y is independently a covalent bond, or a linking group being one of the following moieties:

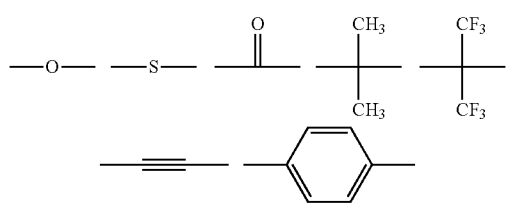

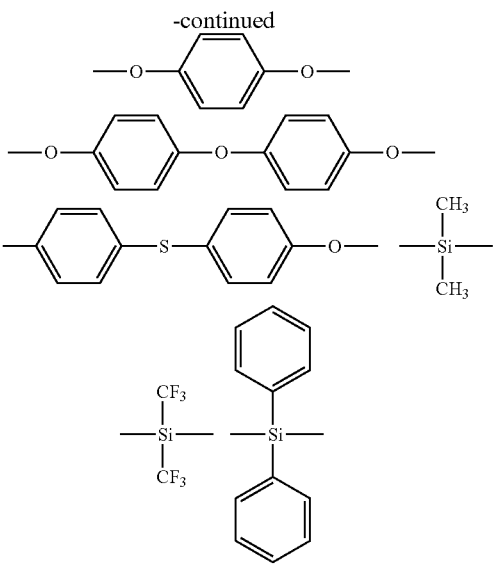

and Z is independently:

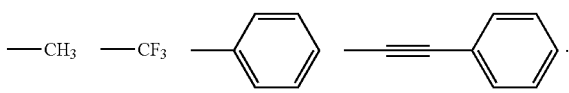

For diamines, the disruptive group is preferably in meta (1,3)-oriented with respect to amino groups. Polyimides made from such diamine are less likely to crystallize from polymerization solvents. The disruptive group can be a X-linker between two aniline moieties as in the following diamine Structure A,

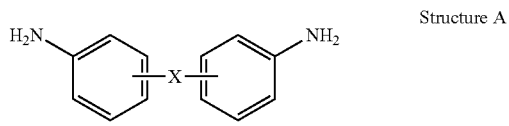

Structure A

Where X is para (1,4) or meta to $NH_2$, and X can be one of the following:

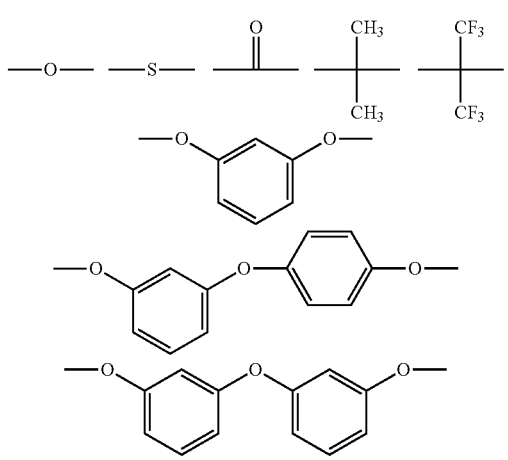

-continued

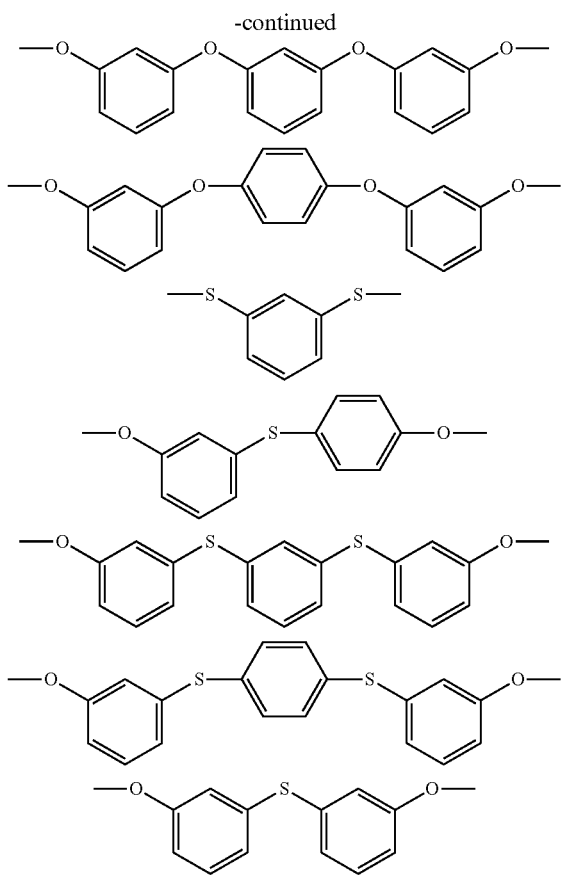

The disruptive group Z can be attached to diamine as side group as in the following diamine Structure B:

Structure B

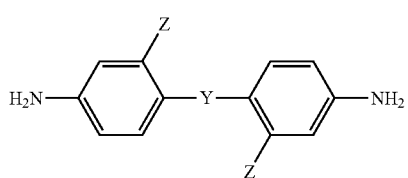

where Y can be a direct bond or one of the following moieties:

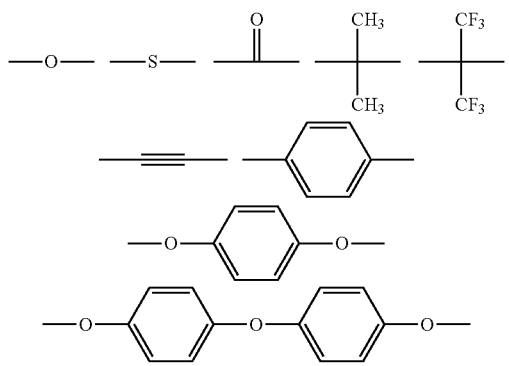

-continued

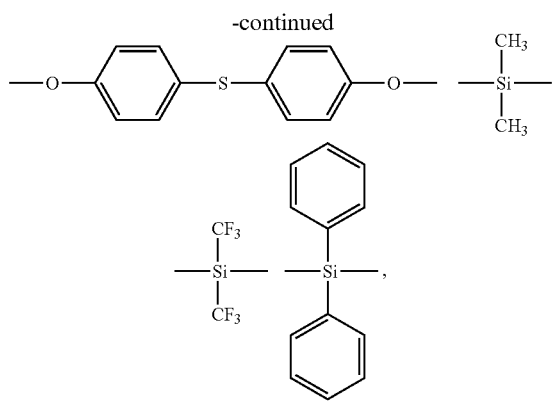

and the Z may be one of the following moieties:

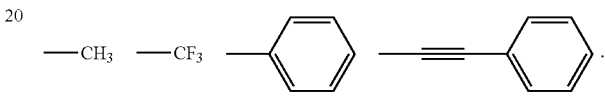

Homopolyimides are made from the mixtures of dianhydrides and diamines that can be either sulfide-containing or not, and in stoichiometric ratios according to whether the desired final form being endcapped or not; and if endcapped (i.e. endcapped homopolyimides), the desired degree (content) of functionality (e.g. sulfur-containing moieties) in the polyimide chain ends and/or polymer backbone (repeat units) can be easily regulated. With appropriate reaction stoichiometry, i.e. molar ratio of dianhydride, diamine and endcapping reactant, copolymerization is an effective technique to control the desired amount of specific functionality (e.g. sulfur-containing moieties) in the repeating units only or in both the repeating units and polymer ends with respect to the formation of binary or ternary copolymers. The timing of sequential mixing a common dianhydrides and two different diamine with similar reactivity will result in a binary copolymer; and a common dianhydrides and three different diamine with similar reactivity will result in a ternary copolymer. The endcapped binary and ternary polyimides are made by addition of the prescribed amount of an endcapping reactant at the appropriate time when the growth of polymer has reached its optimal average molecular weight.

Polymerization process of a homopolyimide is conducted in an aprotic polar solvent such as DMF, NMP, DMAc, etc. The molar ratio of dianhydride to diamine can range from 0.8 to 1.2, preferably 0.9 to 1.1. Generally, 6 to 24 hours of stirring at room temperature is required after the mixture of dianhydride and diamine has fully dissolved in the solvent. For the synthesis of endcapped homopolyimides, a monofunctional endcapping reactant is required. Because of their monofunctionality and the requirement of stoichiometric balance in order to achieve optimal polymer molecular weight, the molar amount of endcapping reagent, either an anhydride or a mono-amine, should be twice the deficit in the molar amount of dianhydride or diamine respectively. If endcapping reagent is added, the mixture will be further stirred at room temperature for 8 to 24 hours. The resulting poly(amic acid) is then converted to polyimide by chemical imidization using a mixture of acetic dianhydride and triethylamine or pyridine, or thermal imidization, or a combination of both conditions. The precipitated polymer product is isolated after pouring of the polymer solution into an alcoholic solvent chosen from methanol, ethanol, isopropanol or mixture of them, and filtration, followed by air drying and vacuum drying at 130° C. for at least 24 hours.

The syntheses of binary and ternary copolymers with or without endcapping reactants can be conducted via similar polymerization process, except having instead two or three different diamine reacting with a common dianhydride, and having the reaction ratio, (dianhydride):(diamine-1):(diamine-2) or (dianhydride):(diamine-1):(diamine-2):(diamine-3) is adjusted accordingly with the type (mono-amine or anhydride) and amount of endcapping reactant used. If endcapping reagent is used and because of its monofunctionality, the molar amount of endcapping reagents is twice of the deficit in the molar amount of the common dianhydride, or deficit in the total molar amount of two diamines, or deficit in the total molar amount of three diamines used.

Blending Process for Making Polyimide-Enabled, Well-Dispersed AuNRs/Polyimide Nanohybrids.

Applicants disclose that a AuNR/polyimide nanohybrid can be synthesized by the method of assembling AuNRs promoted by the polyimide chains in appropriate solution environment. This method can be carried out in three variations of mixing the ingredients consisting of AuNR, polyimide, solvent 1 and solvent 2:

(1) AuNRs stock solution is prepared in solvent 1 and polyimide is dissolved in solvent 2. Final assembly is formed by mixing the AuNRs solution and the polyimide solution (2) AuNRs stock solution is prepared in solvent 1, polyimide is added to the stock solution. After polyimide is dissolved, solvent 2 is added.

(3) AuNRs stock solution is prepared in solvent 2 and polyimide is dissolved in solvent 2. Final assembly is formed by mixing the AuNRs solution and the polyimide solution General conditions for (1)-(3): (a) Solvent 1 is a good solvent for polyimide, solvent 2 may be a good or poor solvent for polyimide. Polyimide should not precipitate from the mixture of solvents 1 and 2 when appropriate amount of the poor solvent 2 for polyimide is added to polyimide dissolved in good solvent 1. (b) The assemble process can be monitored by UV-vis-NIR spectrometer. With reference to FIG. 1, the profile for the assembling kinetics of AuNRs/polyimide nanohybrid in NMP, (for sample 07-39-2 in EXAMPLE 5), is illustrated by the spectral changes with time in the UV-Vis-NIR (400-2000 nm) region. The peak of LSPR absorption band moves toward longer wavelength and stay over a period of less than an hr. The assembling process is consider finished if there is no further LSPR movement over 24 hours.

Polyimide/AuNR Nanohybrid and Forms Comprising Same

If there is no precipitation formed, the resulting dispersion containing Gold nanorod J-aggregates and free polyimide chains can be use as is, i.e. liquid dispersion. The dispersion can be also further purified by isolation through decanting the clear solution or first centrifuging and then decanting the top clear liquid layer. The precipitates are essentially Gold nanorod J-aggregates containing AuNR J-aggregates with higher average aspect ratio than those dispersed in solution. The precipitated Gold nanorod J-aggregates can be re-dissolved in an aprotic polar solvents to form stable dispersion. In both cases, the nanohybrid dispersion can be used as a paint for coating a thin layer on glass or other substrates that cannot be corroded by the aprotic solvents.

Figure 2:
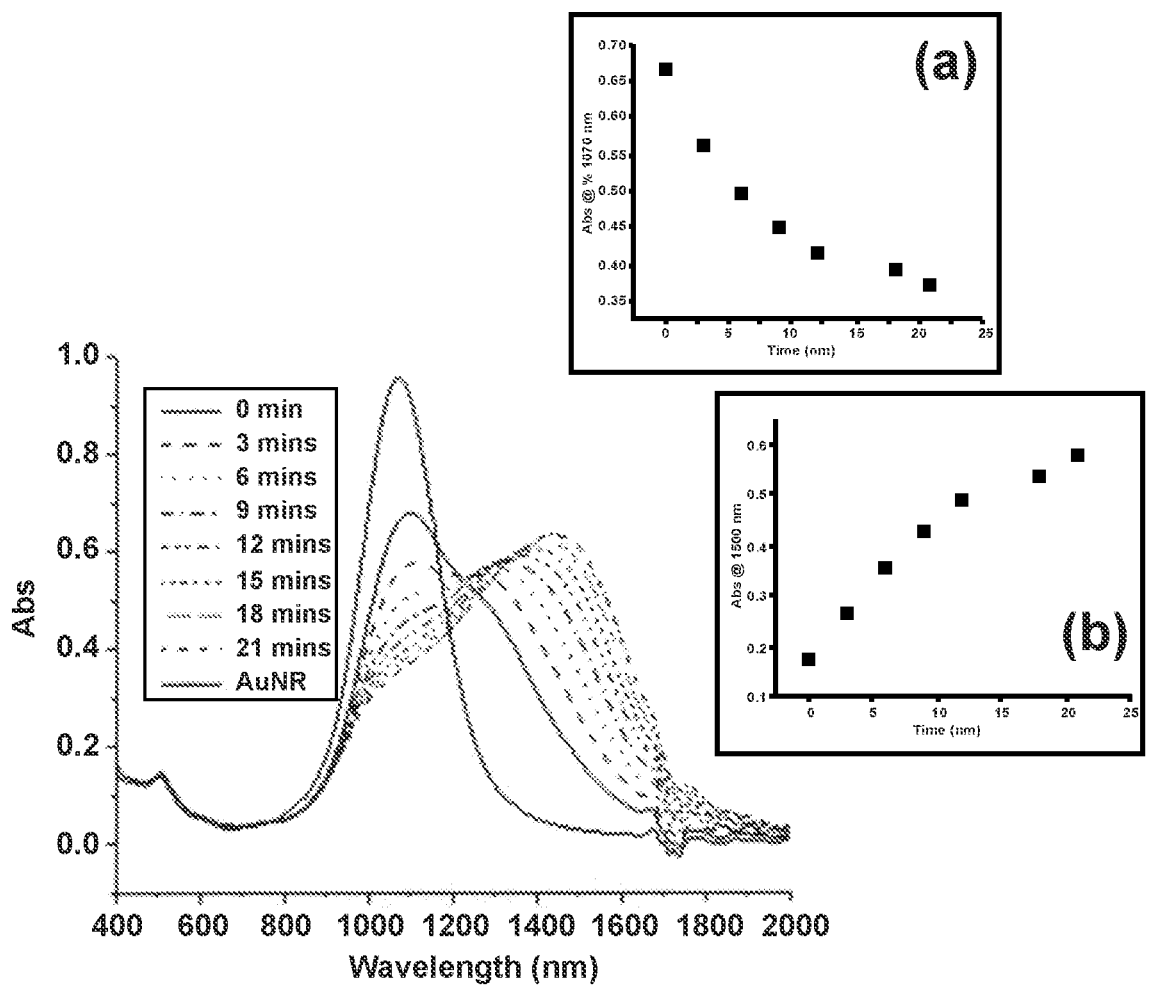
FIG. 2 depicts the UV-Vis-NIR spectra of starting AuNRs and AuNR/polyimide nanohybrids re-dispersed in NMP.

When the Gold nanorod J-aggregates are isolated as powdery solid, and then re-dispersed in certain solvents, such as NMP, there is no loss in the "as-prepared" or initial LSPR spectral properties in solution. With reference to FIG. 2, the transverse LSPR band of the J-ensembles in the nanohybrids are significantly red shifted as compared to that of starting AuNRs. The spectral red shift can be as larger as 150 nm. FIG. 2 and Table 1 show the difference in the LSPR absorption peak wavelengths between stating AuNRs and isolated AuNR-polyimide nanocomposites in NMP. While the LSPR bands of similar AuNR ensembles reported in literature are limited to the cut-off wavelengths at <1500 nm, FIG. 2 shows that the AuNRs ensembles not only exhibit broad LSPR band covering the range from 800 nm to 2,000 nm, but also having the absorption peaks red-shifted in solution.

TABLE 1

LSPR band of AuNRs and Gold nanorod J-aggregates in NMP

| Sample | LSPR Peak Wavelength (nm) | Wavelength changes wrt to "AuNR only" (nm) |
|---|---|---|
| AuNRs only | 1103 | N/A |
| 07-39-2-AuNR/PI nanohybrid Example 5, sulfur, PI = 6FDA-APB co-BAPS | 1156 | 53 |
| 06-59-2- AuNR/PI nanohybrid Example 7, no sulfur, PI = 6FDA-APB:MTA-endcapped | 1251 | 151 |

Polymer Matrix/AuNR—PI Nanohybrids (See Example 7)

In the applications that require the free-standing films, the AuNR-Polyimide (PI) nanohybrid dispersion can also be added to a solution containing a dissolved matrix polymer and the resulting mixture is used to fabricate into the corresponding nanocomposite films after the solvent removal. The matrix polymer can be a soluble polyimide or other polymers that are soluble in aprotic solvents, chlorinated solvents, THF etc. such as PMMA, polyether-imide, polycarbonate, poly(ether-sulfone) etc.

Figure 3:
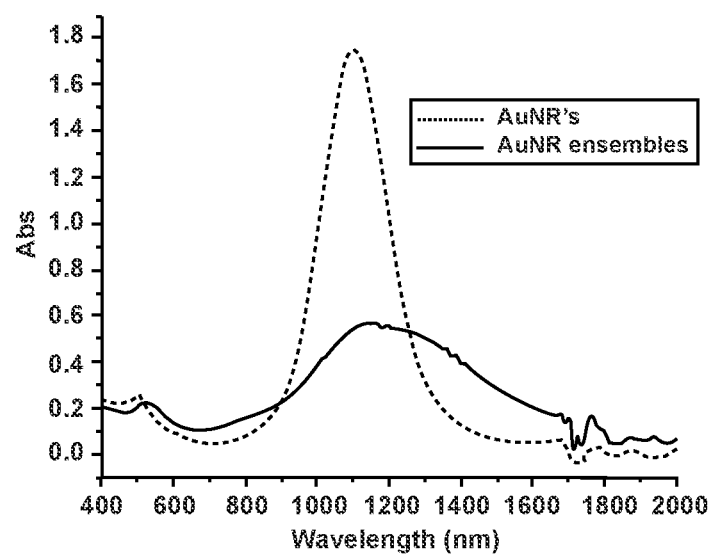
FIG. 3 depicts the comparison of UV-Vis-NIR absorption spectra of starting AuNRs in NMP (dot) and polyimide nanocomposite film comprised of high-aspect ratio AuNR ensembles and polyimide 07-39-2 (solid).

Isolated AuNR.PI nanohybrid and a poly(ethert-imide) are mixed in NMP, and the resulting mixture is sonicated for 10 minutes to help AuNR.PI nanohybrid to disperse in NMP. The dispersion is then poured into mL isopropanol to precipitate AuNR.PI/polyimide nanocomposite. The nanocomposite solid was collected by filtration and washed with fresh IPA, then air-dried, and finally dried in vacuum oven at 100° C. and 0.5 torr for 24 hours. The 0.15 grams of the final product was dissolved 2.85 grams of dichloromethane (DCM) to form a 5% solution. The solution was drop-cast on a glass slide to form AuNR-ensembles/polyimide composite thin film. FIG. 3 depicts Uv-Vis-NIR spectrum of the thin film on glass substrate, showing a broad LSPR band ranging from 800 nm to 2000 nm.

Test Methods

LSPR Test Method. For purposes of the present application, LSPR is measured spectroscopically based on the protocol as described in the standard test method titled ASTM E275-08, and using a Cary UV-Vis-NIR spectrometer. The solution sample is contained in 1 cm quartz cuvette for the measurement experiment. Using the Cary UV-Vis-NIR spectrometer, the longitudinal LSPR peak position is determined from the extinction spectrum. The Cary UV-Vis-NIR spectrometer has the following specifications: (i) Measuring range of 175 to 3300 nm using a Pb Smart NIR detector for extended photometric range; (ii) WinUV software—modular software with power analysis and enhanced transfer and report export capabilities; (iii) Variable slit widths (down to 0.01 nm) for optimum control over data resolution; (iv) Maximum light throughput using Schwarzchild coupling optics for higher accuracy at low transmission levels; (v) Minimal noise and stray light using a floating aluminum casting and double Littrow monochromator; (vi) Extended dynamic range by attenuating the reference beam more in line with the sample absorbance.

Aspect Ratio Test Method. For purposes of the present application, the average aspect ratio (AR) of AuNR is determined from the images taken by a transmission electron microscopy (TEM). Average AuNR aspect ratio (Length/Width or Diameter) is determined by TEM image analysis program, which measures the dimension (length and width) of AuNRs. 500 AuNR particles are measured from the respective sample, and the average of AR values of the 500 particles is considered as the "average aspect ratio". An FEI-Talos-TEM instrument was used to conduct the average aspect ratio determination experiment for AuNRs used in this invention.

Soluble Polyimide Test. For purposes of the present application, a polyimide in the form of homopolymers, copolymers. physical blends of multiple homopolymers or physical blends of mixed homopolymers and copolymers is deemed to be a "soluble polyimide" must have the lowest solubility value of 5 g/L at room conditions in the following solvents: N-methyl-pyrrolidione (NMP), N,N-dimethylacetate (DMAc), (N,N-dimethyl foramide (DMF), tetrahydrofuran (THF), dichloromethane (DCM), chloroform, 1,4-dioxine, propylene carbonate, (PC), cyclopentanone (CP), or a mixture of combinations of the above. The solubility of a polymer can be qualitatively determined visually the absence of any residue and viscosity increase in its solution. Quantitatively, polyimide solubility at room conditions, i.e. maximal amount of a polyimide by weight that can be dissolved completely in a given solvent, is determined gravimetrically alone or in combination with UV-Vis spectroscopy. Applicants note that Matrimid® 5218 is reported as having a solubility of 20% in cyclopentanone.

Polymer Molecular Weight Test. The average molecular weight (MW) of soluble polyimide can be assessed by Gel permeation chromatography (GPC) that is the common method to quantify the weight-average molecular weight ($M_w$), number-average molecular weight ($M_n$), and polydispesity index (PDI) or molecular weight distribution (MWD) of polymer in solution. For purposes of the present application, number-average molecular weight is used to define MW range of soluble polyimides.

EXAMPLES

The following examples and methods are presented as illustrative of the present invention or methods of carrying out the invention, and are not restrictive or limiting of the scope of the invention in any manner.

Example 1. Synthesis of polyimide with disulfide-containing repeating units, 07-26-2. To a 100 mL round bottom flask equipped with a stir-bar and nitrogen inlet, 2.8942 g (9.90 mmol) 1,3-bis(aminophenoxy)benzene (APB, 24.8 mg, 0.10 mmol), 4-aminophenyl disulfide (AMPS) and 40 mL anhydrous NMP were charged. After the solids were dissolved. 4.4442 g (10.00 mmol) 6FDA was charged. The initial mixture was stirred at room temperature under nitrogen for 16 hours. Then, 10 mL pyridine, 20 mL anhydrous N-methylpyrrolidinone (NMP), and 12 mL acetic anhydride were added to the resulting mixture, which was stirred for additional 16 hours at room temperature under nitrogen atmosphere. The mixture was poured into 600 mL of IPA that was magnetically stirred in a 1-L beaker. The yellow solids were collected by filtration and washed with fresh IPA. The collected solids were air-dried and then dried in vacuum oven at 130° C., 0.5 torr for 24 hours.

Example 2. Synthesis of polyimide with sulfide-containing endcaps, 07-37-2 (6FDA-APB-MTA-endcapped). To a 100 mL round bottom flask equipped with a stir bar and nitrogen inlet, 1.4617 g (5.000 mmol) of APB, and 40 mL of anhydrous NMP were charged. To the resulting solution, 2.2950 g (5.167 mmol) of 6FDA was then added. The mixture was stirred at room temperature under nitrogen for 8 hours, then 46.5 mg (0.33 mmol) of 4-(methylthio)aniline (MTA) was charged. The initial reaction mixture was stirred at room temperature under nitrogen for 16 hours. Then, 5 mL of pyridine and 6 mL of acetic anhydride were added to effect chemical imidization. The final reaction mixture was further stirred at room temperature for 16 hours. The mixture was slowly poured into 600 mL of IPA that was magnetically stirred in a 1-L beaker. The yellow solids were collected by filtration and washed with fresh IPA. The collected solids were air dried, and then dried in vacuum oven at 130° C., 0.5 torr for 24 hours.

Example 3. Synthesis of polyimide with sulfide-containing repeating units, 07-39-2 (6FDA-APB co-BAPS). To a 100 mL round bottom flask equipped with a stir-bar and nitrogen inlet, 1.4325 g (4.90 mmol) of APB, 21.6 mg (0.10 mmol) of bis(4-aminophenyl)sulfide, and 40 mL anhydrous NMP were charged. To the resulting solution. 2.2210 g (5.00 mmol) of 6FDA was charged. The initial reaction mixture was stirred at room temperature under nitrogen for 16 hours. Then, 5 mL of pyridine and 6 mL of acetic anhydride were added to effect chemical imidization. The final reaction mixture was further stirred at room temperature for 16 hours. The mixture was slowly poured into 600 mL of IPA that was magnetically stirred in a 1-L beaker. The yellow solids were collected by filtration and washed with fresh IPA. The collected solids were air dried, and then dried in vacuum oven at 130° C., 0.5 torr for 24 hours.

Example 4 Preparation of concentrated AuNR dispersion in propylene carbonate (PC). AuNR aqueous stock solution with LSPR peak at 1080 nm, cetyltrimethylammonium bromide (CTAB) at 1 mM and AuNR concentration at 1 nM was prepared according to standard procedure. 5 ml of such aqueous stock solution was mixed with 5 ml of PC. AuNRs slowly migrated into the PC phase within an hour. Then, the PC phase was isolated by separation funnel. The trace amount of water residue in PC phase was removed by heating the solution to 100° C. in water bath for 20 min to give 1 nM AuNR dispersion in PC, or about 19.6 mg/L gold in PC.

Example 5 Assembling AuNRs with sulfur containing polyimide 07-39-2. Concentrated AuNR (1 nM) with LSPR band peak around 1080 nm in propylene carbonate was diluted with NMP until LSPR peak absorbance in 1 mm thick cuvette is around 2 to form AuNR NMP stock solution. 50 mg of polyimide 07-39-2 was dissolved in 1 mL THF. To the polyimide THF solution, 1 mL of the AuNRs stock solution was added. The mixture was loaded into 1 mm quartz cuvette. The absorption spectrum changes with time was monitored by Uv-vis spectrometer (FIG. 1). FIG. 1a is the plot of LSPR absorption at 1078 nm against time. FIG. 1b is plot of new LSPR absorption intensity at 1500 nm against time. After mixing, the absorption change dramatically, indicates, AuNRs start to form ensemble. The ensemble exhibits desirable broader LSPR absorption. The dispersion was allowed to stand at room temperature for 24 hours, the aggregates of AuNRs gradually precipitated out of the solution. The AuNR aggregates can be isolated after centrifugation and decantation.

Figure 4:
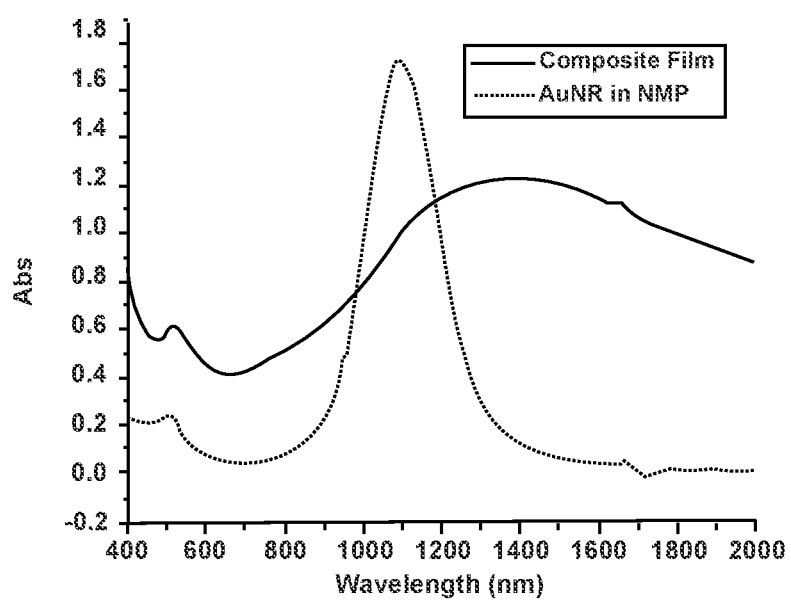
FIG. 4 depicts the comparison of LSPR spectra of starting "monomeric AuNRs" (dot) and AuNR ensembles (solid) dispersion in NMP.

Example 6: Isolation and Re-dispersion of AuNRs Assemblies. AuNR ensembles from Example 4 was isolated by decanting the top clear solution. The bottom precipitated solids are AuNRs aggregates. To the solids, 2 mL NMP was added. The mixture was then sonicated for 10 minutes to help AuNRs aggregates to disperse in NMP. The final solution is purple. FIG. 4 shows the Uv-vis absorption spectral difference between "monomeric AuNRs" and AuNR ensembles in NMP. The LSPR exhibits narrow symmetric band with peak absorption around 1100 nm. The LSPR of assembled AuNRs in NMP exhibits broad asymmetric and with the peak absorption around 1160 nm.

Example 7: Use of Assembled AuNRs as additive in polyimide film. Isolated AuNR ensembles (from Example 5) and 200 mg of polyimide 07-39-2 were mixed in 10 mL NMP in a test tube. The mixture was sonicated for 10 minutes to help AuNR ensembles to disperse in NMP. The dispersion was then poured into 200 mL isopropanol to precipitate AuNR-polyimide nanocomposite. The nanocomposite was collected by filtration and washed with fresh IPA, then air-dried, and finally dried in vacuum oven at 100° C. and 0.5 torr for 24 hours. The 0.15 grams of the final product was dissolved 2.85 grams of dichloromethane (DCM) to form a 5% solution. The solution was drop-cast on a glass slide to form AuNR-ensembles/polyimide composite thin film. FIG. 3 depicts Uv-Vis-NIR spectrum of the thin film on glass substrate, showing a broad LSPR band ranging from 800 nm to 2000 nm.

Example 8 Forming AuNRs assemblies with non-sulfur containing polyimide 06-59-2. 50 mg polyimide (made from condensation of equal mole of 3,3',4,4'-biphenyltetracarboxylic dianhydride (BPDA) and APB through similar procedure as Example 1) was dissolved in 1 mL NMP. 1 mL AuNR stock solution in NMP made following Example 4 was added to the polyimide solution. To the mixture 2 mL THF was added. The mixture was monitored by UV-vis spectrometer. The analysis indicate that AuNRs assembles were formed. After 24 hours, precipitations formed. The precipitated AuNRs assemblies were harvested by centrifuge and decanting clear liquid. The assembled AuNRs were dispersed in 2 mL NMP as Example 5. The NMP solution of such solution exhibit broad LSPR band in NMP with the peak absorption at 1251 nm (See FIG. 2).

Example 9: Forming Assembled AuNRs and non-sulfur containing polyimide 06-40-1. 50 mg of polyimide (made from condensation of equal mole of 4,4'-(ethyne-1,2-diyl) diphthalic anhydride (EDPA) and APB with similar procedure as Example 1) was dissolved in 1 mL NMP. 1 mL AuNR stock solution in NMP made following the Example 4 was added to the polyimide solution. To the mixture 2 mL THF was added. The mixture was monitored by UV-vis spectrometer. The analysis indicate that AuNRs start to form assemblies once the mixed. After 24 hours, precipitations formed. The precipitated AuNRs assemblies were harvested by centrifuge and decanting clear liquid. The AuNRs assemblies were dispersed in NMP according method used in the Example 5. The NMP solution of such solution exhibit broad LSPR band in NMP with the peak absorption at 1224 nm.

Figure 5:
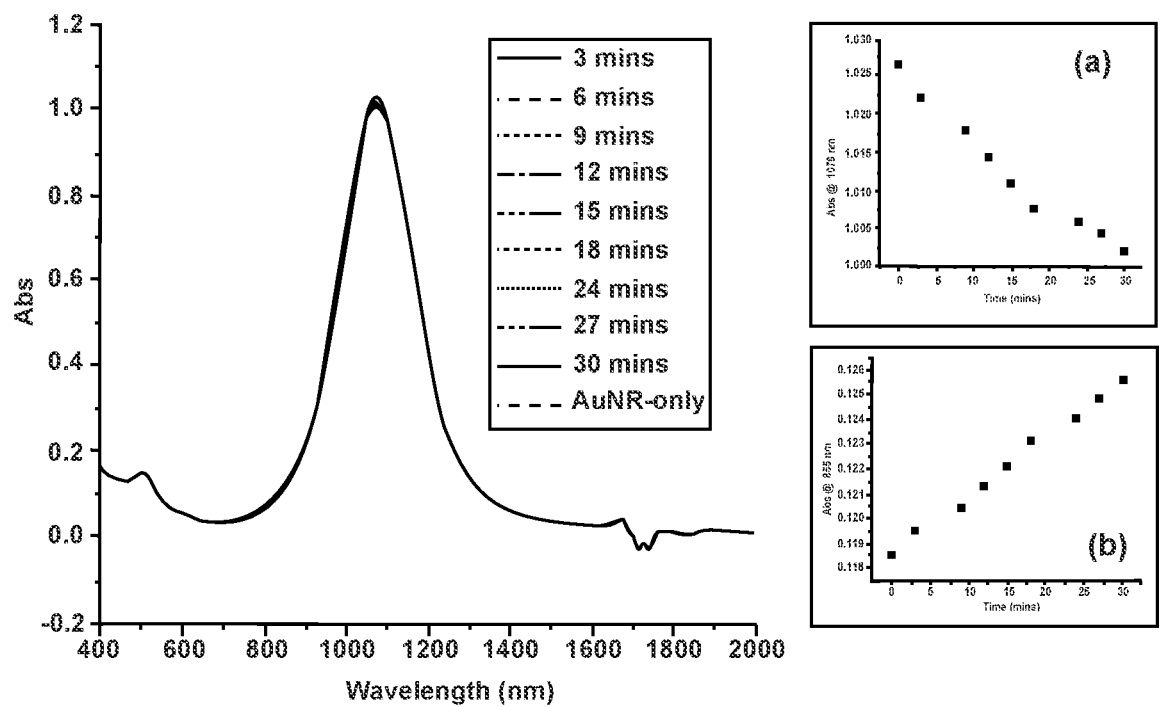
FIG. 5 depicts the kinetics of AuNRs assembling in THF: overlay of Uv-vis-NIR spectra recorded at 3 min interval for 30 minutes; Inset (a) plot of 1078 nm absorbance against time; Inset (b): plot of 855 nm absorbance against time.

Comparative Example 10: Forming Assembled AuNRs and sulfur containing polyimide in THF only (solvent 2 only). AuNRs/NMP stocking solution was prepared according to Example 4 by using THF as the solvent diluent. 50 mg of polyimide 07-39-2 dissolved in 1 mL THF. To the THF solution, 1 mL dilute AuNRs was added. The mixture was loaded into 1 mm quartz cuvette. The absorption changes was monitored by Uv-vis spectrometer. FIG. 5 shows that the UV-vis spectrum of the mixture changes over monitoring time. FIG. 5a shows the absorption at 1078 nm decreases with time. FIG. 5b shows absorption at 855 nm increase with time, which indicates AuNRs form "edge by edge", undesired assemblies in THF.

Figure 6:
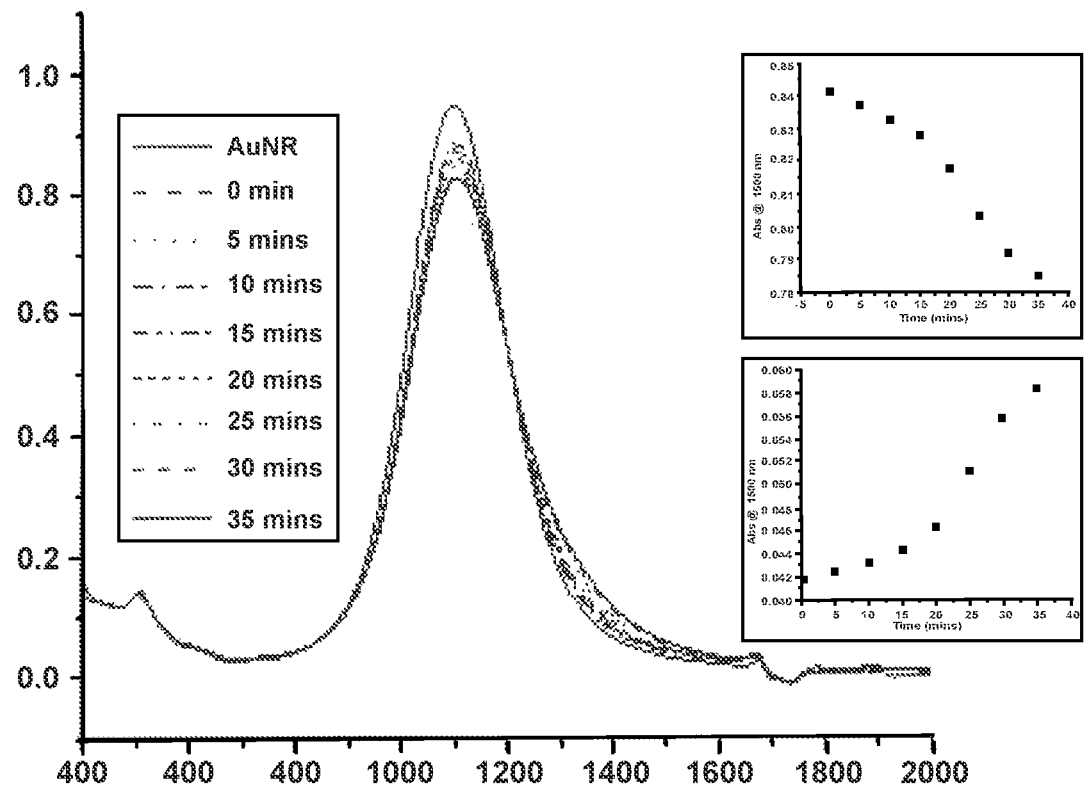
FIG. 6 depicts the assembling kinetics of AuNRs and polyimide nanocomposite in NMP as monitored by the spectral changes with time in the UV-Vis-NIR (400-2000 nm) region of the nanocomposite solution; inset (a) is the plot of 1078 nm absorbance vs. time; and inset (b) is the plot of 1500 nm absorbance vs. time.

Comparative Example 11: Forming AuNRs assemblies in NMP only (solvent 1). AuNRs/NMP stocking solution was prepared according to Example 4. 50 mg of polyimide 07-39-2 dissolved in 1 mL NMP. To the polyimide NMP solution, 1 mL AuNRs NMP stock solution was added. The mixture was loaded into 1 mm quartz cuvette. The absorption changes was monitored by Uv-vis spectrometer. FIG. 6 shows the UV-vis spectrum of the mixture changes over monitoring time. Compared to assembling process in THF/NMP. FIG. 6a shows absorption at 1078 slightly decreases with time. FIG. 6b shows absorption at 1,500 nm slightly increase with time. These results indicate that compared to assembling in mixture solvents of NMP with THF, AuNRs assembling process in NMP is slow. There is no precipitate after 24 hours, indicates that the AuNRs assemblies are soluble in NMP as Example 5 demonstrated.

Figure 7:
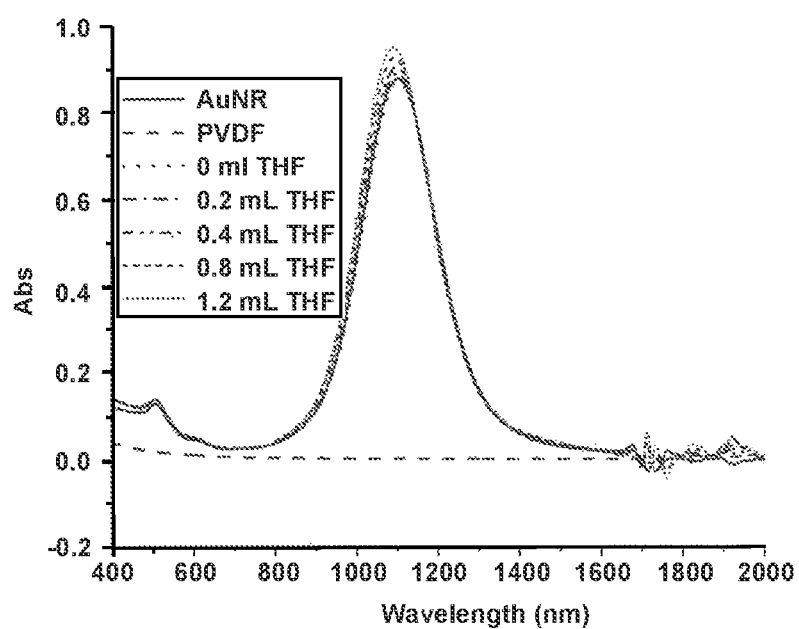
FIG. 7 depicts the overlay of UV-Vis-NIR spectra of AuNRs with PVDF in NMP with different amount of THF.

Comparative Example 12 Forming assemble AuNRs with commercial available Polyvinylidene fluoride (PVDF). 15 mg PVDF was dissolved in 1 mL NMP by heating to 60° C. and held for 1 hour. After cooled to room temperature, 1 mL AuNRs solution prepared according to Example 4 was added to the PVDF solution. To this solution, a non-solvent for PVDF, THF was added, and the Uv-visible-near IR spectra change was monitored. FIG. 7 shows the concentrated corrected overlay spectra of the mixture with different amount of THF. FIG. 7 indicates, there is no significant change of LSPR band with increment of the amount of THF. PVDF does not enable AuNRs to form desirable AuNR ensembles with broad LSPR band in a mixture solvent and a non-solvent for PVDF. The lightly blue shift of AuNRs LSPR band is due to refractive index change.

Figure 8:
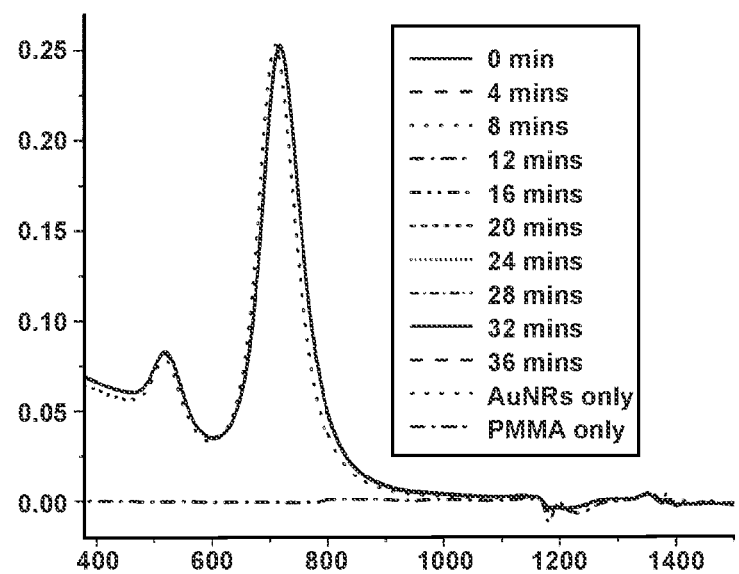
FIG. 8 depicts the overlay of UV-Vis-NIR spectra of AuNRs with PMMA in mixture solvents of PC/THF/NMP with time of mixing.

Comparative Example 13: Attempt to form AuNRs J-aggregate with commercial available polymethylmethacrylate (PMMA), a non-polyimide. To 1 mL of the AuNR dispersion with LSPR absorption peak at 710 nm in the mixed solvent of propylene carbonate and tetrahydrofuran (v/v=4/9), 25 mg of commercial PMMA (Sigma-Aldrich) dissolved in 1 mL of NMP was added. The mixture was transfer into a quartz cuvette (path length=1 mm). The change of LSPR absorption band was monitored by a UV-Vis-NIR spectrometer. With reference to FIG. 8, there is no significant LSPR band shift taking place during a 36-minute period. This observation confirms that PMMA do not enable AuNRs to form J-aggregates. The slight LSPR band red shift in the mixed solvent is due to a slightly polarity increase in the solvent environment when NMP added.

Figure 9:
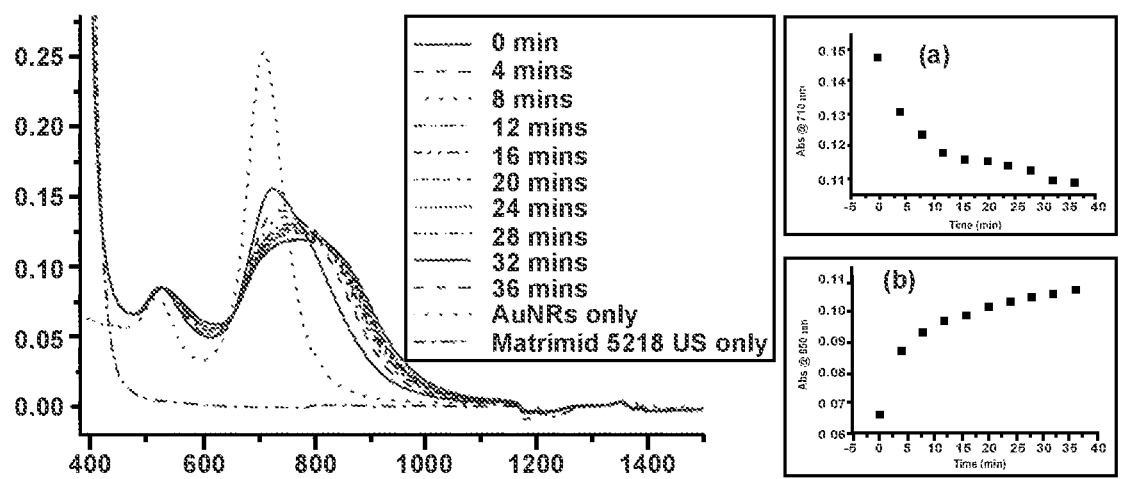
FIG. 9 depicts the overlay of UV-Vis-NIR spectra of AuNRs with Matrimid® 5218 US in mixture solvents of PC/THF/NMP with time of mixing. Inset (a): Plot of absorption at 710 nm with time insert (b) Plot of 850 nm absorbance with time.

Example 14: Forming AuNRs J-aggregate using commercial soluble polyimide Matrimid® 5218. To 1 mL of the AuNR dispersion with LSPR absorption peak at 710 nm in the mixed solvent of propylene carbonate and tetrahydrofuran (v/v=4/9), 25 mg of commercial Matrimid® 5218-US (Huntsman) dissolved in 1 mL of NMP was added. The mixture was transfer into a quartz cuvette (path length=1 mm). The change of LSPR absorption band was monitored by a UV-Vis-NIR spectrometer. With reference to FIG. 9, there is a significant change in the dispersion state during a 36-minute period, as indicated by the observation that upon mixing, the LSPR band immediately broadens and a shoulder starts to appear and peak around 850 nm. With reference to the inset (a) of FIG. 9, the temporal degradation of the state of AuNR dispersion upon mixing is confirmed by the rapid decay of the shorted LSPR wavelength at 710 nm with time, and inset (b) indicates that the concurrent formation of AuNR/Matrimid® 5218 J-aggregates as indicated by the growth of longer LSPR wavelength at 850 nm over time.

Figure 10:
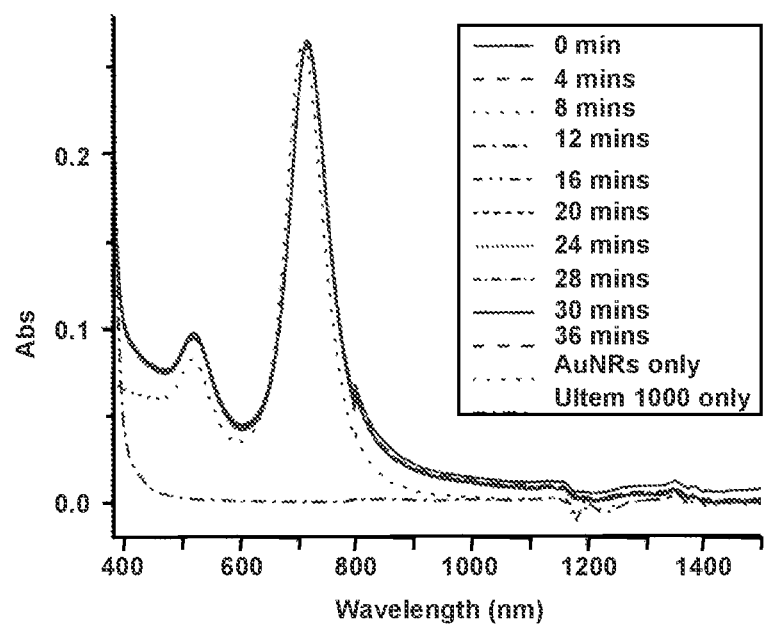
FIG. 10 depicts the overlay of UV-Vis-NIR spectra of AuNRs with Ultem 1000 in mixture solvents of PC/THF/NMP with time of mixing.

Comparative Example 15: Attempt to form AuNRs J-aggregate with commercial Ultem 1000 To 1 mL of the AuNR dispersion with LSPR absorption peak at 710 nm in the mixed solvent of propylene carbonate and tetrahydrofuran (v/v=4/9), 25 mg of Ultem 1000 (SABIC) dissolved in 1 mL of NMP was added. The mixture was transfer into a quartz cuvette (path length=1 mm). The change of LSPR absorption band was monitored by a UV-Vis-NIR spectrometer. With reference to FIG. 10, there is no significant LSPR band shift taking place during a 36-minute period. This observation confirms that Ultem (a polyetherimide) do not enable AuNRs to form J-aggregates. The slight LSPR band red shift in the mixed solvent is due to a slightly polarity increase in the solvent environment when NMP added.

Example 16: poly(methyl methacrylate) (PMMA) and AuNRs J-aggregate nanocomposite Film To a AuNR, 05-40-1 J-aggregates dispersion in NMP (Example 9), 1.0 gram of PMMA was dissolved in 5 mL of NMP. The mixture was homogenized by stirring at room temperature for 1 hours. The mixture was drop-cast on a 2"×4" glass slide, and the sample slide was dried in an oven at 100° C. under vacuum for 18 hours. After the sample slide had cooled to room temperature, a free standing AuNR.PI/PMMA composite film was obtained after detaching from the glass slide soaking in water. UV-Vis-NIR spectral analysis indicates that the maximum LSPR absorption of the AuNR.PI/PMMA composite film is around 1135 nm.

While the present invention has been illustrated by the description of one or more embodiments thereof, and while the embodiments have been described in considerable detail, they are not intended to restrict or in any way limit the scope of the appended claim to such detail. Additional advantages and modification will be readily apparent to those skilled in the art. The invention in its broader aspects is therefore not limited to the specific details, representative apparatus and methods and illustrative examples shown and described. Accordingly, departures may be made from such details without departing from the scope or the spirit of the general inventive concept exemplified herein.

What is claimed is:

1. A process of making a gold nanorod J-aggregate, said process comprising:
   a) combining;
      (i) a first solution comprising a solvent selected from the group consisting of 1-methylpyrrolidinone, N,N-dimethylacetamide, N,N-dimethylformamide, tetrahydrofuran, dichloromethane, chloroform, 1,4-dioxine and a mixtures thereof; and gold nanorods; and
      (ii) a second solution comprising a solvent selected from the group consisting of 1-methylpyrrolidinone, N,N-dimethylacetamide, propylene carbonate, tetrahydrofuran, 1,4-dioxine, ethyl acetate, acetone, dichloromethane, chloroform, ethanol, methanol, isopropanol and mixtures thereof and one or more polyimides,
      said one or more polyimides having a solubility of at least 5 g/L at 25° C. at 1 atmosphere of pressure in said first solution's solvent and said second solution's solvent;
      said first solution and said second solution being combined in a ratio of from 0.1:1 to about to about 10:1; said first solution having a concentration of gold nanorods of from about 0.01 nM to about 10 nM and said second solution having a concentration of polyimide of from about 0.1 g/L to about 1000 g/L;
   b) combining:
      (i) a solution comprising a solvent, said solvent being selected from the group consisting of 1-methylpyrrolidinone, N,N-dimethylacetamide, N,N-dimethylformamide, tetrahydrofuran, dichloromethane, chloroform, 1,4-dioxine and mixtures thereof, gold nanorods and one or more polyimides; and
      (ii) a second solvent selected from the group consisting of 1-methylpyrrolidinone, N,N-dimethylacetamide, propylene carbonate, tetrahydrofuran, 1,4-dioxine, ethyl acetate, acetone, dichloromethane, chloroform, ethanol, methanol, isopropanol and mixtures thereof;
      said one or more polyimides having a solubility of at least 5 g/L at 25° C. at 1 atmosphere of pressure in said solution's solvent and said second solvent;
      said solution and said second solvent being combined in a ratio of from 0.1:1 about to about 10:1; said solution having a concentration of gold nanorods of from about 0.01 nM to about 10 nM and a concentration of polyimide of from about 0.1 g/L to about 1000 g/L; or
   c) combining:
      (i) a first solution comprising a solvent and gold nanorods, said solvent being selected from the group consisting of 1-methylpyrrolidinone, N,N-dimethylacetamide, propylene carbonate, tetrahydrofuran, 1,4-dioxine, ethyl acetate, acetone, dichloromethane, chloroform, ethanol, methanol, isopropanol and mixtures thereof, and
      (ii) a second solution comprising a solvent selected from the group consisting of 1-methylpyrrolidinone, N,N-dimethylacetamide, tetrahydrofuran, dichloromethane, chloroform, 1,4-dioxine and mixtures thereof and one or more polyimides;
      said one or more polyimides having a solubility of at least 5 g/L at 25° C. at 1 atmosphere of pressure in said first solution's solvent and said second solution's solvent;
      said first solution and said second solution being combined in a ratio of from 0.01:1 about to about 10:1, said first solution having a concentration of gold nanorods of from about 0.01 nM to about 10 nM and said second solution having a concentration of polyimide of from about 0.1 g/L to about 1000 g/L.

2. The process of claim 1 wherein said gold nanorods have an average aspect ratio of from about 2 to about 7.

3. The process of claim 1 wherein said one or more polyimides is selected from the group consisting of one or more homopolyimides comprising endcaps and a backbone, said endcaps and/or said backbone comprising sulfur; one or more copolyimides comprising endcaps and a backbone, said endcaps and/or said backbone comprising sulfur; one or more homopolyimides; one or more copolyimides and mixtures thereof.

4. The process of claim 3 wherein said one or more homopolyimides have Structure I below:

Structure I

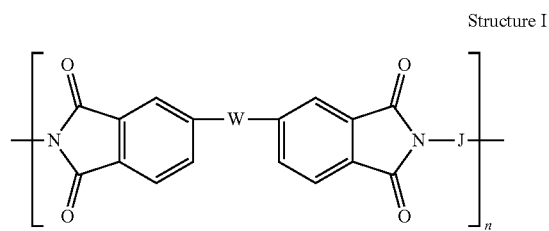

wherein:
a) for each homopolyimide, the index n is independently an integer from 5 to 300;
b) for each homopolyimide, W is independently a covalent bond, or a linking group having one of the following structures:

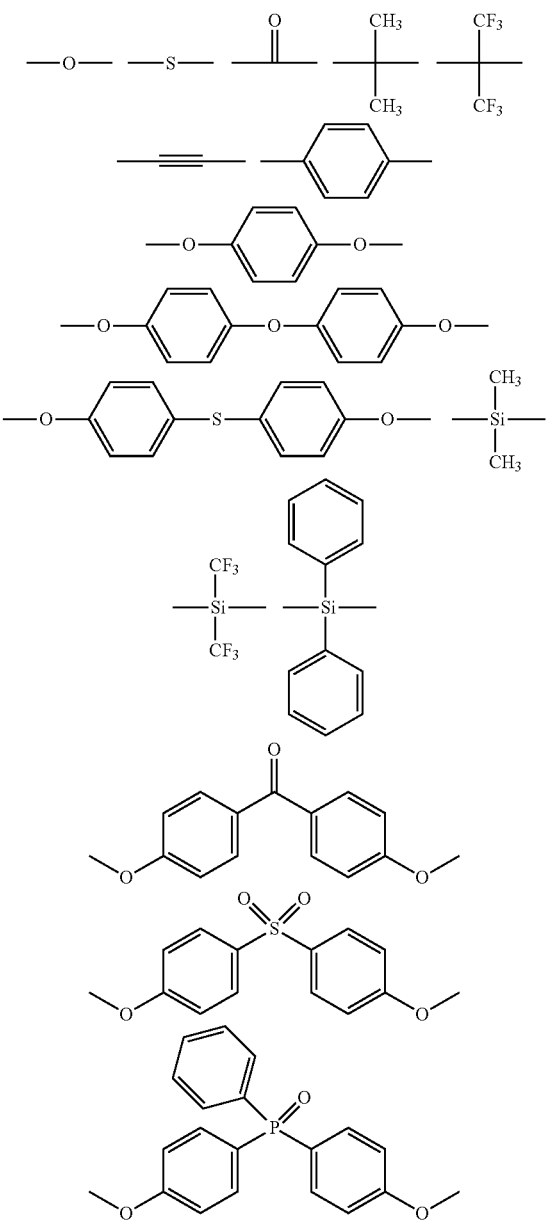

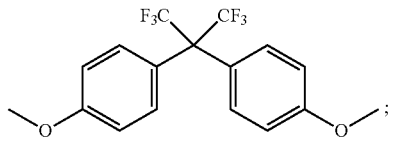

c) for each homopolyimide, J is independently:

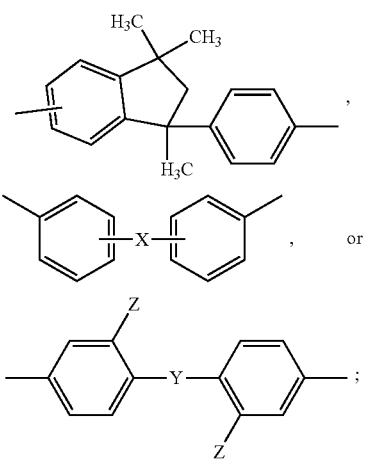

wherein:
i) for each homopolyimide, X is independently a linking group having one of the following structures:

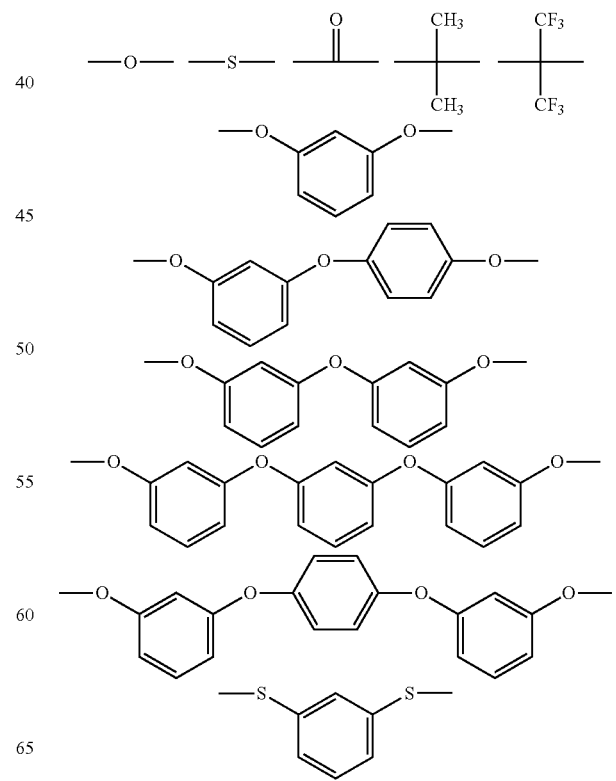

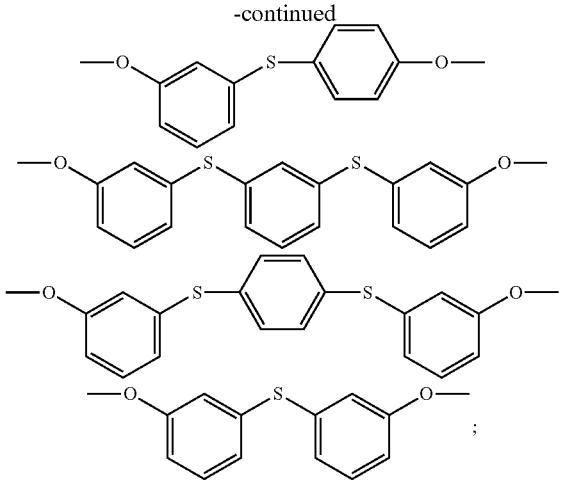

ii) for each homopolyimide, Y is independently a covalent bond, or a linking group having one of the following structures:

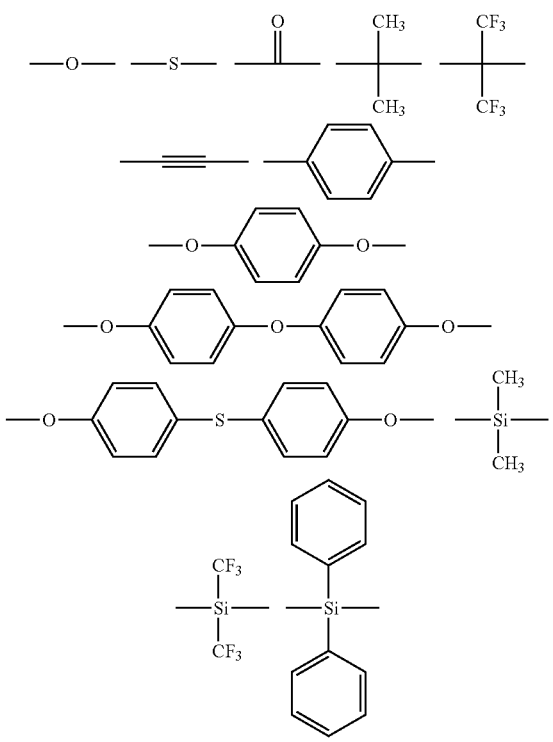

iii) for each homopolyimide, Z is independently one of the following structures:

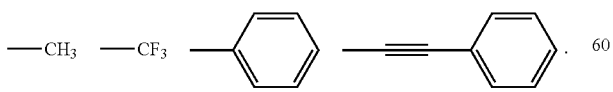

5. The process of claim 3 wherein said copolyimides have Structure II below and wherein for each said of copolyimides, the indices and variables provided in Structures II and III are independently selected:

$$\mathrm{-\!\!+\!\!Q}_a\mathrm{-T}_b\mathrm{\!\!+\!\!}_m\quad\text{Structure II}$$

the subscripts a and b are indices for the molar fractions of Q and T, each with the range of 0.05 to 0.95, respectively, and the sum of a and b is unity; and m is an integer from 5 to 300; wherein Q and T are homopolyimides having Structure III below:

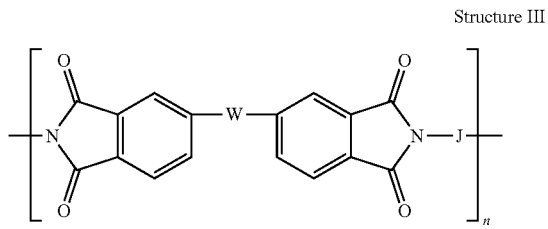

wherein a) for each homopolyimide Q and T, the index n is an integer from 5 to 300;

b) for each homopolyimide Q and T, W is independently a covalent bond, or a linking group having one of the following structures:

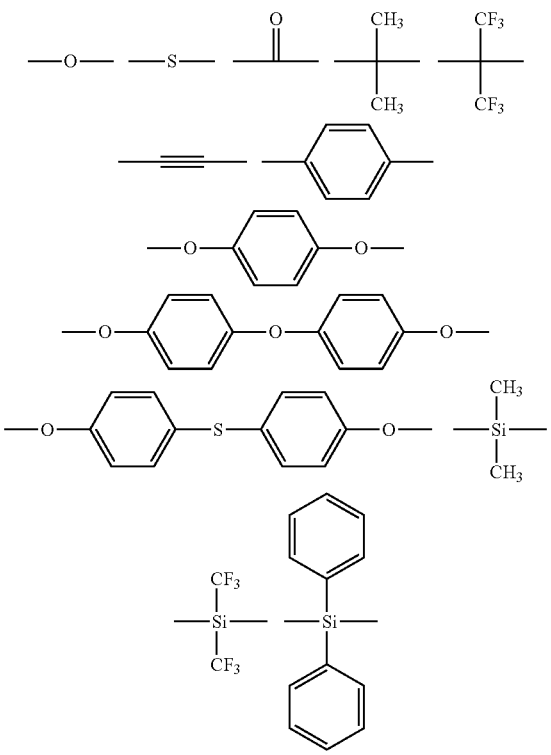

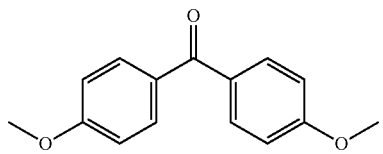

-continued
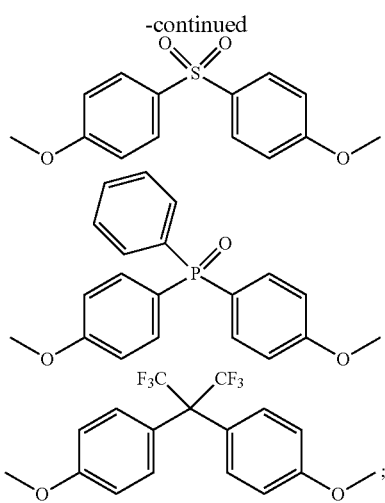
b) for each homopolyimide Q and T, J has one of the following structures with the proviso that J for Q and T is different:
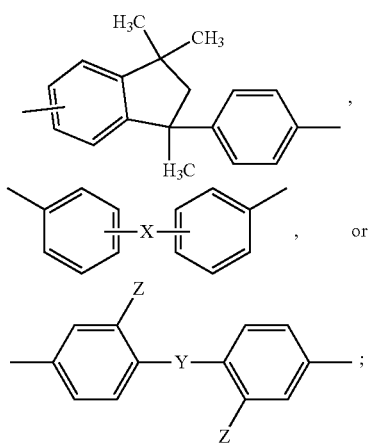
wherein:
i) X is a linking group having one of the following structures:
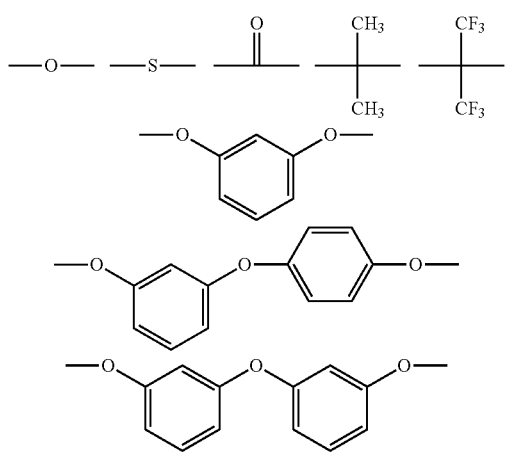
-continued
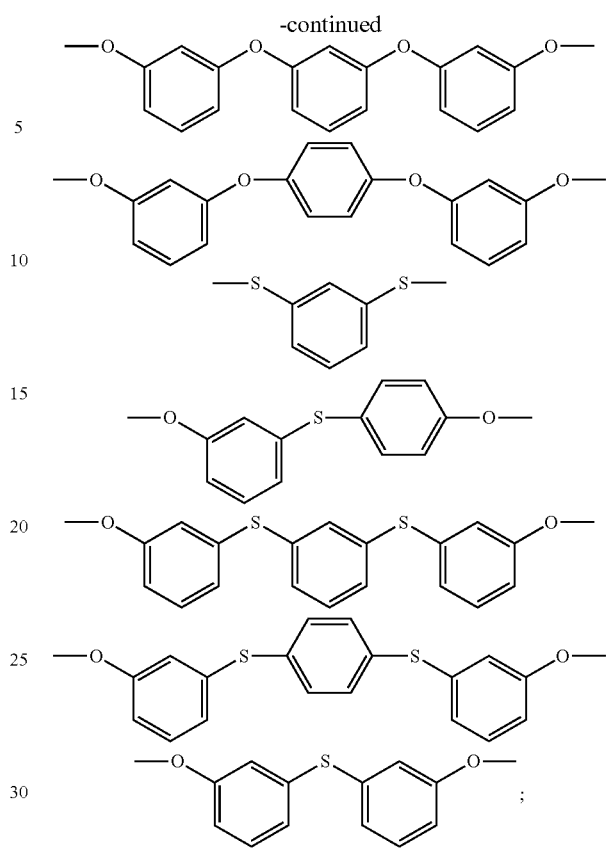
ii) Y is a covalent bond, or a linking group having one of the following structures:
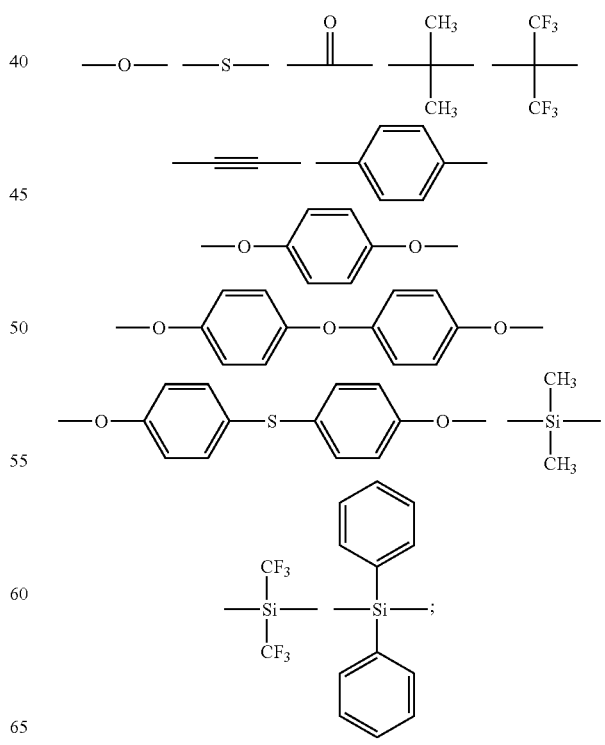

and iii) Z is one of the following structures:

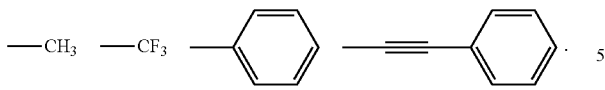

6. The process of claim 3, wherein said one or more homopolyimides comprising endcaps and a backbone have Structure IV below and wherein for each said of homopolyimides the indices and variables provided in Structures IV are independently selected:

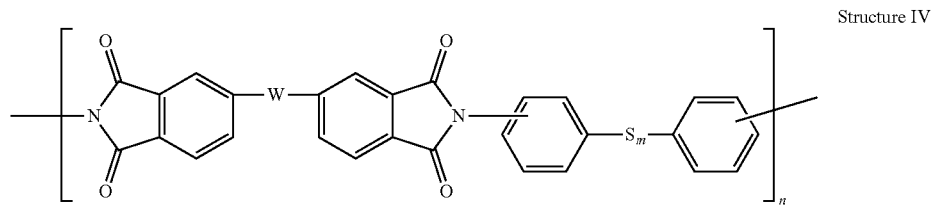

Structure IV a) the index n is an integer from 5 to 300;
b) W is a covalent bond, or a linking group having one of the following structures:

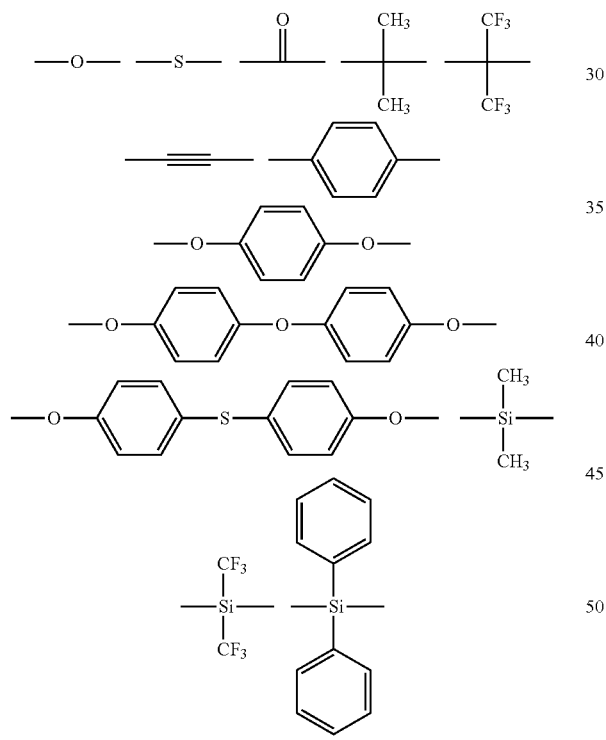

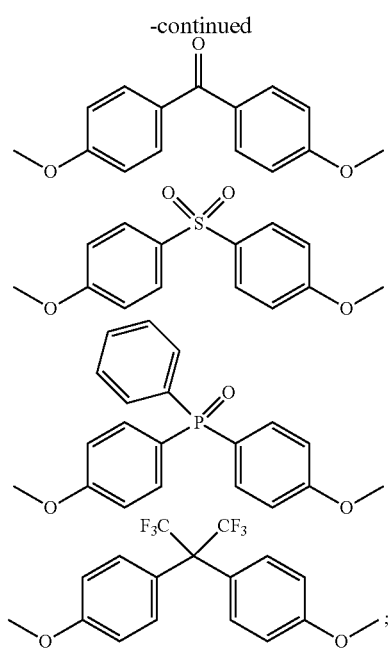

-continued and
c) m is 1 or 2.

7. The process of claim 3 wherein said one or more copolyimides comprising end caps and a backbone have Structure V below and wherein for each of said one or more copolyimides the indices and variables provided in Structures V are independently selected:

Structure V

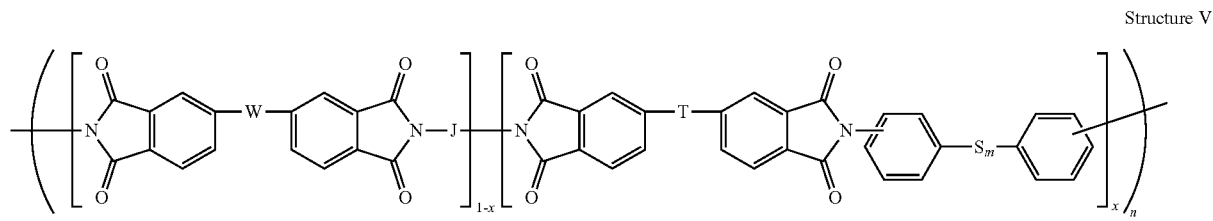

wherein for each copolyimide,
a) the index n is independently an integer from 5 to 300;
b) x is a non-zero number less than 1, and the ratio for x:(1-x) is 0.01:0.99 to 0.20:0.80;
c) m is 1 or 2;
d) T is a covalent bond, or a linking group having one of the following structures:
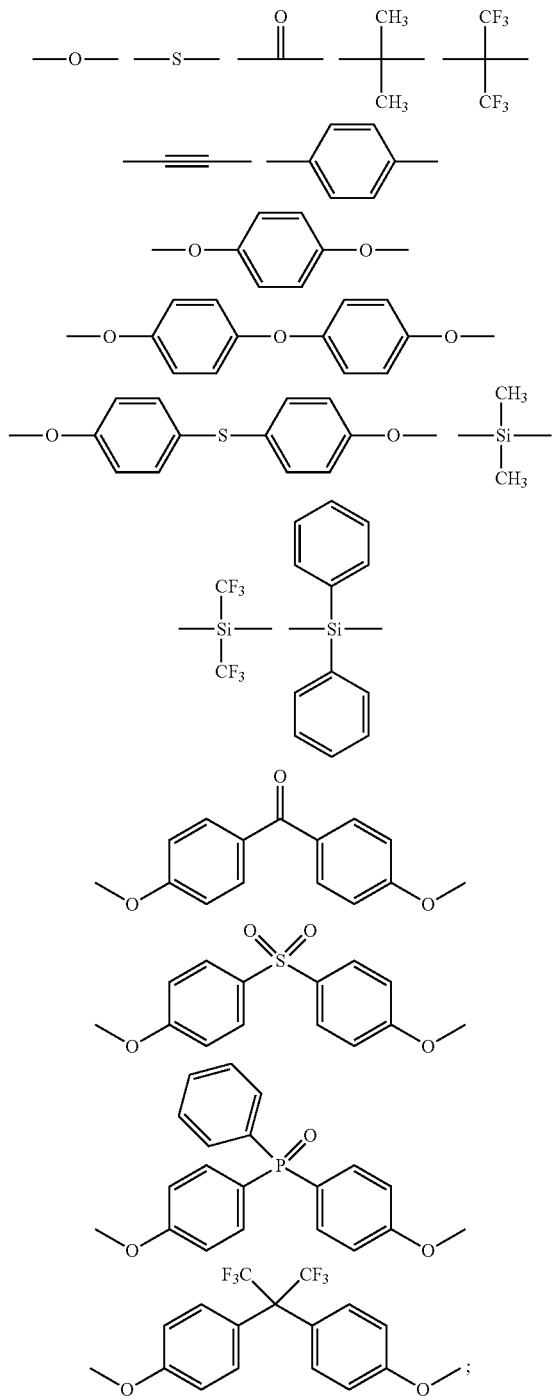
e) W is a covalent bond, or a linking group having one of the following structures:
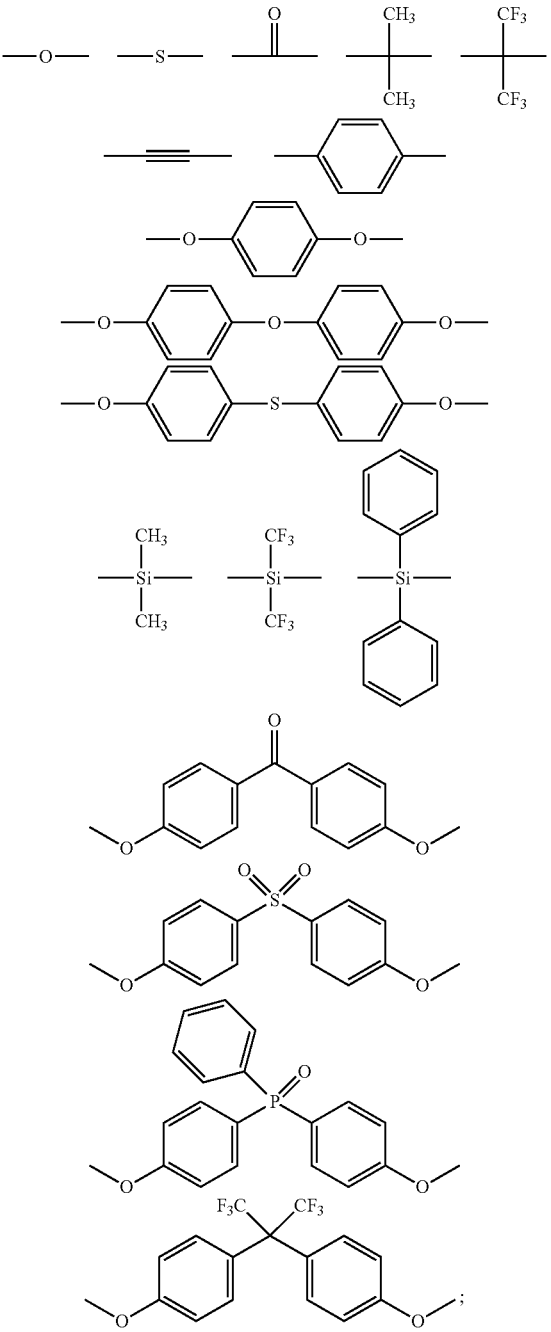
f) J is one of the following moieties:
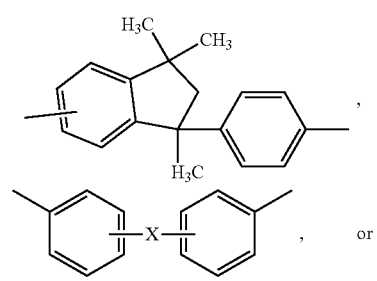

-continued

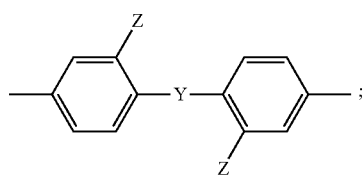

wherein:

i) X is a linking group having one of the following structures:

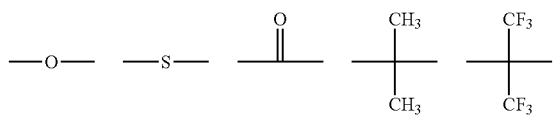

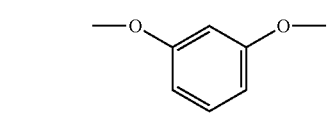

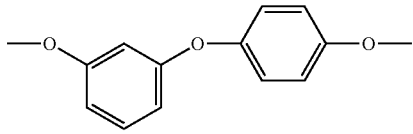

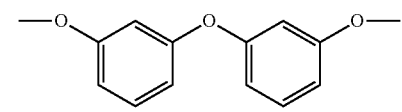

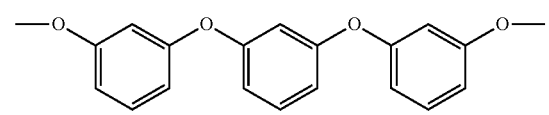

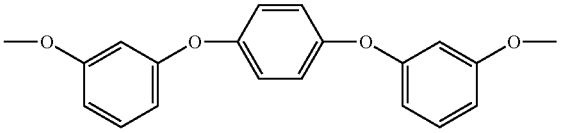

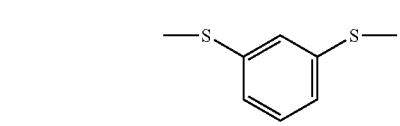

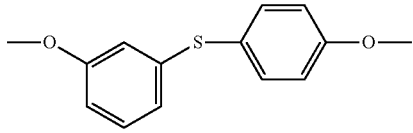

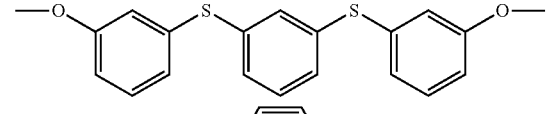

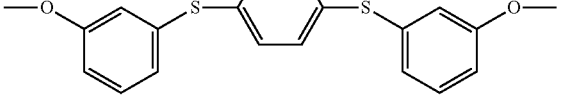

-continued

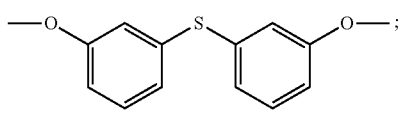

ii) Y is a covalent bond, or a linking group having one of the following structures:

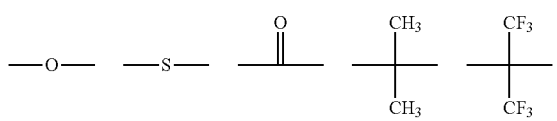

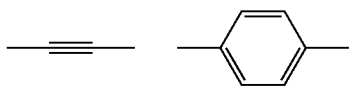

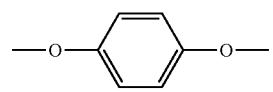

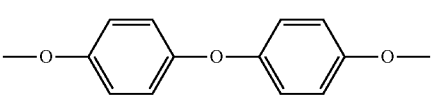

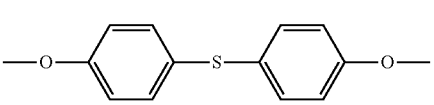

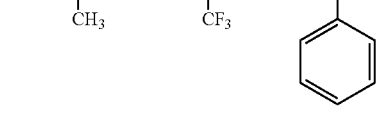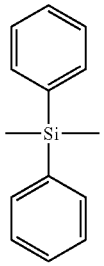

and iii) Z is one of the following structures:

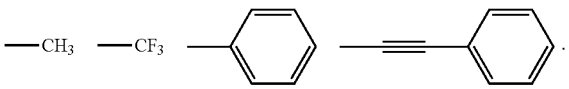

8. The process of claim 3 wherein said one or more copolyimides comprising endcaps and a backbone, said endcaps and/or said backbone comprising sulfur, have Structure VI below and wherein for each of said one or more copolyimides the indices and variables provided in Structures VI are independently selected:

Structure VI

[chemical structure: polymer with Q_a-T_b units, phthalimide linkages with L group, and diphenyl sulfide S_m group]

a) the index p is independently an integer from 5 to 300;
b) x is a non-zero number less than 1, and the ratio for x:(1-x) is 0.01:0.99 to 0.20:0.80;
c) the subscripts a and b are indices for the molar fractions of Q and T, each with the range of 0.05 to 0.95, respectively, and the sum of a and b is unity;
d) the index m is 1 or 2;
e) L is a covalent bond, or a linking group having one of the following structures:

[structures: —O—, —S—, —C(=O)—, —C(CH₃)₂—, —C(CF₃)₂—, —C≡C—, para-phenylene, —O-C₆H₄-O—, —O-C₆H₄-O-C₆H₄-O-C₆H₄-O—, —O-C₆H₄-S-C₆H₄-O—, —Si(CH₃)₂—, —Si(CF₃)₂—, —Si(Ph)₂—, benzophenone-based linker, sulfone-based linker]

-continued

[structures: triphenylphosphine oxide based linker with methoxy groups; hexafluoroisopropylidene bisphenol-based linker]

f) Q and T are homopolyimides having Structure VII below:

Structure VII

[chemical structure: homopolyimide repeat unit with W linker between phthalimides and J group, subscript n]

wherein
i) for each homopolyimide Q and T, the index n is an integer from 5 to 300;
ii) for each homopolyimide Q and T, W is independently a covalent bond, or a linking group having one of the following structures:

[structures: —O—, —S—, —C(=O)—, —C(CH₃)₂—, —C(CF₃)₂—, —C≡C—, para-phenylene, —O-C₆H₄-O—, —O-C₆H₄-O-C₆H₄-O-C₆H₄-O—, —O-C₆H₄-S-C₆H₄-O—]

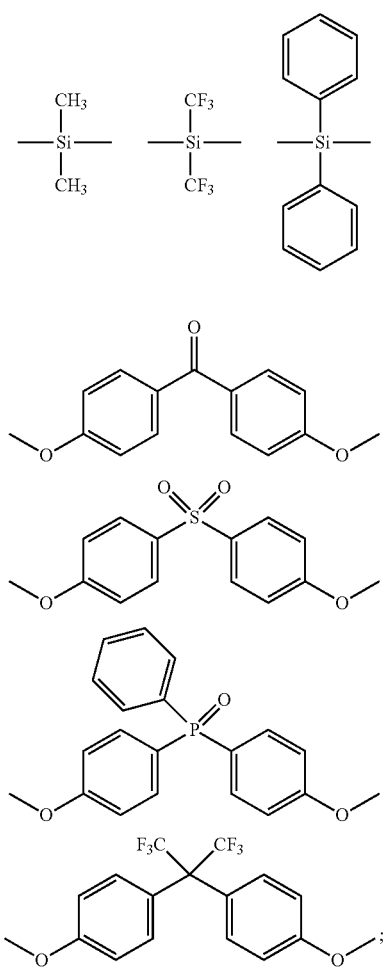
iii) for each homopolyimide Q and T, J has one of the following structures with the proviso that J for Q and T is different:
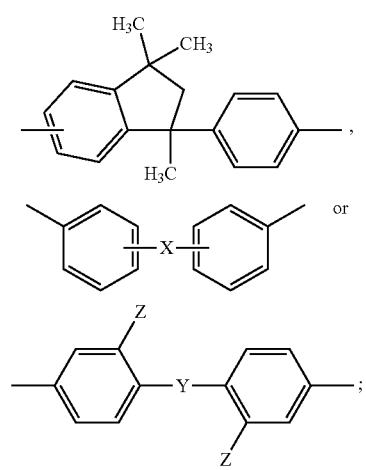
wherein:
X is a linking group having one of the following structures:
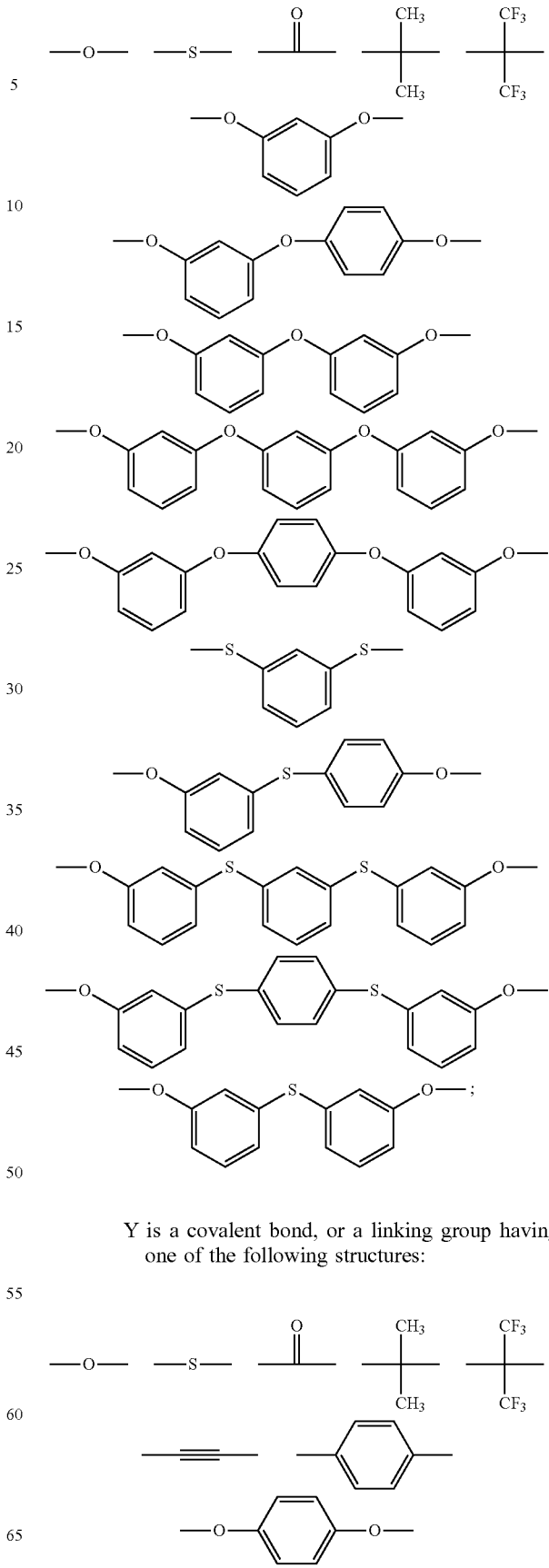
Y is a covalent bond, or a linking group having one of the following structures:

-continued

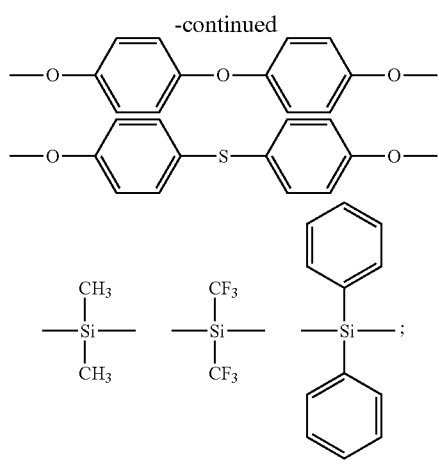

and
Z is one of the following structures:

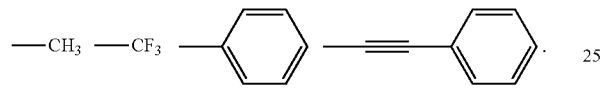

9. The process of claim 3 wherein said one or more homopolyimides that comprise endcaps and a backbone, said endcaps and/or said backbone comprising sulfur, have Structure VIII or IX below:

Structure VIII

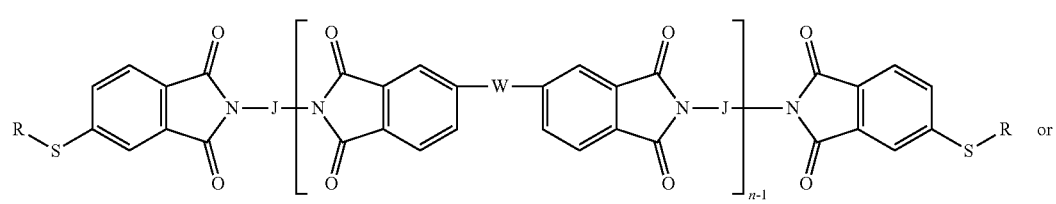

Structure IX

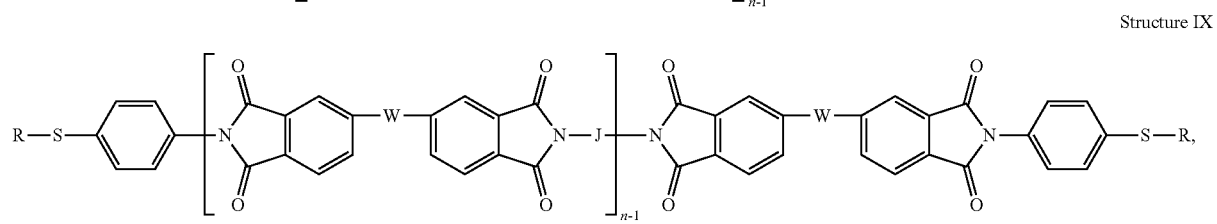

wherein:
a) for each homopolyimide, the index n is independently an integer from 5 to 300;
b) for each homopolyimide, each W is independently a covalent bond, or a linking group having one of the following structures:

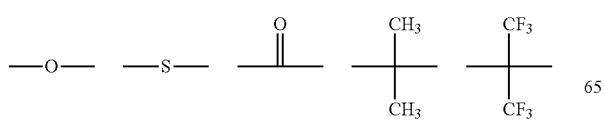

-continued

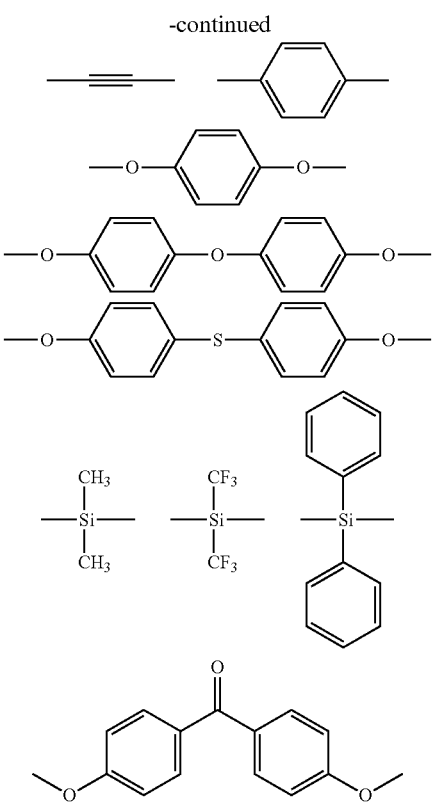

-continued

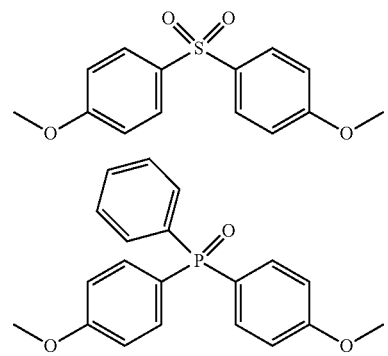

-continued

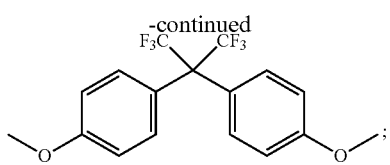

c) for each homopolyimide, each R is independently Me, Et or Ph;
d) for each homopolyimide, J is independently:

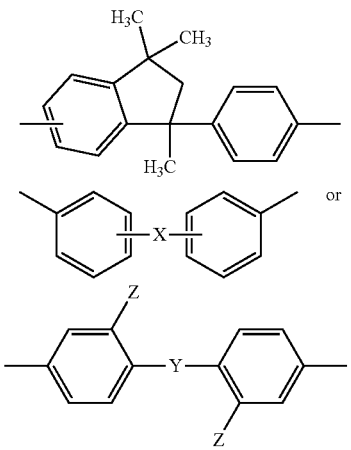

wherein:
i) for each homopolyimide, X is independently a linking group having one of the following structures:

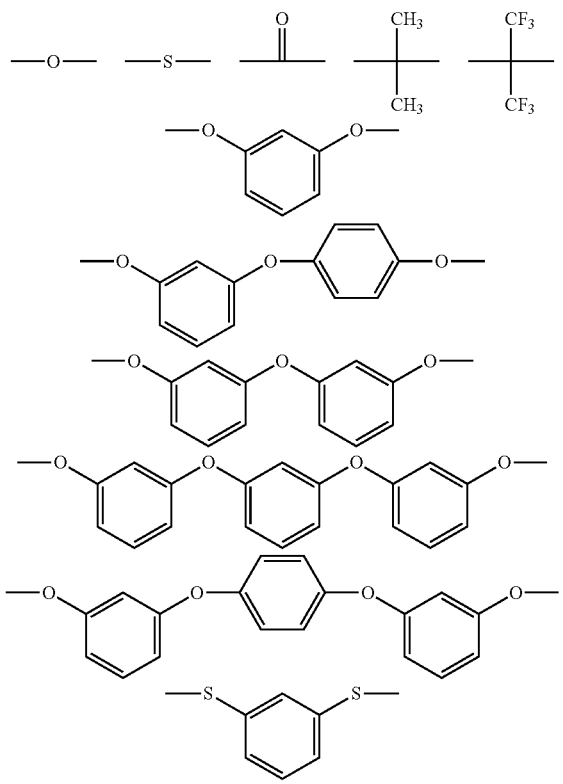

-continued

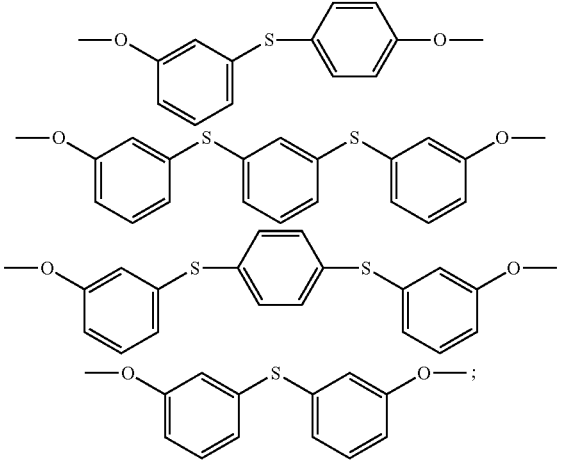

ii) for each homopolyimide, Y is independently a covalent bond, or a linking group having one of the following structures:

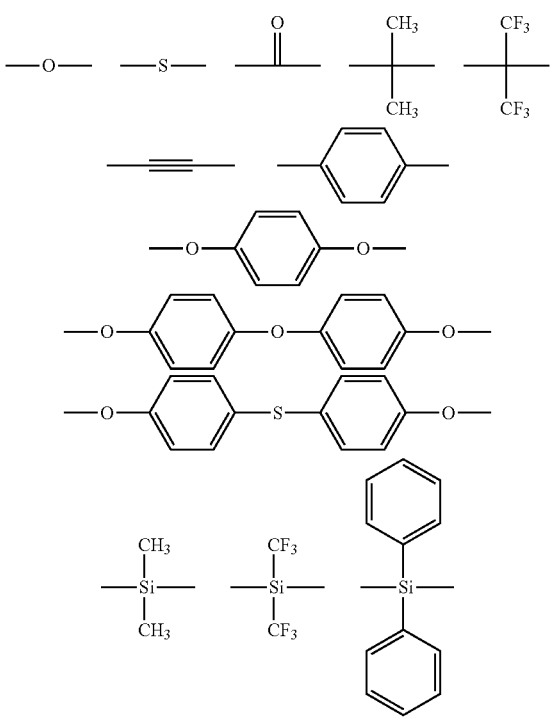

iii) for each homopolyimide, Z is independently one of the following structures:

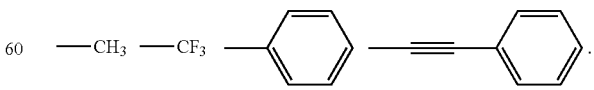

10. The process of claim 5 wherein said one or more copolyimides comprising endcaps and a backbone, said endcaps and/or said backbone comprising sulfur, having Structure X or XI below:

Structure X

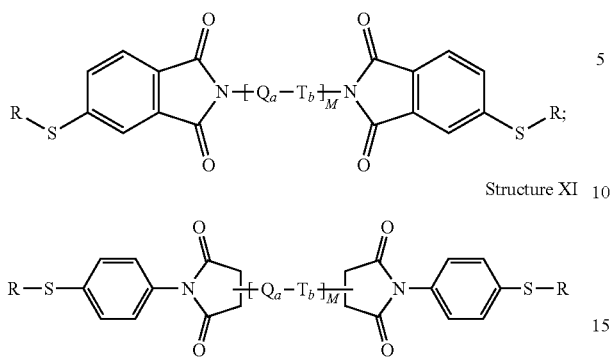

Structure XI wherein
a) the index M is independently an integer from 5 to 300;
b) $Q_a$ and $T_b$ are as defined in claim 5; and
c) each R is independently Me, Et or Ph.

11. The process of claim 5 comprising one or more copolyimides comprising sulfide-containing endcaps and sulfides in said one or more copolyimides backbone:

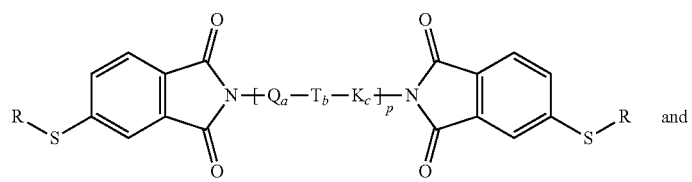

and

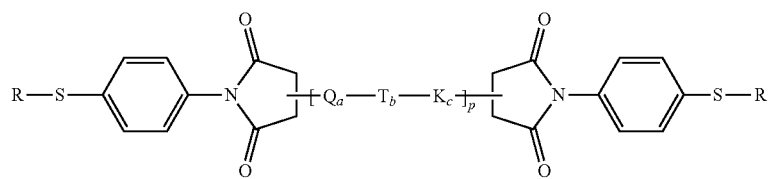

wherein
a) each K has the following structure;

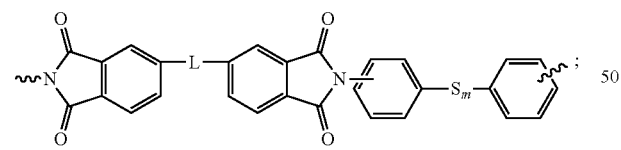

and
for K
(i) the index m is 1 or 2; and
(ii) L is a covalent bond, or a linking group having one of the following structures:

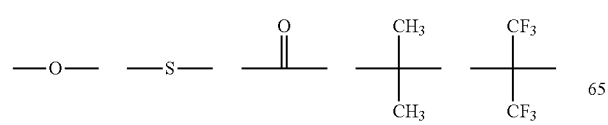

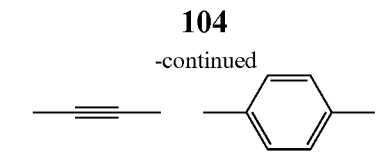

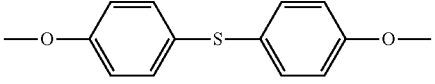

Structure XII

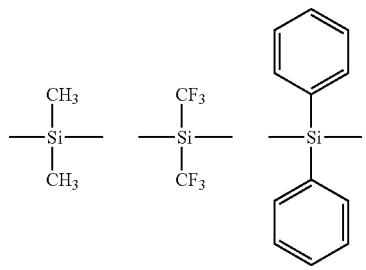

Structure XIII

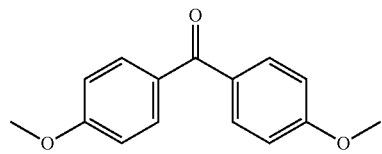

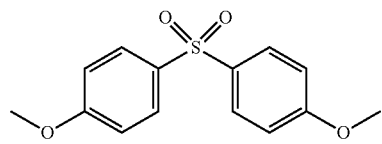

-continued

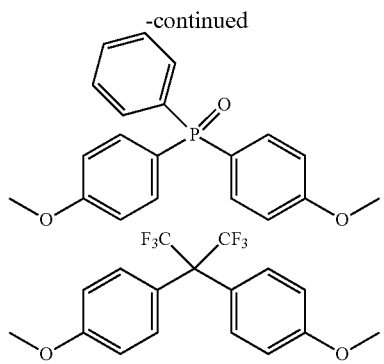

b) Q and T are as defined in claim 5;
c) the subscripts a, b and c are molar fractions of Q, T and K, with the proviso that a, b and c are positive numbers, each with the range of 0.05 to 0.95 and the sum of which is 1;
d) the index p is independently an integer from 5 to 300; and
e) each R is independently Me, Et or Ph.

12. The process of claim 2 wherein said polyimide has a number-average molecular weight of from about 1,000/mol to about 300,000 g/mol.

* * * * *